United States Patent
Prakash et al.

(10) Patent No.: US 8,145,003 B2
(45) Date of Patent: *Mar. 27, 2012

(54) ADAPTIVE TRANSFORMS

(75) Inventors: Adityo Prakash, Redwood Shores, CA (US); Edward R. Ratner, Sunnyvale, CA (US); Dimitrios Antsos, San Marino, CA (US)

(73) Assignee: Altera Corporation, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/873,083

(22) Filed: Aug. 31, 2010

(65) Prior Publication Data

US 2011/0058752 A1 Mar. 10, 2011

Related U.S. Application Data

(63) Continuation of application No. 10/032,394, filed on Dec. 19, 2001, now Pat. No. 7,792,390.

(51) Int. Cl.
  *G06K 9/46* (2006.01)
(52) U.S. Cl. ................................ 382/239; 382/279
(58) Field of Classification Search .............. 382/239, 382/279
  See application file for complete search history.

(56) References Cited

U.S. PATENT DOCUMENTS

| | | | | |
|---|---|---|---|---|
| 5,111,292 A * | 5/1992 | Kuriacose et al. | ........ | 375/240.01 |
| 5,247,515 A * | 9/1993 | White | ............ | 370/484 |
| 5,453,945 A * | 9/1995 | Tucker et al. | ............ | 708/400 |
| 5,710,839 A * | 1/1998 | Cok | ............ | 382/264 |
| 5,754,702 A * | 5/1998 | Simpson | ............ | 382/240 |
| 5,896,176 A * | 4/1999 | Das et al. | ............ | 375/240.15 |
| 6,151,025 A * | 11/2000 | Yen et al. | ............ | 345/418 |
| 6,233,279 B1 * | 5/2001 | Boon | ............ | 375/240.08 |
| 6,628,716 B1 * | 9/2003 | Tan et al. | ............ | 375/240.19 |
| 7,792,390 B2 * | 9/2010 | Prakash et al. | ............ | 382/302 |

* cited by examiner

*Primary Examiner* — Matthew Bella
*Assistant Examiner* — Dennis Rosario
(74) *Attorney, Agent, or Firm* — Okamoto & Benedicto LLP

(57) ABSTRACT

In one embodiment, an image is broken up into multiple regions or segments, where each segment may be of arbitrary shape, and a transform (multi-scale or otherwise) is applied on the set of segments. In another embodiment, pattern adaptive prediction is used when predicting the next finer level of the transform pyramid. The pattern adaptive prediction uses the parent grid to determine what geometry of a filter is to be used when predicting the child grid. At the boundaries of the domain, the pattern adaptive prediction can coupled with the domain adaptive prediction technique.

10 Claims, 63 Drawing Sheets

FIG. 15B

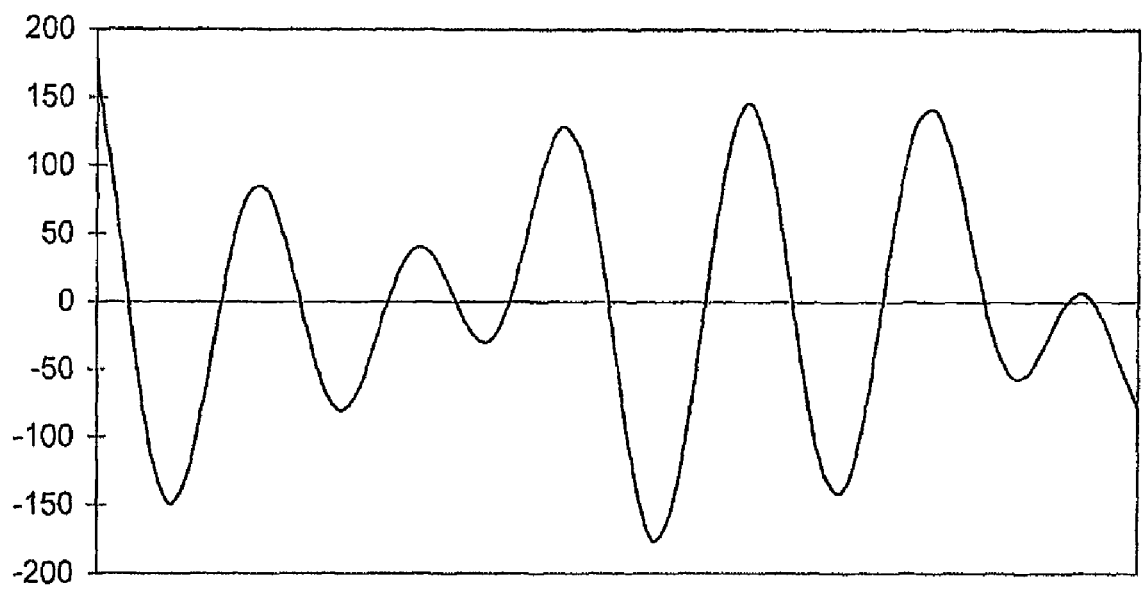
FIG 1. A

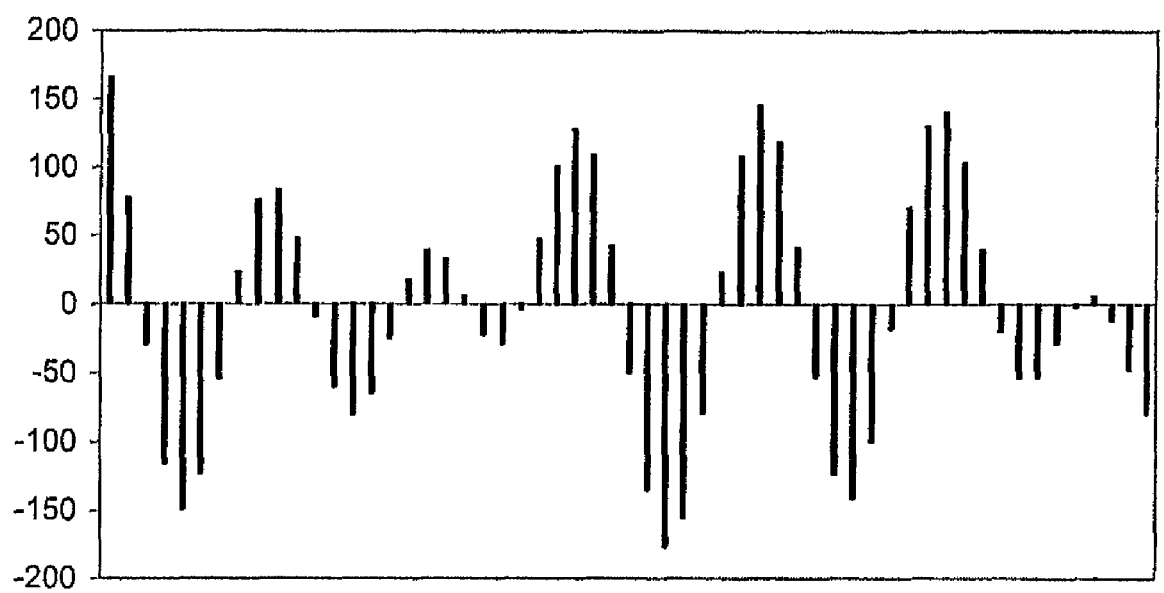
FIG 1. B

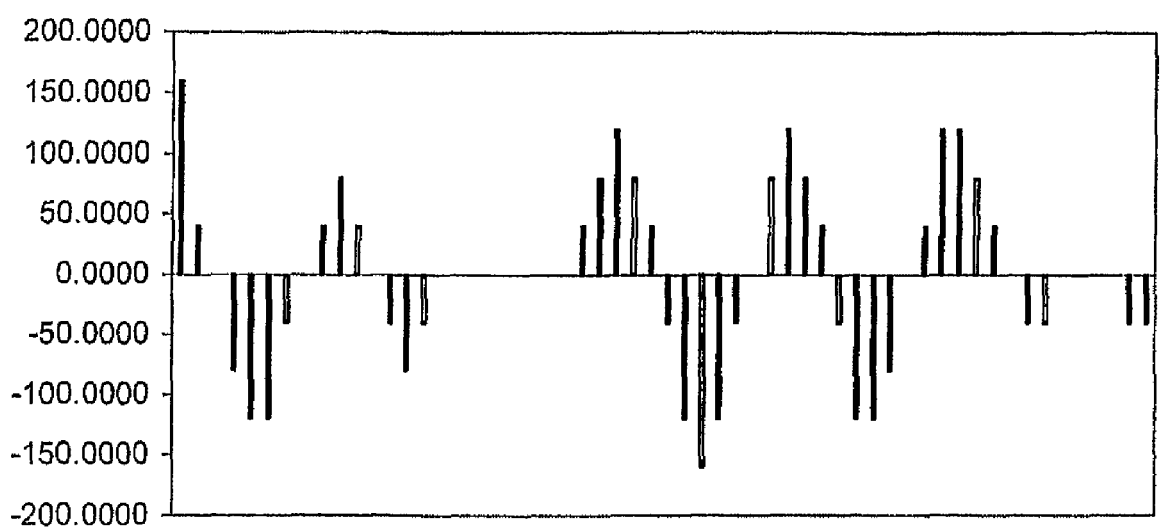
FIG 1. C $$g(x) = c(n)\sqrt{\frac{2}{L}} \cos\left(\frac{(x+0.5)n\pi}{L}\right)$$

where, $$c(n) = \frac{1}{\sqrt{2}} \text{ for } n = 0$$

and, $$c(n) = 1 \text{ for all } n \neq 0$$

FIG. 1D

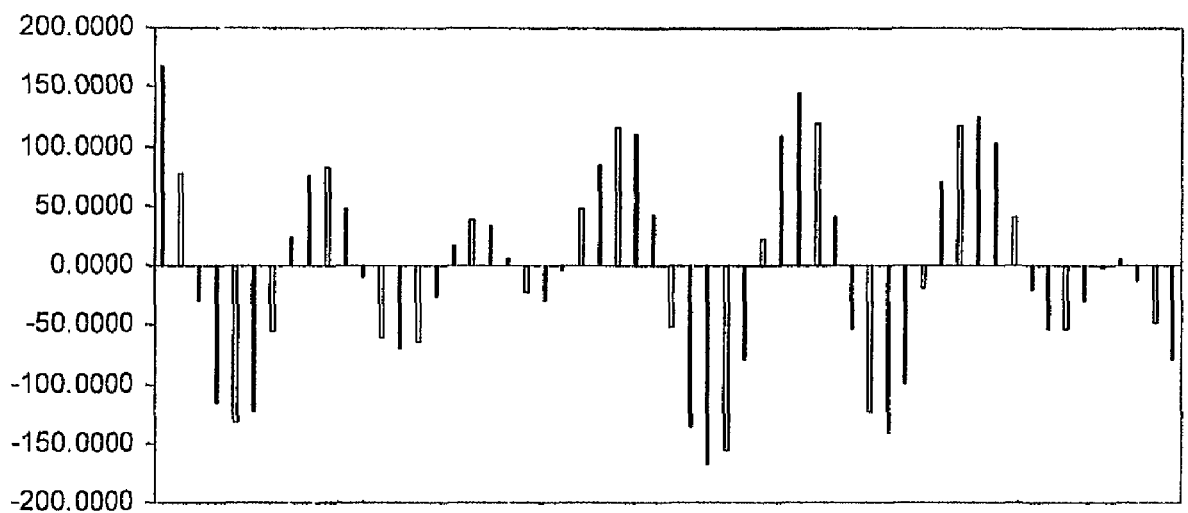
FIG 1. F

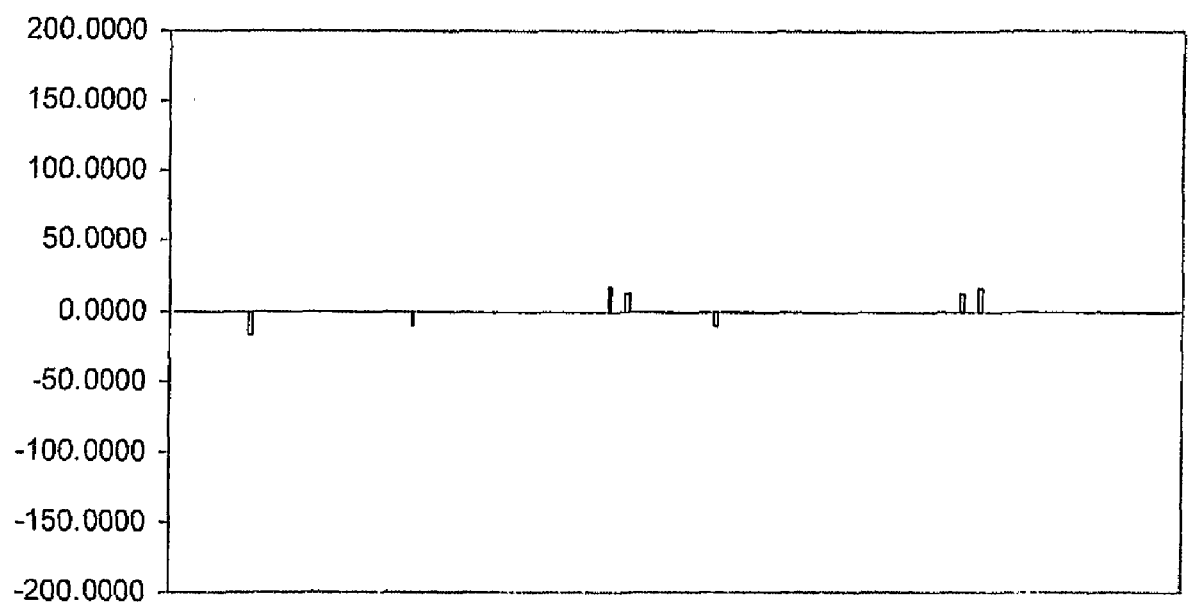
FIG 1. G

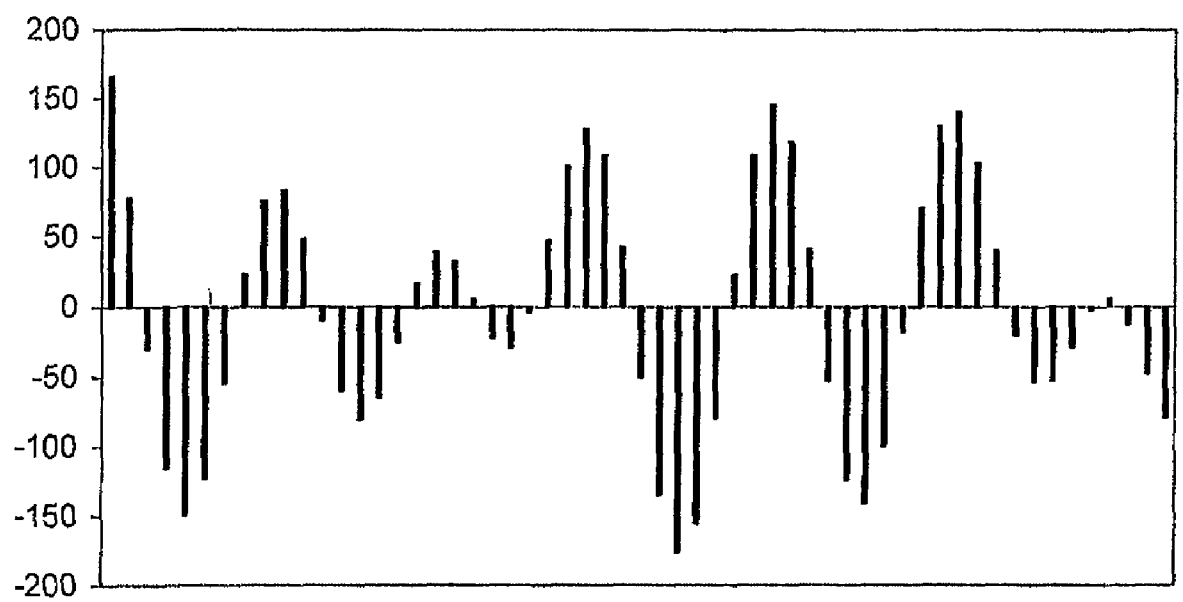
FIG 1. H

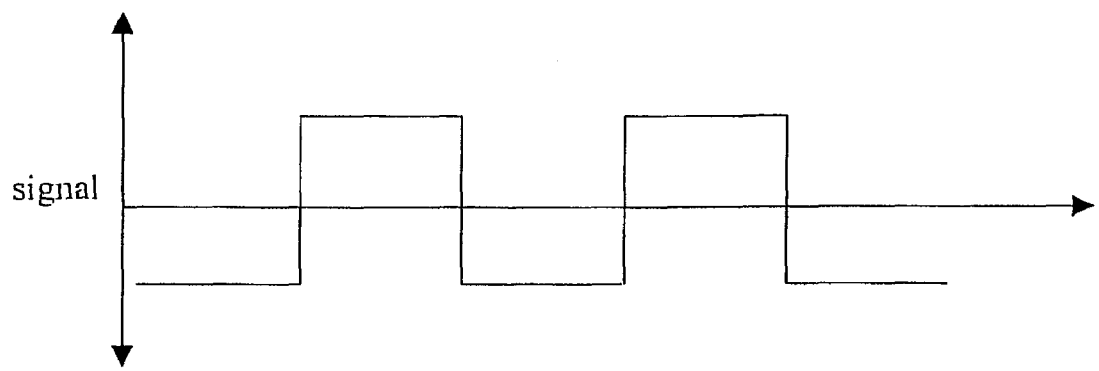
Position of signal
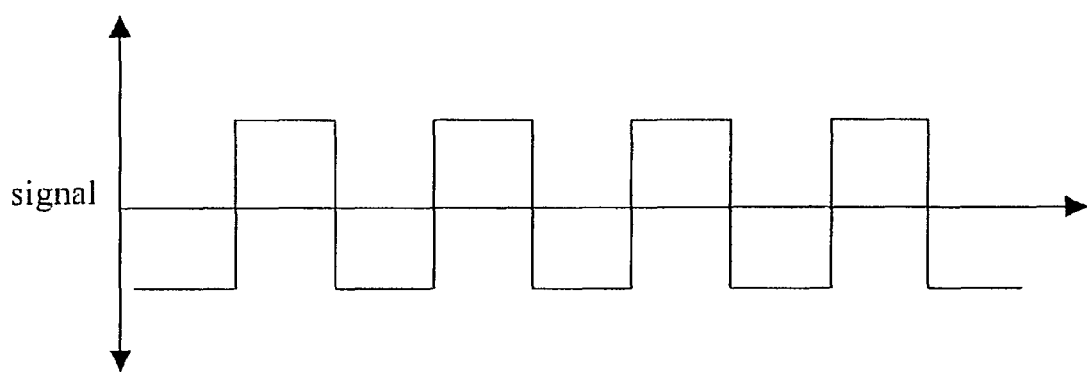
Position of signal
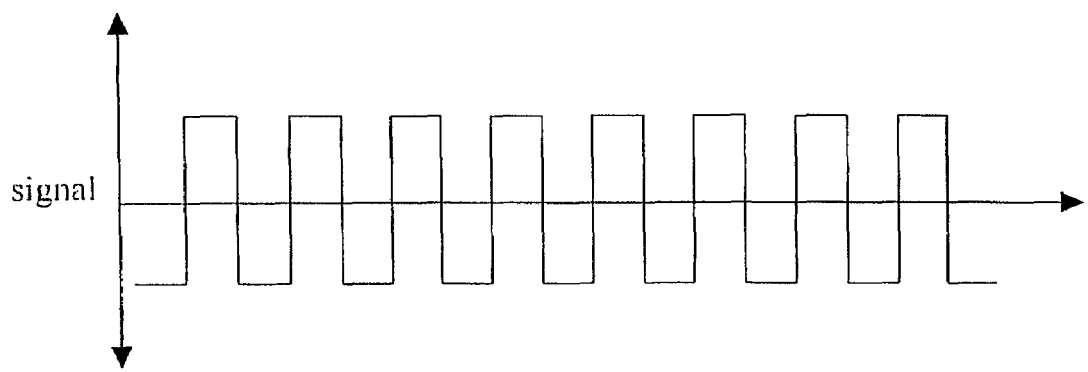
Position of signal
FIG.3

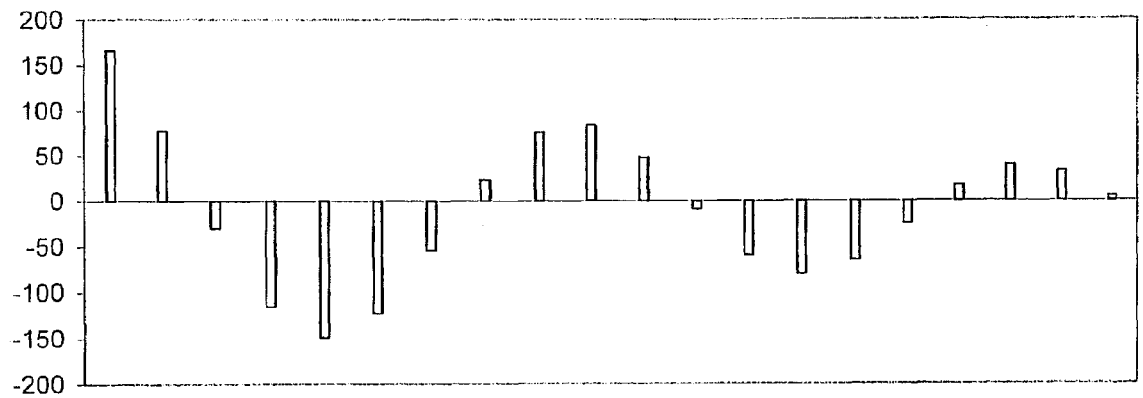
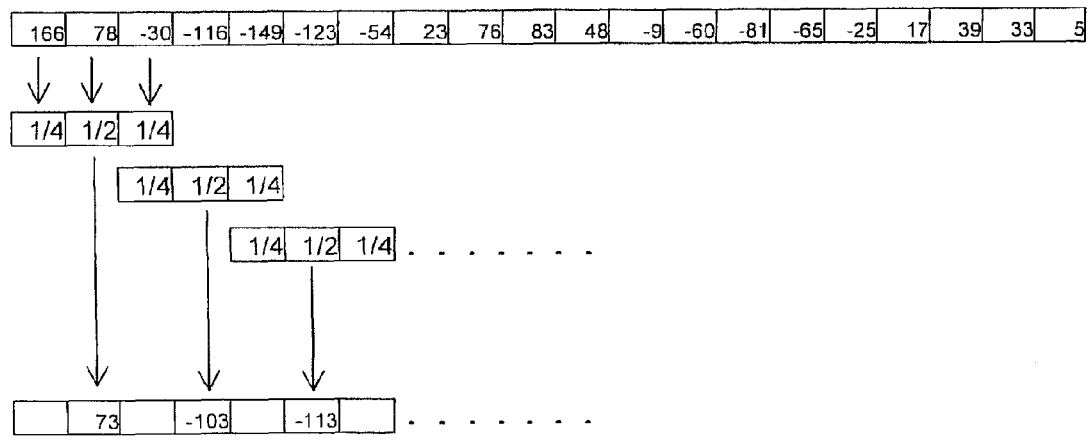
FIG.5B

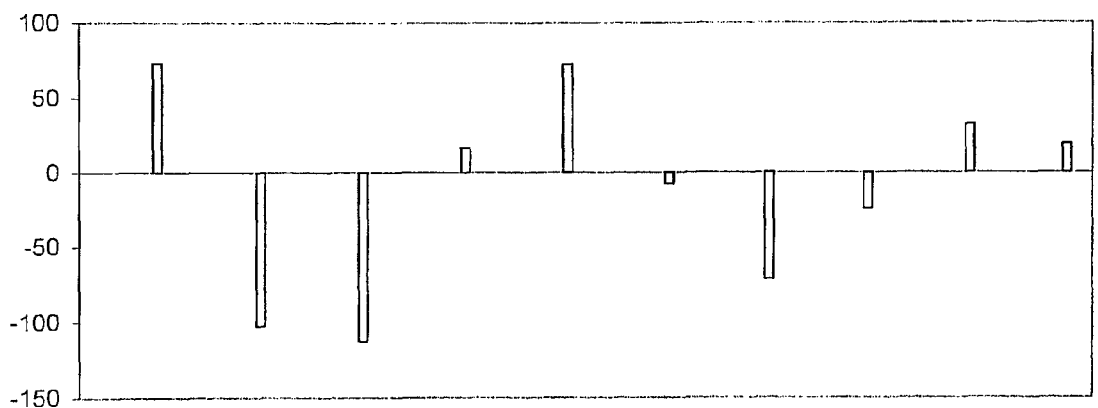
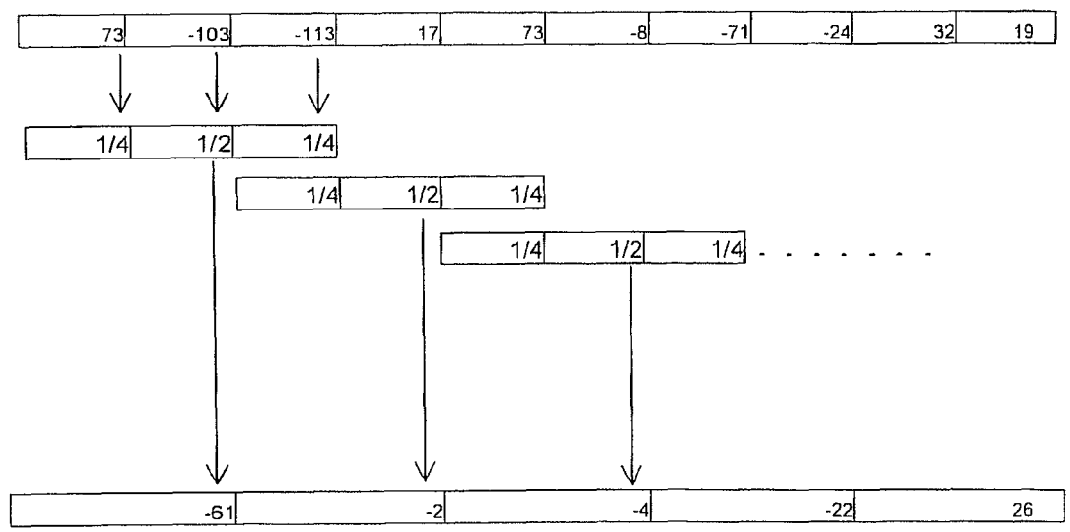
FIG.5C

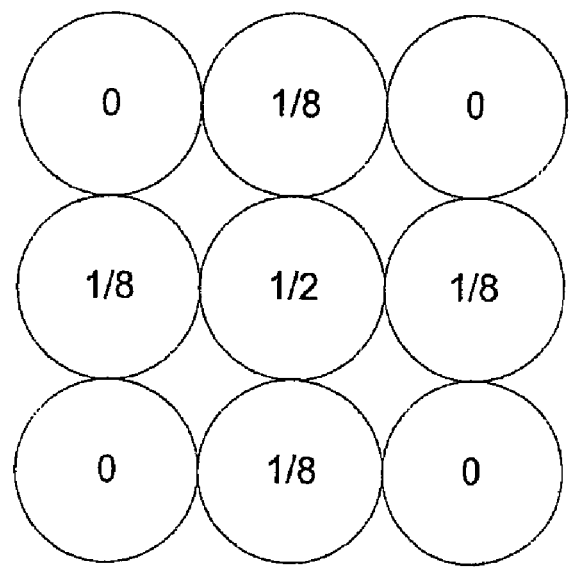
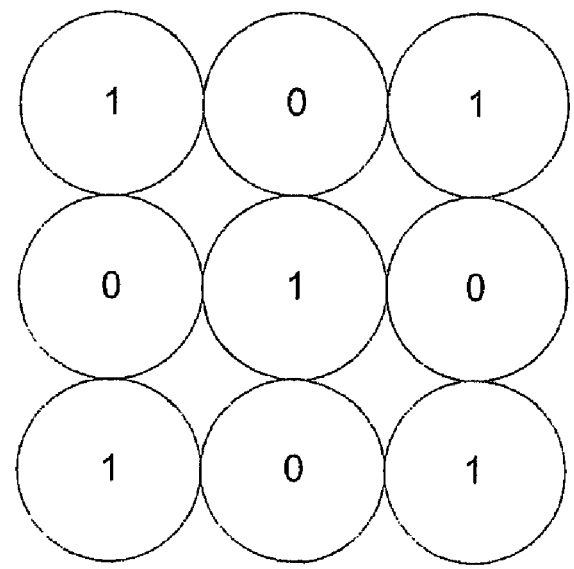
FIG. 6B

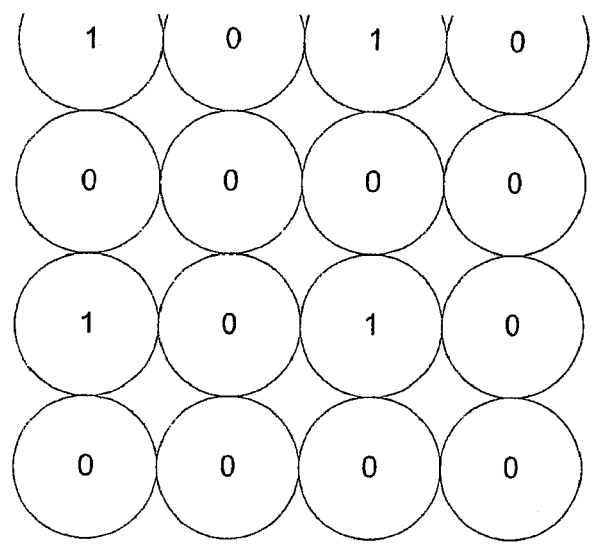
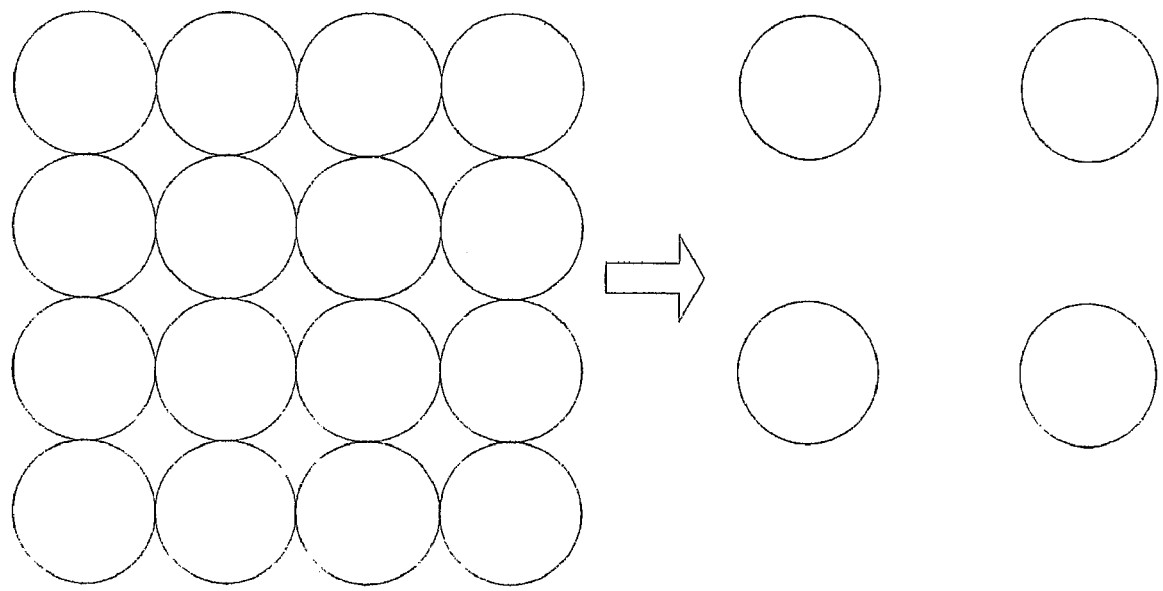
FIG. 6E

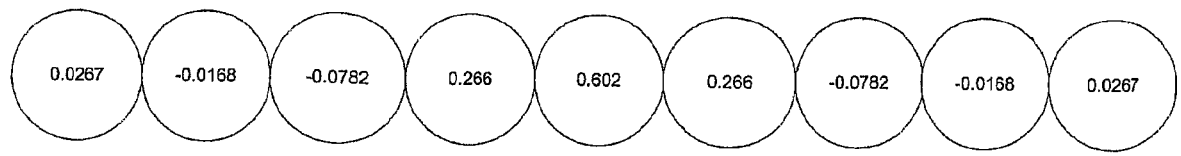
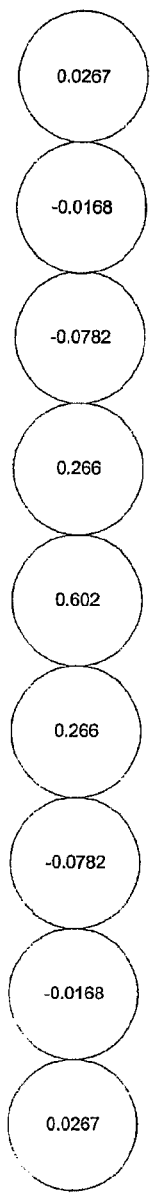
FIG. 6F

A = 0.1609
B = 0.0712
C = - 0.0208
D = - 0.0101
E = - 0.0045
F = 0.0013
G = 0.00028
H = 0.00713
I = - 0.00045

$$A = -1/32$$
$$B = 5/16$$

A = - 1/32
B = 5/16
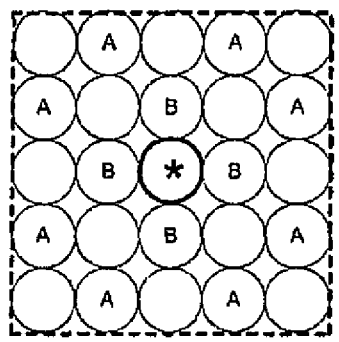 X 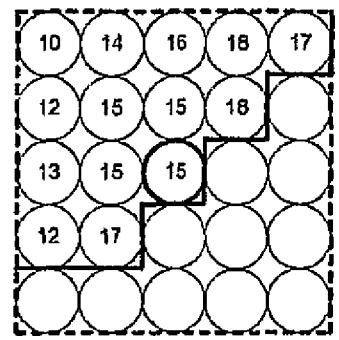
Value of pixel * = 5/16 (15+15) - 1/32 (14+18+12+12) = 7.62
FIG. 16D

A = - 1/32
B = 5/16

Value of pixel* = 5/16 (15+15+66+65) - 1/32 (14+18+65+64+63+61+12+12) = 40.65

A = - 1/32
B = 5/16

Σ weights inside = 5/16 + 5/16 - 1/32 - 1/32 - 1/32 - 1/32 = 1/2 ≠ 1

Diff = 1 - 1/2 = 1/2

A = - 1/32
B = 5/16

Equation of 16D + Diff * (Median inside the segment) =

7.62 + 1/2 (15) = 15.12

A = - 1/32
B = 5/16

1/32(14+18+12+12) + 5/16(15+15) + 1/2[ -1/32(65+64+63+61) + 5/16(66+65)]+ 1/2(15) = 31.64

ADAPTIVE TRANSFORMS

CROSS-REFERENCE TO RELATED APPLICATIONS

The present application is a continuation of U.S. patent application Ser. No. 10/032,394, entitled "Adaptive Transforms," filed on Dec. 19, 2001, the disclosure of which is hereby incorporated by reference.

U.S. patent application Ser. No. 10/032,394 claims the benefit of U.S. Provisional Patent Application No. 60/237,039, entitled "Lifting Transform Coding for Domain Based Edges," filed on Dec. 19, 2000, the disclosure of which is hereby incorporated by reference.

BACKGROUND OF THE INVENTION

The present invention relates in general to image or video processing. More specifically, the present invention relates to the process and/or coding of digital images using transforms.

Bandwidth and Compression

Digital image processing is the process of analyzing an image expresses in digital form to determine something about the image or to create a processed version of the input image. An image can be defined as an N-dimensional array of pixel values where each pixel represents a spatial sampling point associated with intensity or color value distributions. Typical examples are the 2-D still images encountered in photographs or as individual frames of a video sequence, or the 3-D images produced in a wide range of applications from medical imaging to surface digitization to holograms. The size of an N-dimensional image is characterized by the amount of spatial sampling (resolution) of the image as well as the number of possible color values (color depth).

For example in the case of N=2 with a width of 720 pixels, a height of 480 pixels, and a color depth of 16 bits (meaning $2^{16}$ possible color values) the resultant image size is 720×480×16 bits, or 5,529,600 bits or approx. 700,000 bytes. This is the size of an individual video frame (two fields) in the common NTSC video format used on television sets throughout North America. In the very same NTSC video format the size of the data is further magnified by the display rate of 30 frames per sec. This amounts to over 165 million bits of bandwidth or approx. 20 million bytes over every sec of raw video.

Many of the problems in image and video processing relate to methods for the efficient handling of such large data sets. As the transmission and storage of raw digital images, and especially video sequences, at such enormous rates is infeasible with conventional computer equipment and/or network connections available to the mass consumer, there is a significant need for efficient compression of said images or video sequences.

Lossless Compression

In the case of still images this can be accomplished through a variety of techniques. If the application requires lossless compression, i.e. no reduction of quality as a result of the compression method, suitable options include the Lempel-Ziv dictionary based schemes (e.g. LZ77, LZW), loss-less JPEG or JPEG 2000, entropy encoders such as arithmetic encoding, or various hybrid approaches such as the commercially available PKZIP and GZIP. All lossless methods work on the premise of removing unnecessary redundancy in the data set while allowing for perfect reconstruction on the decoder side. All lossless techniques, however, suffer from the same two severe deficiencies: (a) the compression ratios are generally relatively small for most still images and (b) when used alone the performance gain is greatly affected by the nature of the input data set thus making it intractable to guarantee a constant output rate, which may be required for transmission over a given channel.

Lossy Compression

Lossy compression methods are a suitable alternative to the aforementioned lossless still image compression methods. All lossy techniques will affect the image quality in some manner. At high enough bit rates it is arguable whether the effects on quality will be perceptually meaningful. However, in order to achieve significant compression gains it becomes necessary to reduce the image quality. The problem then is how to efficiently compress the image in such a way that the required loss in image quality is acceptable in the sense of not too much perceptual degradation. Examples of lossy still image compression include, but are not limited to, pixel sub-sampling, color depth quantization, fractals, vector quantization, and transform coding. Only the last two categories, especially transform coding, have demonstrated high enough compression gains at high enough quality over a wide range of image types to be commercially viable in applications requiring still image compression.

Transform Coders

General Description

From here on we will focus our discussion on the use of transform coders as pertains to image compression, though such techniques are also commonly used in solutions to many other image processing related problems. Examples of two of the most popular lossy still image transform encoders are the publicly available JPEG and JPEG2000 compression standards. As mentioned previously these two methods can also be run in a lossless mode. A transform coder generally consists of two parts: (a) a decomposition of the multidimensional signal onto a specified set of basis functions and (b) the process of quantization followed by some manner of lossless encoding. We will primarily focus on a discussion of the first part, i.e. the transform decomposition. However, it should be noted that the second part, i.e. quantization plus lossless encoder (or in some cases bit-plane encoders), is required in order for the technique to be considered 'lossy'.

Video Residue Encoders

Lossy transform coders are also directly applicable to video compression. As noted at the beginning of the introduction the bandwidth requirements imposed by raw video at high frame rates are particularly daunting. However, treating a given video sequence as a set of independent still image frames and thus applying lossy still image compression techniques to each frame on an individual basis are inherently inferior to modern video codecs. The distinction lies in that all modern state-of-the-art video codecs seek to exploit the existence of a large amount of temporal redundancy of information between successive frames in a video sequence.

This is typically done through some form of motion estimation and compensation. In this way a predictive model of the next raw input frame is inexpensively coded. This model frame is then directly subtracted from the target raw frame on the encoder side. The resultant difference image is referred to as the residue frame. This residue frame tends to be much less smooth than the original image frame. At the same time the residue frame tends to have less overall information (i.e. entropy) than the original image frame. The goal then is to compress the residue frame as efficiently possible such that when the decoder reconstructs the residues (or differences) and adds them back to the model frame, the resultant image will then approximate the original raw input in terms of perceptual quality.

Examples of such compression methods include the popular family of MPEG (MPEG-1, MPEG-2, and MPEG 4) and the H26x (H.261, H.263) standards. In fact the residue methods of these codecs are highly related to the JPEG and JPEG2000 still image compression methods with the additional caveat that specific modifications are made in order to make the compression of the highly variable residues more efficient.

As previously mentioned, a transform coder generally consists of two parts: (a) a decomposition of the multidimensional signal onto a specified set of basis functions and (b) the process of quantization followed by some manner of lossless encoding. We will now discuss the first of these two steps.

Decomposition and Basis Functions

FIG. 1A shows a continuous 1-D signal. FIG. 1B shows the same 1-D signal discretized at 60 sample points. Naively one could send the amplitudes at each of the 60 sample points. However, this would mean inefficiently compressing and transmitting 60 symbols, which may have a large dynamic range of possible values. One could quantize the symbols directly and then send the resultant data but this would have a very poor tradeoff in terms of quality vs. bit rate. In other words, as seen in FIG. 1C, we could send an imprecise representation of the amplitudes, which would require less bits but would result in poor reconstruction. One could also try to predict each successive value based on a localized prediction of its prior neighbors. If the function values do not vary much or follows a simple rule based on its predecessors then the differences between the real values and the predicted values (i.e. errors) can be represented more efficiently than the set of original values itself. Techniques based on such concepts include DPCM and predictive coding in general.

However, in the case of FIG. 1A there is in fact a much more optimal approach. This involves a decomposition or projection onto a set of specified basis functions. Here decomposition really means that the signal can be represented as a linear combination or weighted sum of a set of functions called basis functions. The multiplicative factors in the weighted sum are called the coefficients of the decomposition and represent the relative amount of projection onto a given basis function. The coefficients may have any value ranging from $-\infty$ to $+\infty$. The smaller the absolute value of a given coefficient the less important the corresponding basis function was to the overall decomposition or sum. Note in the case of continuous signals the decomposition is often an infinite sum, but for discrete signals with N sample points this sum can have at most N non-zero terms.

For a given signal not all possible sets of basis functions are equally good or efficient. Here efficiency is measured by the number of non-zero coefficients or, in more specific terms, by their inherent entropy. The more unique or varied the coefficients the more information or bits that must be transmitted. In many cases an efficient set of basis functions is chosen so as to satisfy certain properties such as periodicity or orthogonality; though this is not always necessary.

DCT Basis Functions

In FIG. 1A, the original function exhibits certain periodic properties. We would then like to choose a set of basis functions, which will result in a set of coefficients with much less than N non-zero values. A good choice here is the set of basis functions that define the discrete cosine transform, i.e. DCT. The functions themselves are a set of cosines with periods given as according to the generating equation in FIG. 1D where L denotes the period and the quantum number n distinguishes one member of the family of basis functions from another. The resultant decomposition onto the set of DCT basis functions shows that there are only three non-zero coefficients. In fact the three coefficients are respectively 100, 30, and 70 for the three basis functions displayed in FIG. 1E. In the simple example of FIG. 1B the entire discrete function over the entire 60 sample points can be exactly represented by only three values. This constitutes a significant reduction in the amount of information from the original 60 values. Moreover, provided the decoder knows to use the same set of cosine basis functions it can receive and decode the three symbols and then form the required summation thus perfectly reconstructing the function.

In the case of FIG. 1F, we have slightly altered the function depicted in FIG. 1B. Now the three previous coefficients of the decomposition cannot exactly represent the function by themselves. FIG. 1G, shows the resultant reconstruction error using only these three coefficients and the associated basis functions. To ensure a perfect reconstruction (i.e. no loss of quality) it is necessary to consider and thus transmit a larger number of coefficients. However, in this case the resultant error or inaccuracy is small, therefore it may be satisfactory to still send only the three non-zero coefficients of FIG. 1D depending on how much error can be tolerated for the given application paradigm. In other words depending on the application the additional coefficients needed to exactly reconstruct the signal in FIG. 1F may not be significant and thus it may be acceptable for the decoder to reconstruct the approximated signal shown in FIG. 1H using a small number of transmitted bits.

In FIG. 2A we face a more difficult challenge for the DCT basis functions. Now there is a very sharp transition or edge in the domain. FIG. 2B shows the discretized version of the continuous signal exhibited in FIG. 2A. FIG. 2C shows the reconstruction results based on maintaining a small number of coefficients. Now the residual error is very high. FIG. 2D depicts a case where many coefficients are used and the associated residual error is very small. It can be shown that the amount of error of the reconstruction is inversely proportional to the number of coefficients that are preserved and therefore must transmitted to the decoder. Thus the DCT basis functions are not very efficient in this case. Note that the DCT is the primary transform of choice in the JPEG and MPEG 1-2-4 families of standards, though MPEG-4 allows for other transforms. In general the DCT does not perform well near sharp edges.

Other Families of Basis Functions

Fortunately more efficient decompositions for this case do exist. For FIGS. 2A-B, a better choice would consist of a differently family of basis functions known as the Haar functions (see FIG. 3). On the contrary the set of Haar basis functions would perform very poorly for the sinusoidal signal shown in FIG. 1A-B.

There are a multitude of transforms with associated basis functions used in image and video processing. These include but are not limited to the aforementioned DCT, the Haar, the discrete Fourier transform (DFT), the Karhunen-Loeve transform (KLT), the Lapped orthogonal transform (LOT), and the discrete wavelet transform (DWT). Each of these transforms has their advantages and disadvantages.

In general, especially in higher dimensional images (i.e. $\geq 2$), it is intractable to adaptively determine an optimal basis set of functions for a given image. The work of Coifman et al. on adaptive wavelet packets [Coifman I] has demonstrated small nominal gains when applied to a wide range of image or video data. In order to be robust and at the same time efficient, it is in general better to use a set of basis functions with fundamental interpolatory properties. A good choice is often those sets of basis functions, which are generated via higher dimensional analogs of polynomial interpolators of relatively low order (i.e. linear, quadratic, cubic, etc). An examples of a basis function set construction based on this technique can be seen in the work of W. Sweldens [Sweldens I]. The construction of robust and efficient basis functions for transform coding naturally leads to a discussion of multi-scale transforms or multi-resolution analysis.

Multi-Scale Transforms

Basics

Examples of multi-scale transforms can be found almost everywhere in the field of image and video processing. There applications include spectral analysis, image denoising, feature extraction, and, of course, image/video compression. JPEG2000, the Laplacian pyramid of Burt & Adelson [Burt and Adelson I], traditional convolution wavelet sub-band decomposition, and the lifting implementation of [Sweldens I] are all examples of multi-scale transforms. Many variations of multi-scale transforms differ in regards to how the transform coefficients are quantized and then encoded. Such variations include SPIHT by Said and Pearlman [SPIHT I], EZW (see [Shapiro I]), trellis coding (see [Marcellin I]), etc.

All multi-scale transforms operate on one guiding principle. Namely, that the efficient representation of a given multi-dimensional signal is characterized by looking at the data via a decomposition across different scales. Here a scale refers to a characteristic length scale or frequency. Coarse scales refer to smooth broad transitions in a function. The very fine scales denote the often sharp, local fluctuations that occur at or near the fundamental pixel scale of the signal.

FIG. 4A illustrates an example of different scale information for a given 1-D signal. Note that the function is actually well characterized as a smoothly varying coarse scale function f1($x$) (see FIG. 4B) plus one other function depicted in FIG. 4C, f2($x$). The function f2($x$) contains the majority of the fine scale information. Note that f2($x$) tends to oscillate or change on a very short spatial scale; whereas f1($x$) changes slowly on a much longer spatial scale. The communications analogy is that of a carrier signal (i.e. coarse scale modulating signal) and the associated transmission band (i.e. high frequency or fine scale signal). In fact by referring to FIGS. 4A-C one can see that the complete high frequency details are well characterized by f2($x$) and the low frequency or average properties of the signal are exhibited by f1($x$). In fact few signals are as cleanly characterized into specific scales as the function depicted in FIG. 4A.

In the following sections we will describe a mathematical operator known as a filter. Here the basic definition of a filter is a function of coefficients which when applied as a convolution operation to a signal will result in a series of multiplications and additions involving the values of the input signal and which will result in yet another signal. Usually the sum of the filter coefficients is either one when computing averages or zero when computing differences.

Construction of Coarser Scale Representations (1-D)

For an arbitrary multi-dimensional signal the construction of multiple scales is generally achieved through a successive application of localized averaging and sub-sampling. FIGS. 5A-D show this process for a more complicated 1-D signal. The original data itself in fact corresponds to the very finest scale herein labeled scale 1 as seen in FIG. 5A. Then an 'averaging' filter is applied across the domain and sub-sampled at a subset of the points. In FIG. 5B an averaging filter of (0.25, 0.5. 0.25) was first convolved (i.e. weighted average) across the original signal. But this produced a resultant signal that is still sampled at 20 points. Now we sub-sample the resultant function at every other point thus obtaining the signal in FIG. 5C with only 10 sample points. This is now the next coarser band or scale, i.e. scale 2. This process is often called an 'update'.

The process of averaging and sub-sampling, or 'updating', can be performed again on the function in FIG. 5C using the same averaging filter and the same sub-sampling rule to obtain the next coarser band, scale 3, as depicted in FIG. 5D. In principle this procedure can be repeated until only one sample point is left thereby representing the coarsest scale and thus the overall average of the entire original signal shown in FIG. 5A. In practice, however, the number of distinct scales is chosen ahead of time by the multi-scale transform coder. The totality of the multiple scales can be viewed as a multi-resolution pyramid where each scale corresponds to one level of the pyramid.

Construction of Coarser Scale Representations (2-D)

FIGS. 6A-E show a similar process in 2-D. The original pixel data, or finest scale, is denoted in FIG. 6A. Here the averaging filter at each scale is depicted in FIG. 6B as well as an example sub-sampling rule. In this case the sub-sampling rule is referred to as a quincunx lattice in 2-D and once again preserves half the points at each step. FIGS. 6C-D show successive steps in building the multi-resolution pyramid for a square domain via application of the filter and sub-sampling logic depicted in FIG. 6B. At each step of the process the numbers at each pixel refer to the functional value of the pyramid at a given scale. Note that the scale depicted in FIG. 6D contains almost one quarter of the sample points in the original 2-D function shown in FIG. 6A because each application of the quincunx sub-sampling reduces the number of points by a factor of two. Another popular 2-D form of sub-sampling is the standard quarter sub-sampling displayed in FIG. 6E. In order to handle boundary effects for the convolution at the edge of the pictured rectangular domain, it is assumed that the data at each scale can be extended via a mirror symmetric extension appropriate to the dimensionality of the signal across the boundary in question. The motivation and the efficacy of this will be discussed in more detail in the background section entitled "Multi-scale transforms and image boundaries".

Other Variations

The procedure can be generalized to much more sophisticated averaging filters. One such example is the 1-D averaging filter of the 9×7 Daubechies filter often used in JPEG2000 for still image compression. In this case the filter is applied as a separable convolution with one pass in the horizontal direction followed by another in the vertical direction. Note for each 1-D pass the sub-sampling rule is once again the selection of every other pixel in either a row (horizontal) or in a column (vertical). After both directional passes this reduces to the quarter sub-sampling denoted in FIG. 6E. Moreover, after the two 1-D passes (as shown in FIG. 6F) are completed, the effective averaging filter becomes that depicted in FIG. 6G with a very large support or domain. Note in FIG. 6G not all of the 81 coefficients are shown because the blank locations have amplitude values which are less than $\sim 10^{-4}$ and as such are insignificant for the purposes of the figure. Such a large filter can be particularly sensitive when dealing with very sharp edges or very spiky data such as that encountered during the residue transform coding of video codecs.

In general, the nature of the averaging filters as well as the sub-sampling logic used at each successively coarser scale can be freely chosen. However, in practice, they are selected in such a way that certain properties of the transform are obeyed (i.e. symmetry, perfect reconstruction in the limit of no quantization, compactness, etc.). Though this imposes a set of constraints (see [Daub I] and [Sweldens I]), for the purposes of this invention the nature of these constraints is unimportant. It is also possible to forego any averaging whatsoever, thereby reducing the multi-scale transform to a hierarchical sub-sampling tree such as in Binary Tree Predictive Coding (BTPC).

Prediction of the Next Finer Scale

The second critical element of a multi-scale transform is the concept of a 'prediction' filter. This filter usually exhibits some form of interpolatory properties in order to predict, to some level of accuracy, a finer scale from the parent scale just above. Consider FIG. 7A. The displayed function is identical to that depicted as the resultant scale 3 function in FIG. 6D. If for example a nearest neighbor filter as shown in FIG. 7B is convolved with the function in FIG. 7A then we have a characterization or prediction at exactly half of the next finer scale points, i.e. the points denoted by dashed circles in FIG. 7C. The half of the points determined in this fashion is called the 'alternate' or 'child' grid. The remaining half at this scale is called the 'peer' grid, i.e. the points denoted by solid circles in FIG. 7C. For the sake of completeness the set of all points in FIG. 7A at the initial coarser scale are termed the 'parent' grid.

If at the next finer scale peer grid we simply propagate the parent grid values directly down one scale then we have filled in an estimate for the entire function at the next finer scale. Taken as a whole, in this example, FIG. 7C shows final predicted result for this scale. The associated error with respect to the original scale 2 function is depicted in FIG. 6C is shown in FIG. 7D. In practice one can select from any number of prediction filters in order to estimate a finer scale from a coarser one.

If one were to continue the process based on the reconstructed result shown in FIG. 7C by applying the prediction filter displayed in FIG. 7E, the reconstructed result would be as shown in FIG. 7F. The associated error with respect to the original scale 1 function is depicted in FIG. 6A is shown in FIG. 7G.

Note in the above example the prediction of the alternate and a peer grid was done separately. Let us focus on the peer grid estimation. Instead of directly propagating down the scale 3 values to the scale 2 peer grid as in FIG. 7C, the peer grid prediction can be accomplished through a form of reverse averaging called 'inverse updating'. In this case either the inverse update is a function of more than one scale 3 parent grid points or is also a function of the predicted child values estimated on the alternate grid, i.e. the squares in FIG. 7C. Because of this distinction the process of estimating the child grid is often termed 'prediction' and the process of estimating the peer grid is termed 'inverse update'. In the same vein the original process of creating coarser scales via averaging is often called 'update'.

Multi-Resolution Pyramids

Laplacian Pyramid

The above principles of coarser scale construction and finer scale prediction are useful in a variety of image and video processing applications other than compression, i.e. denoising, image enhancement, signal analysis, and pattern recognition. However, in the case of image or video compression the two principles are combined with quantization in terms of a forward and an inverse transform. For the sake of clarity and brevity, a discussion based on the Laplacian pyramid paradigm of Burt and Adelson [Burt and Adelson I] will now be presented. Other strategies, including the traditional wavelet sub-band filters based on either convolution [Daub I] or lifting implementations [Sweldens I], differ mostly in their use of matched transform pairs for the update and the predict functions. In fact the lifting formulation shows how any generalized wavelet filter bank can be reduced to a series of combinations of two (or more) update and predict functions in a multi-scale scheme.

Forward Transform

In the forward transform a pyramidal decomposition is constructed where each level of the pyramid corresponds to a successively smoother representation or coarser scale of the image (see FIG. 8 for a generalized 2-D depiction). The method itself involves the same logic of averaging plus sub-sampling already described as part of the update process. As previously mentioned the selection of an appropriate update filter can be widely varying. Usually certain desired properties in terms of support size, response to noise, the degree of smoothness, and the amenability to inversion all play a role in the selected form of the update filter. The resultant scale after one step of averaging and sub-sampling can be referred to as a low-pass' version of the image.

FIG. 8 depicts the averaging process repeated N−1 times, thus constructing a pyramid of N levels. The bottom level of the pyramid or finest scale (scale 1) is the original image (or residue in the case of video) data. The top level represents the coarsest scale. In FIG. 8, where the level-by-level sub-sampling is the quarter sub-sampled lattice as described in FIG. 6F, the top level will represent points which are the effective weighted average over an M×M domain of sample points. Note that at higher and higher scales the number of sample points is reduced as a result of the sub-sampling procedure. It should also be noted that in some applications there might be no averaging whatsoever. Then the process of constructing the forward transform pyramid is reduced to that of a hierarchical sub-sampling such as in Binary Tree Predictive Coding (BTPC).

Inverse Transform

The stage is now set for the inverse transform. For any codec employing a multi-scale transform, the decoder side must start from an initial set of transmitted data received from the encoder. In the multi-scale paradigm this is the coarsest scale of averages, i.e. scale M or the top level of the pyramid constructed upon completion of the forward transform. If there are a sufficient number of levels in the pyramid the top-level will generally contain a relatively small number of sample points.

If the encoder-decoder pair does not perform quantization (i.e. lossless compression) then an exact representation of the top-level averages must be sent. However, if quantization is present then the top-level averages will be transmitted with reduced precision and hence less bits. For the moment we will focus on the no quantization scenario.

The next step in the inverse transform involves the predict functionality described in the previous section entitled "Prediction of the next finest scale". In this way an estimation of the next finer scale, scale M−1, in the pyramid is calculated. The difference between the actual values at scale M−1 and the estimated values obtained via application of a set of predict filters to the parent scale, scale M, is in fact the error residuals. In the case of lossless compression, the encoder must send the exact representation of the error differences to the decoder. Then the decoder, which had started with the same parent scale data as the encoder, and after applying the same prediction logic as the encoder, will add the received error corrections back onto the estimated surface for scale M−1. If there has been no quantization the resultant function will be the original scale M−1 function constructed on the way up in the forward transform.

Similar logic is then applied to the formation of the remaining lower or finer levels of the pyramid. The process ends once the corrections for the bottom-most level of the pyramid, i.e. the original pixel data, are received and then added back onto the final predicted surface. Note that as previously mentioned, in a generalized version the predict function may in fact be split up into a predict step involving the alternate or child grid and an inverse update step involving the peer grid.

Inverse Transform and Reconstruction in the Presence of Quantization

In the presence of quantization the process is slightly more complicated. Remember that if high compression ratios are desired then having to send the exact representation of the error differences at each level will be very costly in terms of bits. To avoid this it is necessary to quantize the data in such a way that reasonable quality is achieved on the decoder side. FIG. 9A-C depicts an example of quantization. In FIG. 9A an example of a set of quantization intervals and their representative values are depicted. In FIG. 9A, for all the error differences, E, if their value lies between $-Q \leq E \leq +Q$ the quantized result will be zero. For all E such that $+Q < e \leq +2Q$ the quantized result would be $+3/2\ Q$ and so on. The result of applying the quantization function described in FIG. 9a to a set of 2-D sampled input data (as seen in the top portion of FIG. 9b) where Q=5 is also displayed in FIG. 9b at the bottom of the page.

With quantization the decoder will now receive a quantized approximation of the top-level averages which we will denote as scale Q(M). The error residuals between the real scale M values and Q(M) are deemed acceptable by the encoder for a given bit rate limitation. Now the decoder applies the aforementioned prediction machinery based on using Q(M) as the parent scale. This results in an estimated surface for scale M−1 which we will denote as P(Q(M)). The difference between the original M−1 and P(Q(M)) must now be quantized and sent to the decoder. After receiving the appropriate quantized error data and adding back to the corresponding predicted surface the decoder obtains a approximation of scale M−1 which can now be called Q(M−1). This procedure is repeated multiple times until a quantized approximation of scale 1 is achieved. The resultant approximation of scale 1 is in fact an approximation of the original input data and is thus the data that the decoder will ultimately display or represent. If the encoder-decoder pair is efficient at the prescribed bit rate the resultant reconstruction will exhibit a tolerable amount of perceptual error.

Many of the differences present in modern multi-scale transforms involve different approaches to the problem of optimal quantization in order to obtain the best possible reconstruction for a given bit rate. In addition, many conventional sub-band encoders will also separate each level of the pyramid into multiple sub-bands through an application of low-pass (i.e. averaging) and high-pass (i.e. differencing or predict) filters. Then the corresponding inverse transform with quantization involves separate logic for the reconstruction of a given sub-band at each finer scale of the multi-resolution pyramid. However, the basic framework of the forward and inverse transform is much the same as described above in sections A-C.

Multi-Scale Transforms and Image Boundaries

Rectangular Domains

Inherently in all practical situations any multi-dimensional image will have finite extent or domain. In the 2-D case that is to say the image has a finite width and height and hence a finite area. In most applications this domain will be rectangular in nature. As seen in FIG. 10A the 2-D image only specifies values for the pixels located between (0,N) in the x-direction and (0, M) in the y-direction. As all multi-scale transforms involve the application of either update or predict filters during the forward and inverse transforms, the codec must be mindful of the image boundaries. In fact this is also the case even when the image is broken up into rectangular sub-domains or 'blocks', provided data lying across a block boundary is considered independent of the data inside the block.

FIG. 10B shows one of the problems inherent in applying a filter operation, i.e. convolution, of any form near a rectangular boundary. In this example the support of the filter is 5×5 pixels. As such, for pixels located on the border there will be corresponding positions in the filter (i.e. the 'over-hang') that have no source in the original image for the purposes of the multiplication and subsequent addition operations which are involved in the application of a filter to an image. In many applications involving image or video compression, the standard procedure is to extend or pad the domain at locations where the filter support lies outside the image domain. The padding is accomplished by either filling in zeros or by replacing with a low-pass version of the interior data. Generally, however, the reconstructed signal will often exhibit undesirable high frequency artifacts near the boundary and the transform will lose efficiency near the border.

Another method is to apply a mirror image reflection (or 'symmetric') boundary condition. The procedure is outlined in 1-D in FIG. 10C. When the 'missing' image data for filter locations lying outside the block are replaced in such a manner then the multi scale transform is guaranteed to be precisely invertible [Sweldens I] and the efficiency of the transform is maintained. The outlined procedure can be extended to 2-D and higher provided the boundary is rectangular. Similarly one can also define other meaningful extensions such as periodic extensions.

Arbitrary Shaped Domains

The present invention relates to the efficient application of multi-scale transforms to arbitrary shaped domains of an N-dimensional image. The above procedure of padding or extension is suitable only for rectangular domains. For instance the approach of using a 2-D symmetric extension is not feasible for arbitrarily shapes as in such cases a true 2-D symmetric extension cannot even be defined. In FIG. 11 an example of generalized non-rectangular domains in 2-D is shown. Such shaped domains are encountered whenever an image processor segments an image frame and in fact MPEG-4 supports arbitrarily shaped video object layers. In principle the entire domain of the signal itself may be arbitrarily shaped or on the other hand the signal domain may be partitioned into a collection of arbitrarily shaped regions.

The techniques suggested to code a signal on an arbitrary shaped domain, as suggested by the MPEG-4 standards committee, include: difference predictive coding (DPCM) of vertices on a polygonal mesh, shape-adaptive DCT (SADCT), and separable wavelet transform with either symmetric, periodic boundary conditions, zero padding or low-pass extrapolation. We will now describe each technique in detail.

Coding of Vertices of 2-D Polygonal Meshes

One scheme that has been proposed for coding functions on arbitrary shaped domains is coding for polygonal meshes (see [Berg I]). The domain is tessellated into a grid of regular polygons (for example triangles). The function is assumed to be well represented by its values at the polygonal vertices (termed nodes). These values are then differentially coded. Typically, the function values are linearly interpolated within the polygon. MPEG-4, for instance, supports coding of triangular 2-D meshes. The size of the polygons determines the accuracy of the coding. Large polygons produce few nodes and thus the coding is bit-efficient. The function is however very poorly approximated within large flat regions. If the polygons are small, the function is well approximated, but the large number of nodes results in very large bit costs for transmission.

Shape Adaptive Discrete Cosine Transform (SA-DCT)

Another way that has been proposed to code functions on arbitrary shaped domains is the so-called Shape Adaptive DCT (see [Sikora I]). The domain is partitioned into fixed size blocks. Some blocks will be in the interior and some blocks will contain boundaries. The interior blocks are coded using standard DCT techniques. For the blocks at the boundaries, first a 1-D DCT is applied to the rows. The rows are of differing lengths since each one can contain an arbitrary number of interior pixels. The transformed rows are then re-ordered from longest to shortest and then a 1-D DCT is applied to each of the columns. The partial matrix is then coded using standard entropy techniques.

The advantage of the standard DCT approach comes from recognition that the lowers frequencies of the transformed matrix carry the visually significant information and accuracy in the high frequency coefficients can be sacrificed with no significant effect, In the SA-DCT, The columns of the re-ordered matrix contain both low(for the longer vectors) and high(for the shorter ones) frequency information. Thus, the transformed matrix does not have clearly identified low frequency and high frequency components. This significantly impacts the performance of the SA-DCT. Even though it is an allowed mode within the MPEG-4 standard, to date no commercial implementation of MPEG-4 includes the SA-DCT.

Separable 1-D Wavelet Coding with Padding

Yet another technique that has been proposed for coding functions on arbitrary domains is padding for the discrete wavelet transform or DWT (see [Kaup I] and [Li I]). As in the previous discussion, the image is broken up into square blocks of some fixed size. The blocks that are in the interior are coded using standard methods. The blocks that contain boundaries are handled in the special way. Each row in the block is padded with values to make a row of fixed length, then standard DWT (or DCT) techniques are used to code the block. Upon the decoding, the extra pixels are simply discarded. There are several choices for padding the row: symmetric extension, periodic extension, padding with zeros, and low pass extrapolation.

In all cases, this technique suffers from several problems. Since all the points in the block are coded, for a jagged boundary this will result in a significantly higher number of pixels coded than there really are in the domain of interest. Thus, significantly impacting the efficiency of the coding. Furthermore, the padded function might or might not have the same properties as the original function, leading to a reconstruction that is actually quite poor for the function on the domain of interest.

Impact of Internal Boundaries or Features

Another vexing problem for multi-scale transforms relates to the presence of sharp internal features or transitions within the domain of interest. Implicit in all multi-scale transforms is the premise that smoother representations of the signal, i.e. coarser scales, are useful in the prediction of the finer scale details or features. This is in general not the case at a very sharp internal edge boundary or feature. FIG. 12A-D shows several examples of such features: a trough or valley, a sharp edge transition or 'cliff', a local maximum, and an irregular surface.

Unless the quantization interval is very small and hence expensive, the reconstructed surface will be very erroneous in the neighborhood of these kinds of features. Of course one could finely quantize the error differences and code enough data in order to better approximate the input signal, but if the image domain contains many such sharp internal features this could become very costly in terms of bits. Even if the averaging and prediction filters are made more sophisticated such sharp internal transitions will still remain troublesome and cause the codec to become inefficient. Interestingly enough it is often the preservation of existing sharp transitions or edges in natural images that most greatly impacts the perceptual quality of the reconstructed signal.

In some cases others such as W. Sweldens [Sweldens II] have considered formulations where the prediction filters are adaptively altered as the central point approaches a sharp edge transition at a given scale. FIG. 13 displays the basic concept behind this method in that the support and hence order of the prediction filter tends to shrink as the edge transition is approached. Here order refers to the degree of the polynomial predict filter where order one is linear, two is quadratic, three is cubic, and so on. Of course this technique is only applicable when an accurate and robust edge detection method is available. Moreover, in practice this technique achieves relatively small nominal gains.

BRIEF DESCRIPTION OF THE DRAWINGS

FIG. 1A shows a continuous 1-D signal.

FIG. 1B shows the same 1-D signal discretized at 60 sample points.

FIG. 1C shows that we could send an imprecise representation of the amplitudes, which would require less bits but would result in poor reconstruction.

FIG. 1D shows a generating equation.

FIG. 1F shows the function depicted in FIG. 1B as slightly altered.

FIG. 1G shows the resultant reconstruction error.

FIG. 3 shows Haar functions.

FIG. 5B depicts an averaging filter convolved across the original signal.

FIG. 5C depicts sub-sampling of the resultant signal to obtain a next coarser band or scale (scale 2).

FIGS. 6A-6E show a similar process in 2-D.

FIG. 6F depicts a filter for two 1-D passes.

FIGS. 9A-9C depict an example of quantization.

FIGS. 16A-16I show an example of how, in the current embodiment of the invention, a transform will employ alternative rules when approaching a boundary.

SUMMARY OF THE INVENTION

Figure 1E:
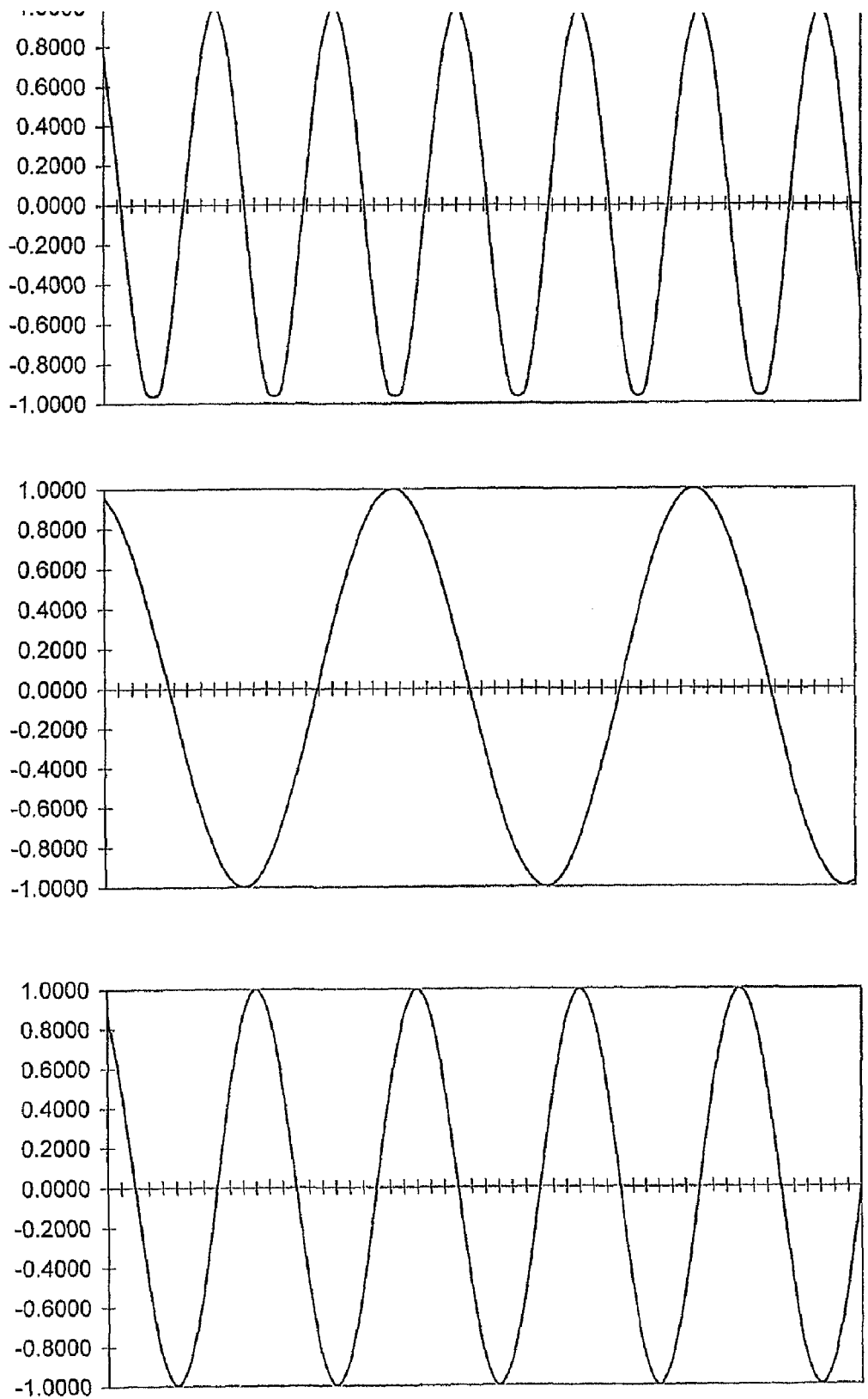
FIG. 1E shows three basis functions.
Figure 2A:
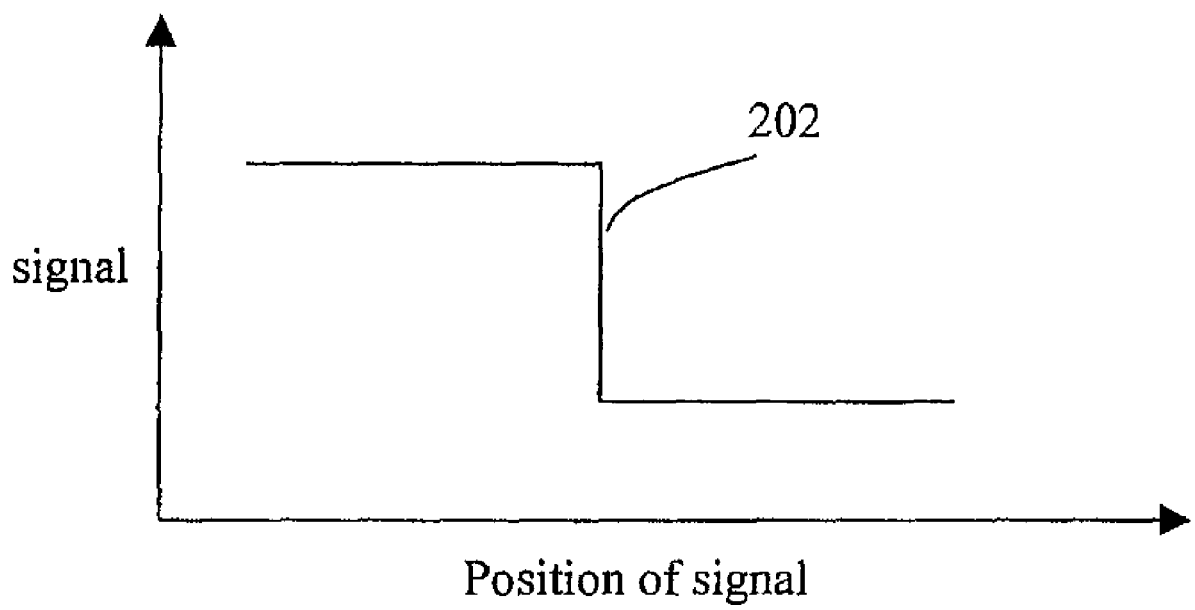
FIG. 2A shows a continuous signal with a very sharp transition or edge in the domain.
Figure 2B:
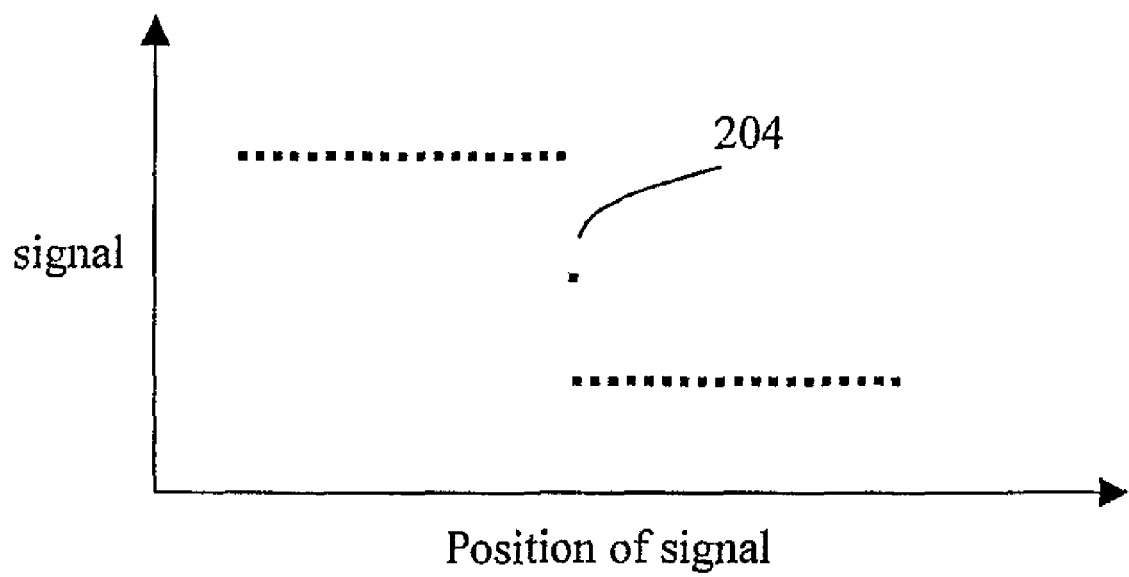
FIG. 2B shows the discretized version of the continuous signal exhibited in FIG. 2A.
Figure 2C:
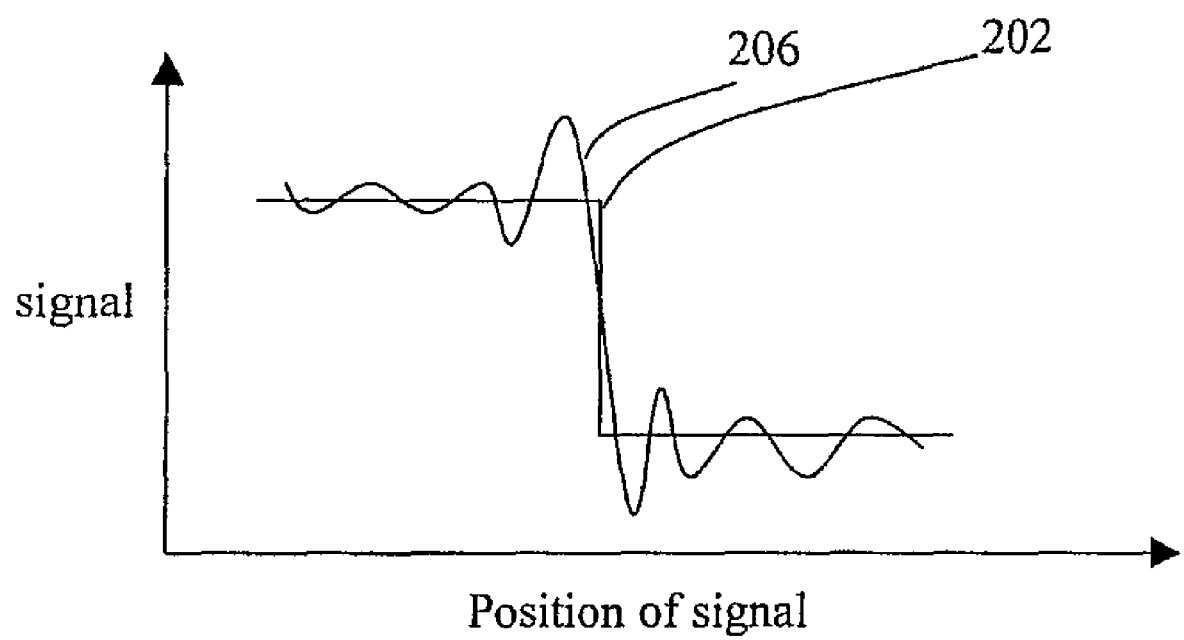
FIG. 2C shows the reconstruction results based on maintaining a small number of coefficients.
Figure 2D:
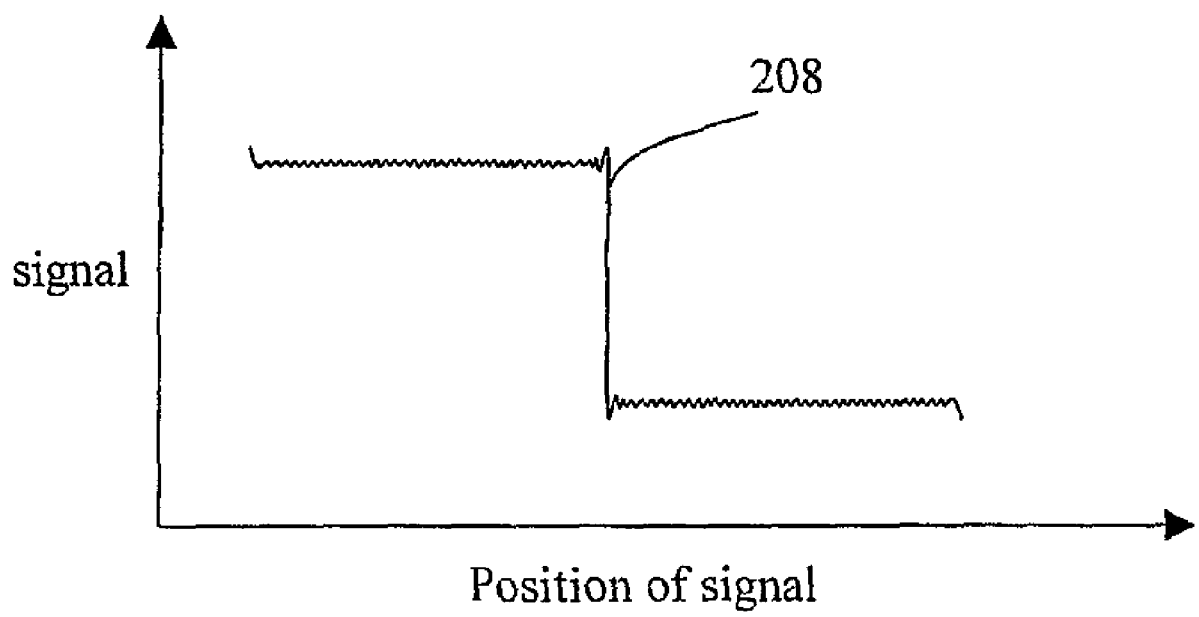
FIG. 2D depicts a case where many coefficients are used and the associated residual error is very small.
Figure 4A:
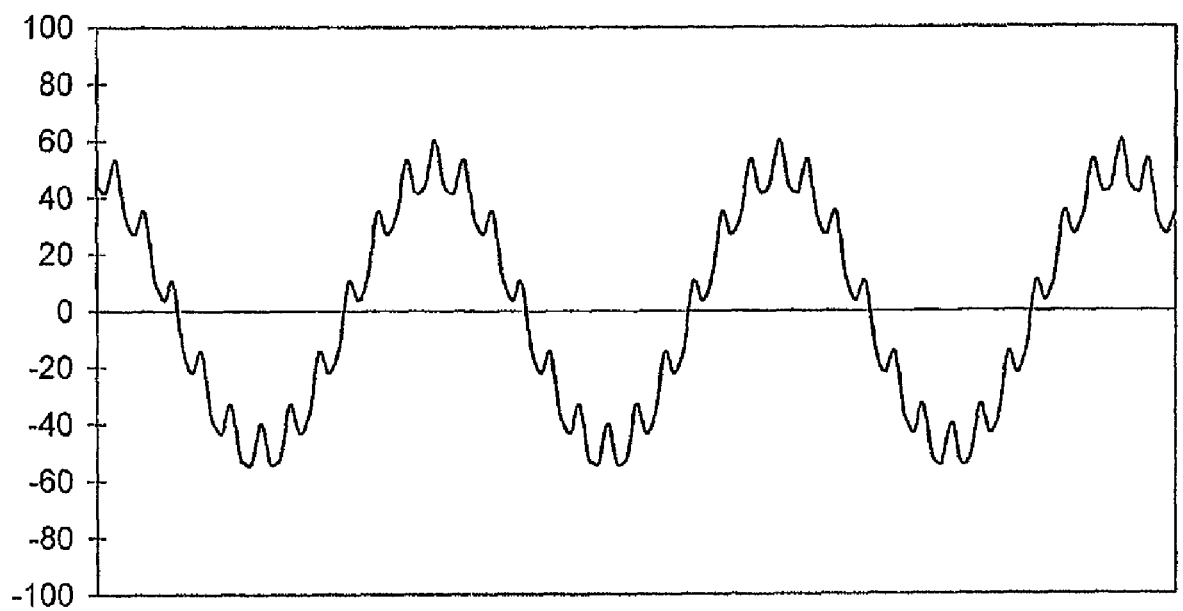
FIG. 4A shows an example of different scale information for a given 1-D signal.
Figure 4B:
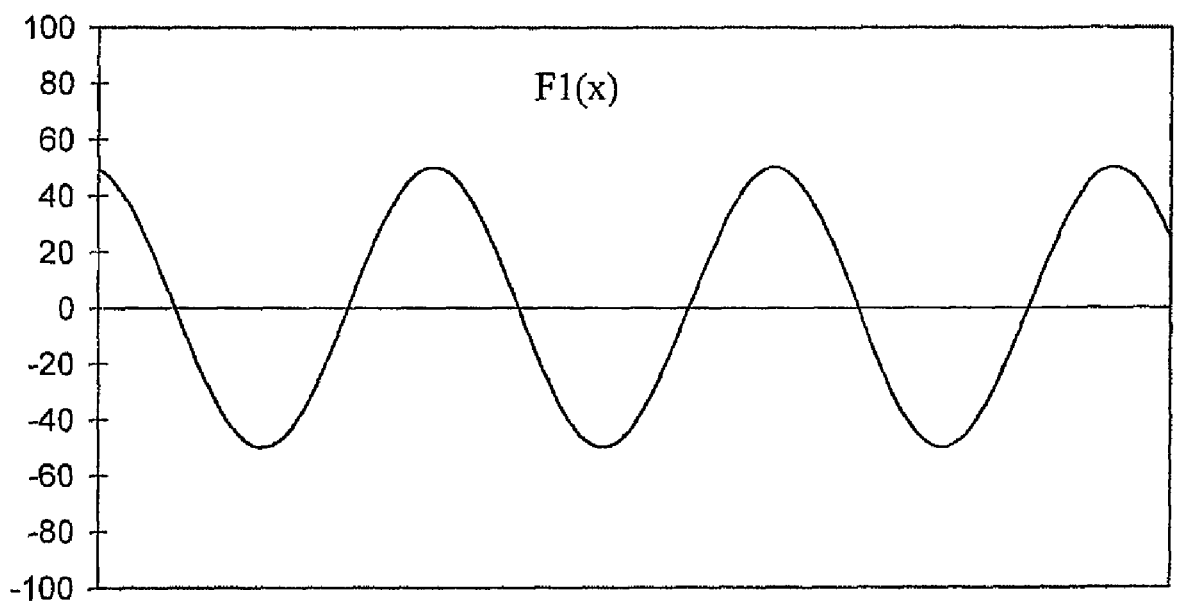
FIG. 4B shows a smoothly varying coarse scale function f1($x$).
Figure 4C:
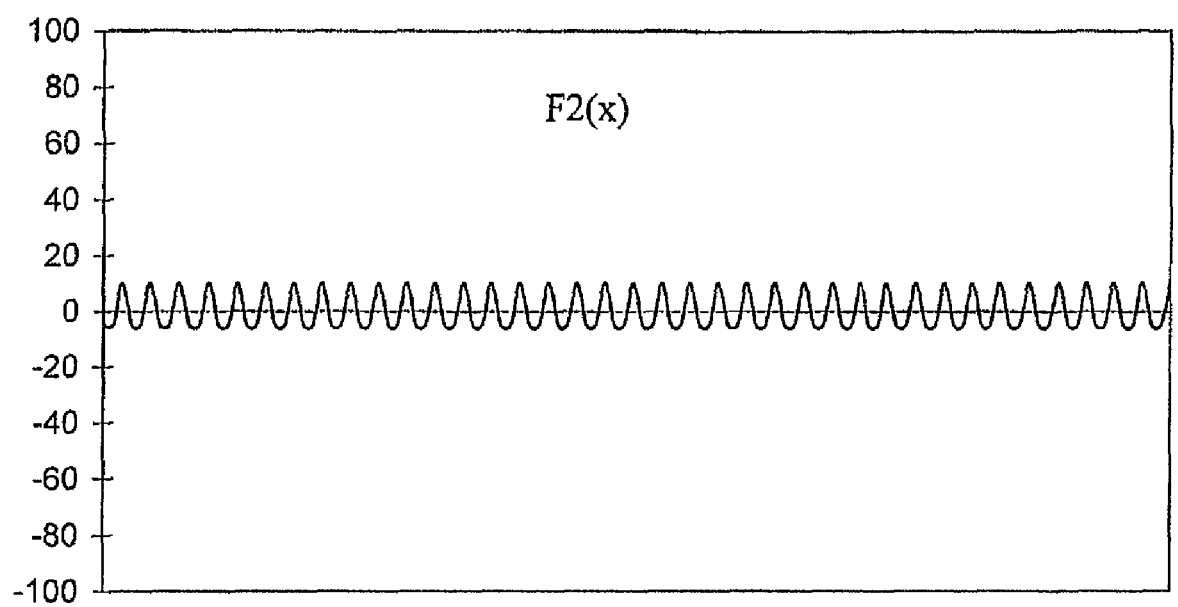
FIG. 4C shows one other function f2($x$).
Figure 5A:
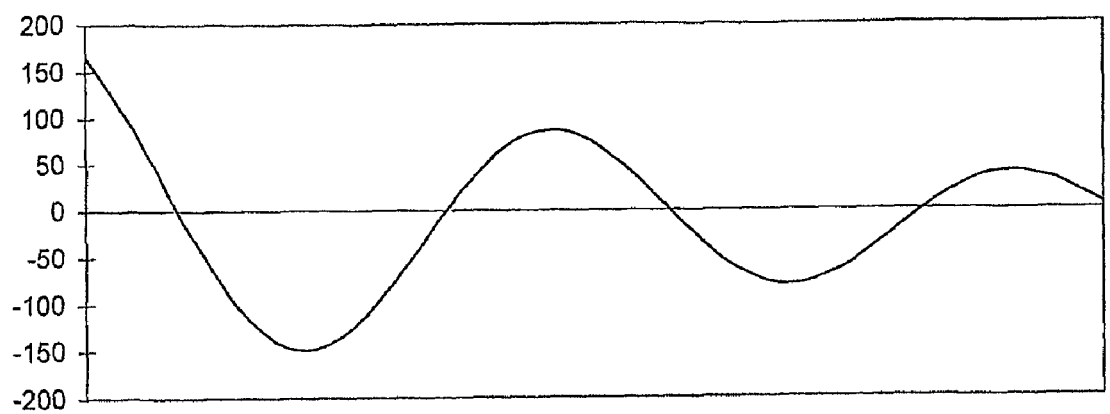
FIG. 5A shows the original data for a 1-D signal (scale 1).
Figure 5D:
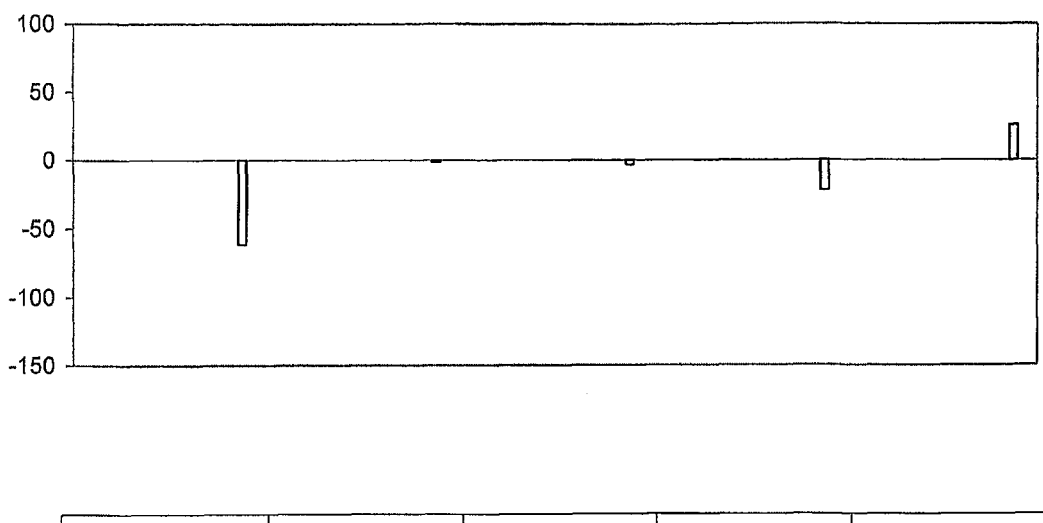
FIG. 5D depicts a next coarser band or scale (scale 3).
Figure 6A:
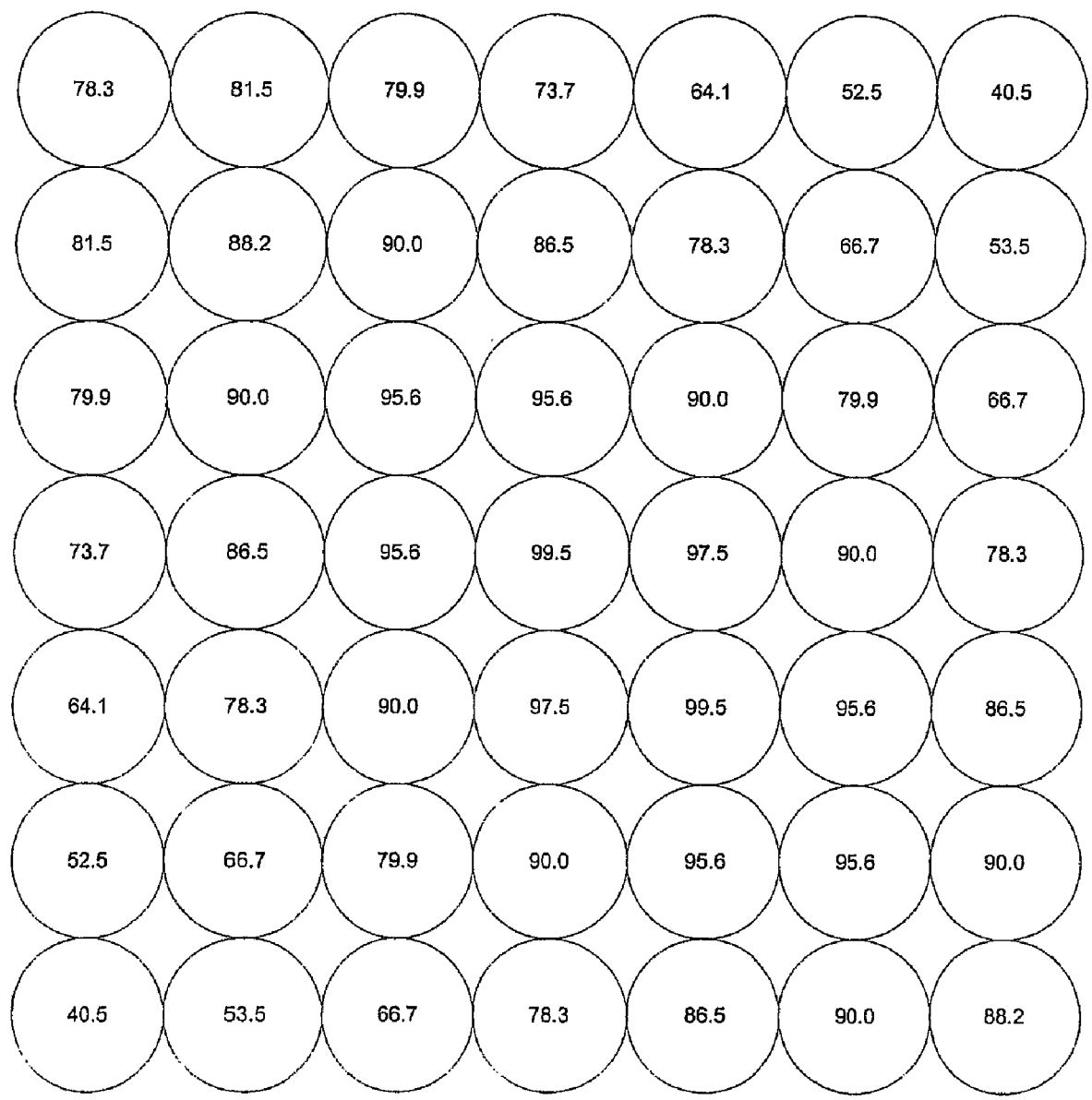
Figure 6C:
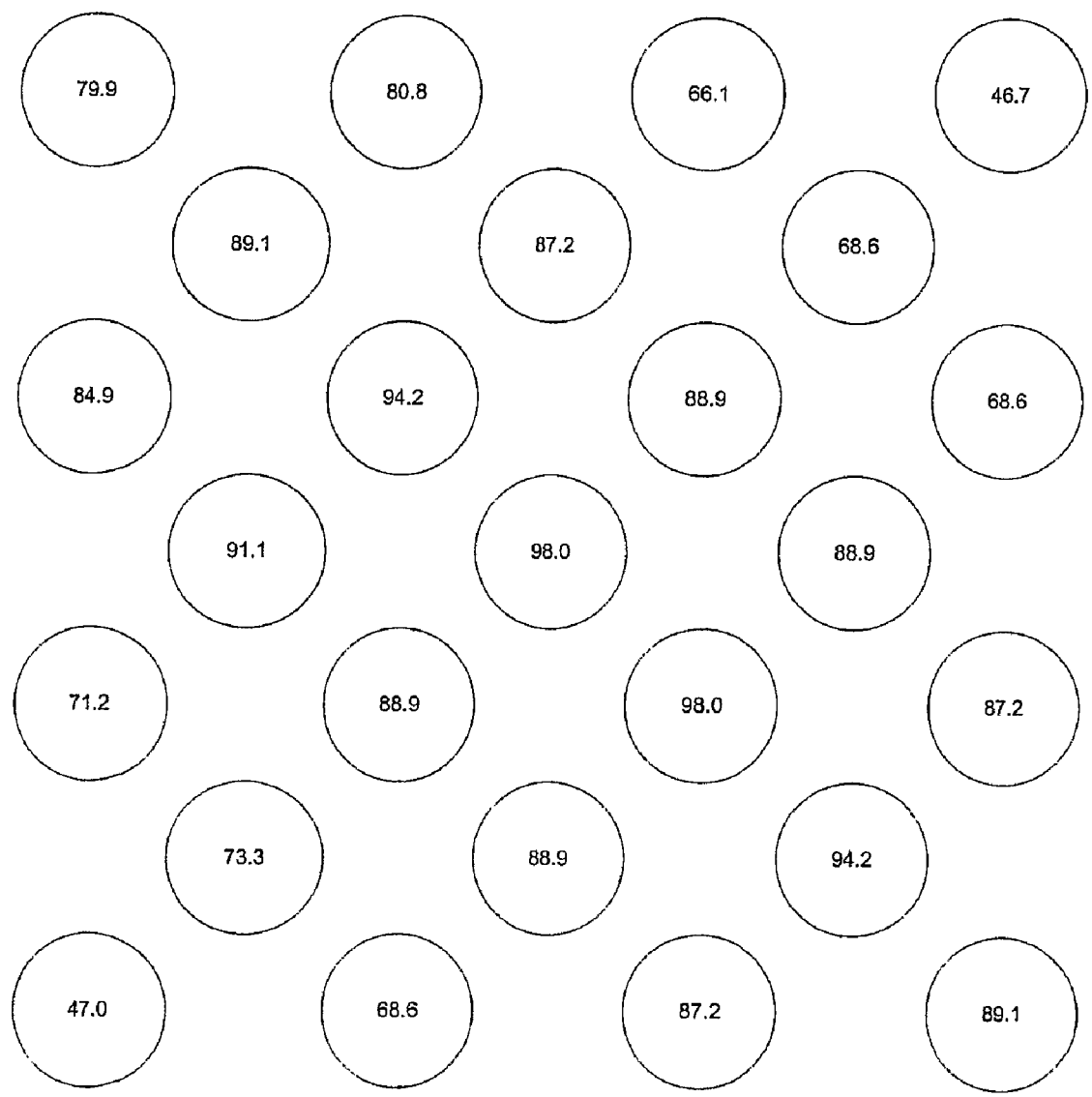
Figure 6D:
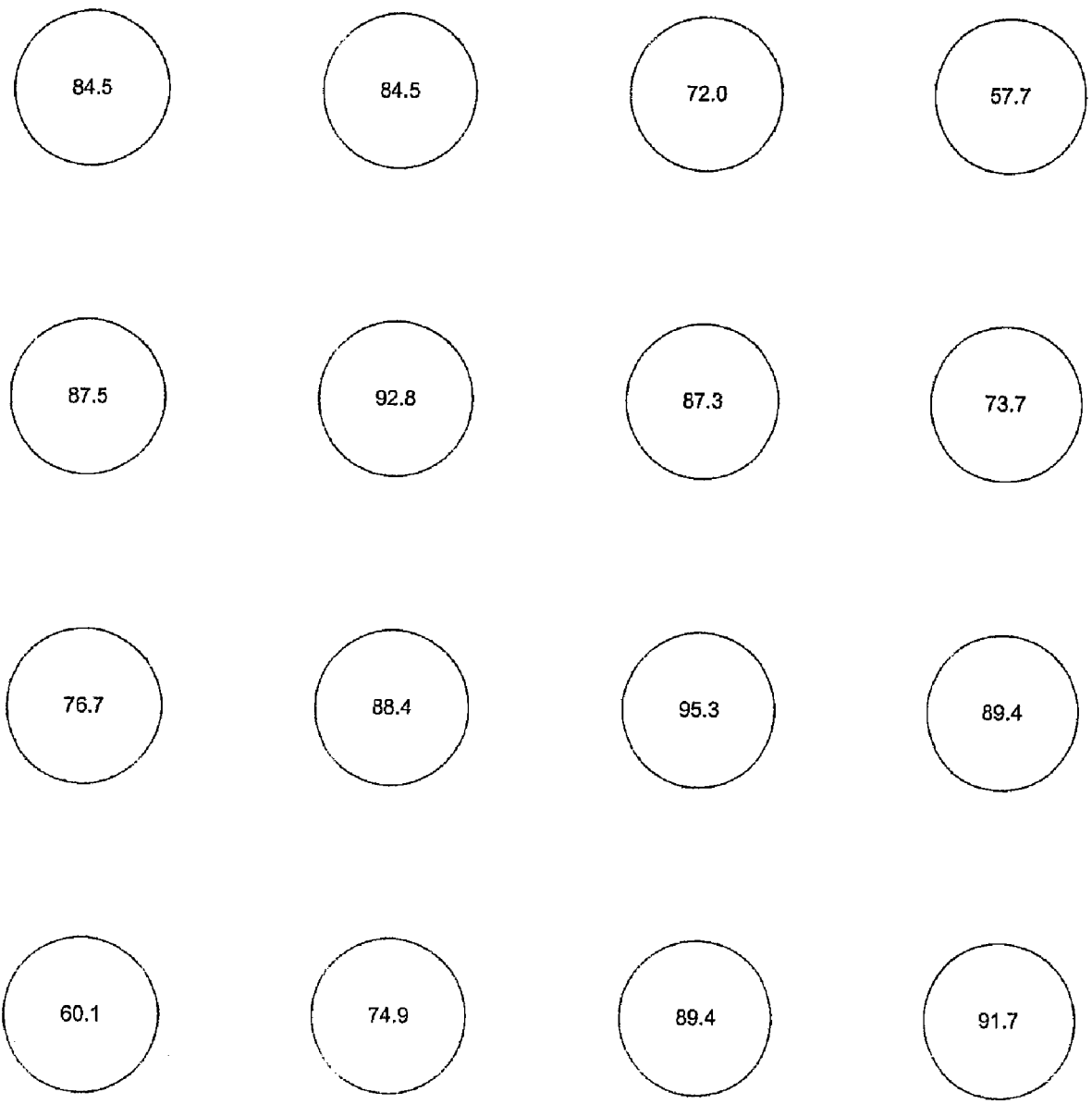
Figure 6G:
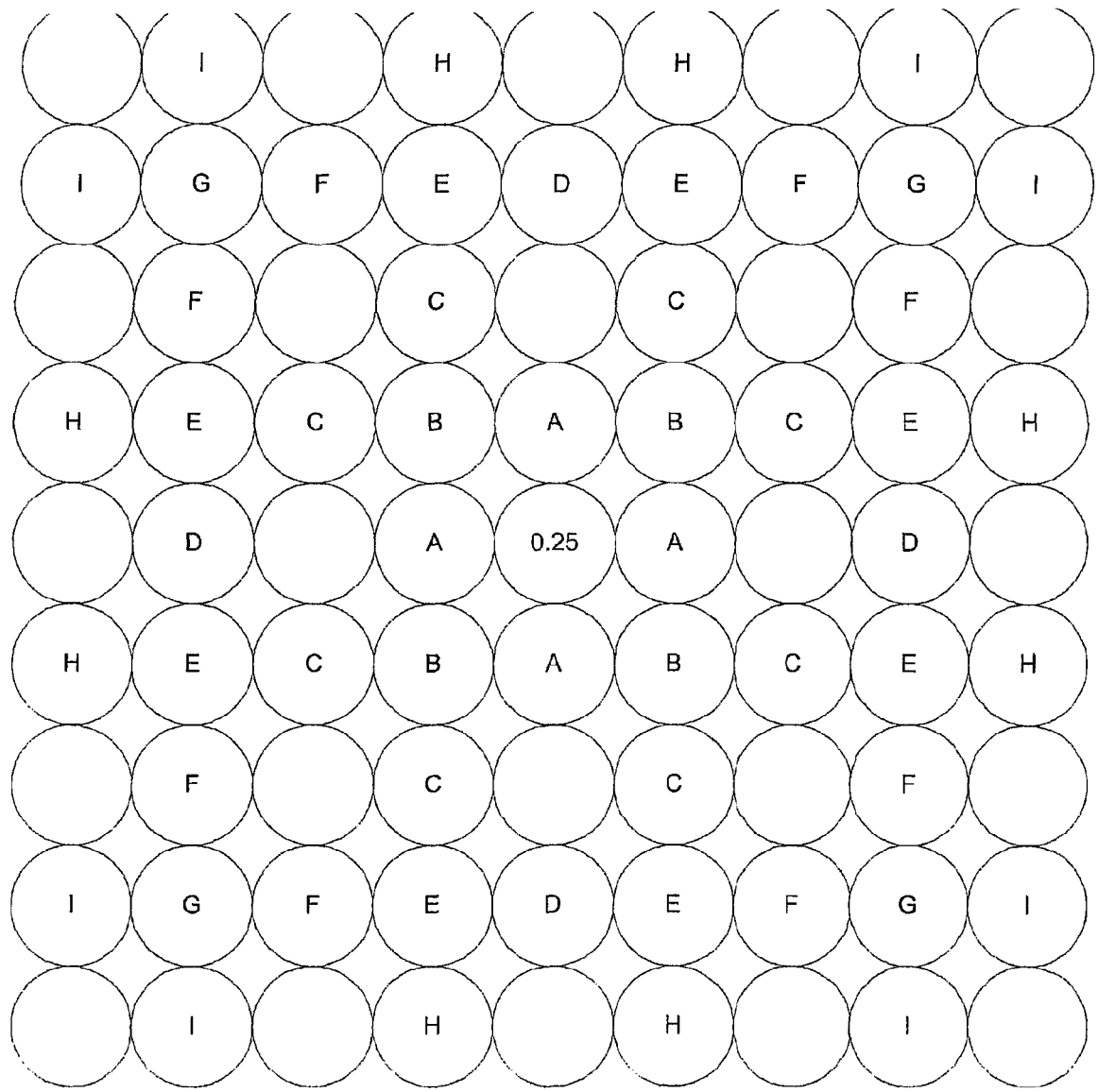
FIG. 6G shows the effective averaging filter with a very large support or domain.
Figure 7A:
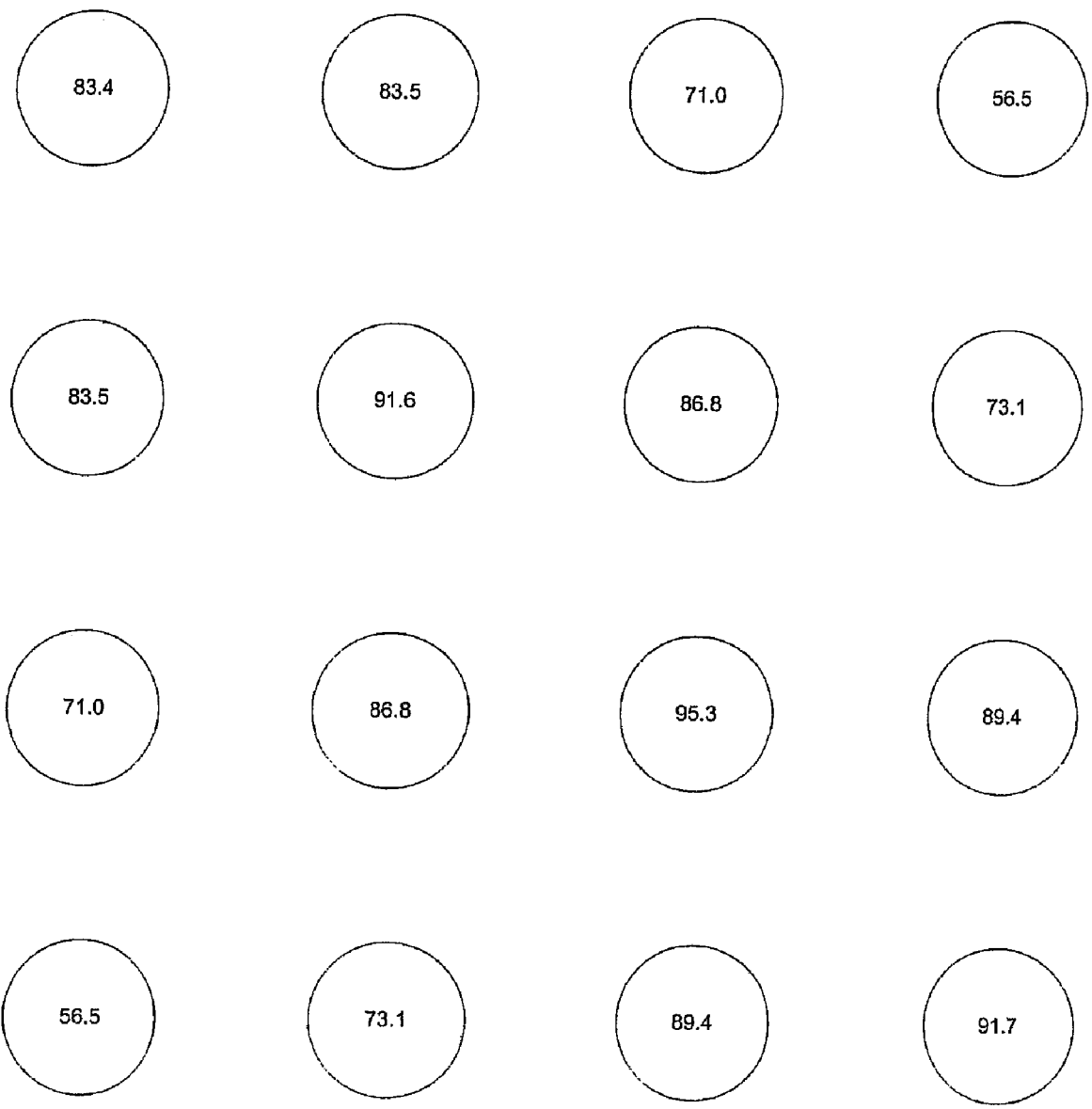
FIG. 7A displays a function.
Figure 7:
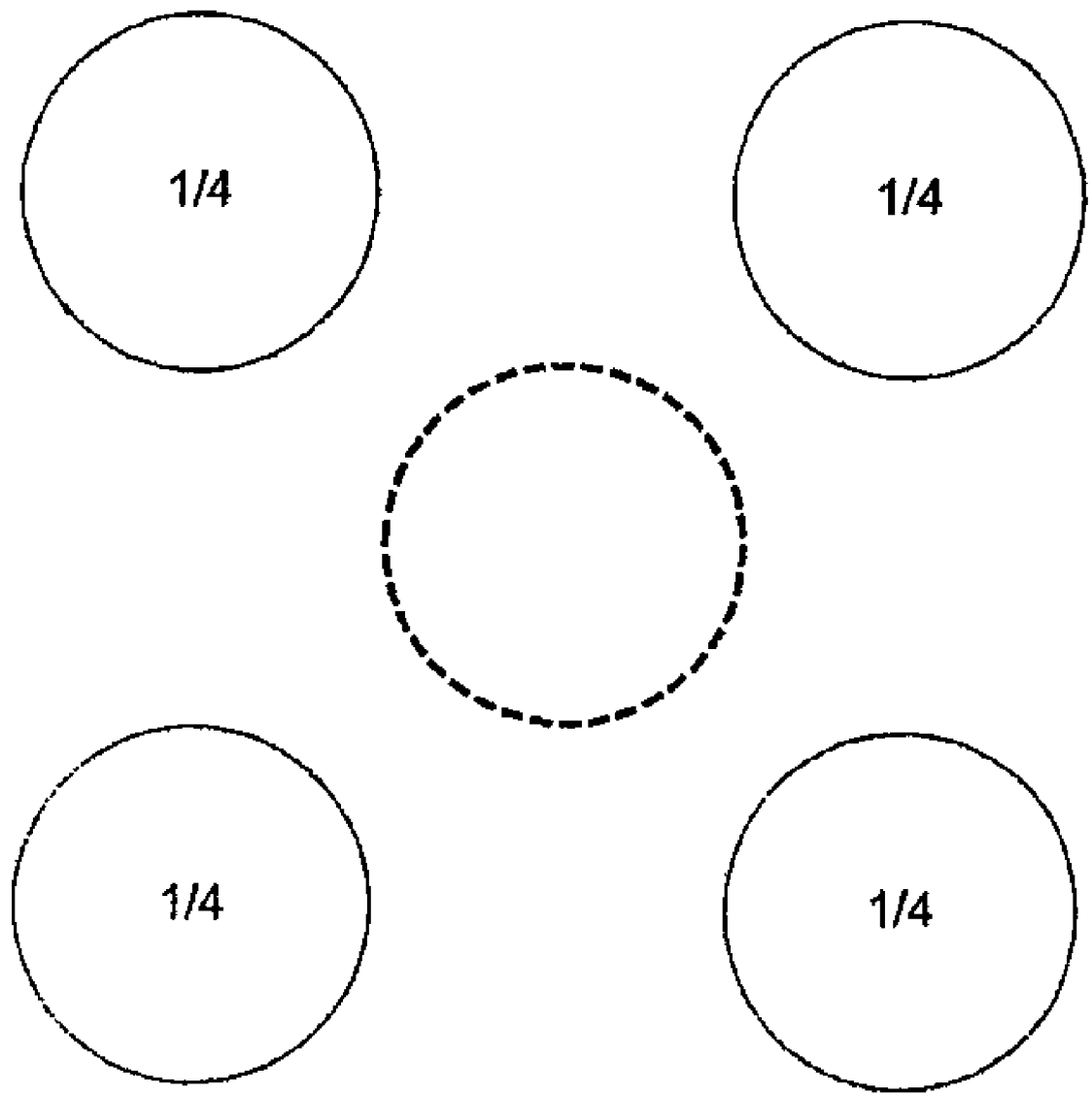
FIG. 7B shows a nearest neighbor filter.
FIG. 7C shows a reconstructed result after convolving the filter of FIG. 7B with the function of FIG. 7A.
FIG. 7D shows an associated error with respect to the original scale 2 function depicted in FIG. 6C.
FIG. 7E shows a prediction filter.
FIG. 7F shows a reconstructed result after applying the prediction filter of FIG. 7E on the result shown in FIG. 7D.
FIG. 7G shows the associated error with respect to the original scale 1 function depicted in FIG. 6A.
Figure 7C:
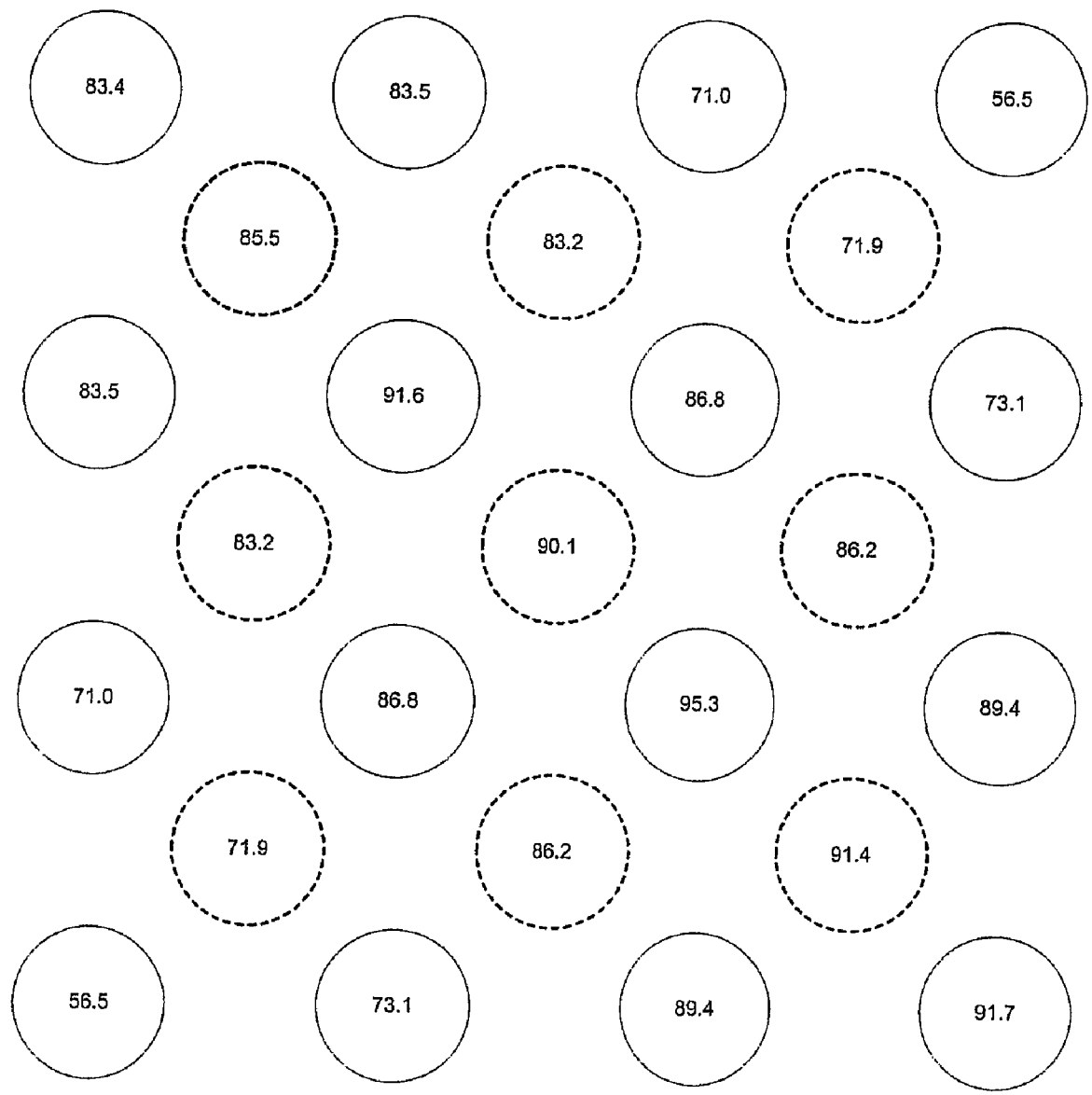
Figure 7D:
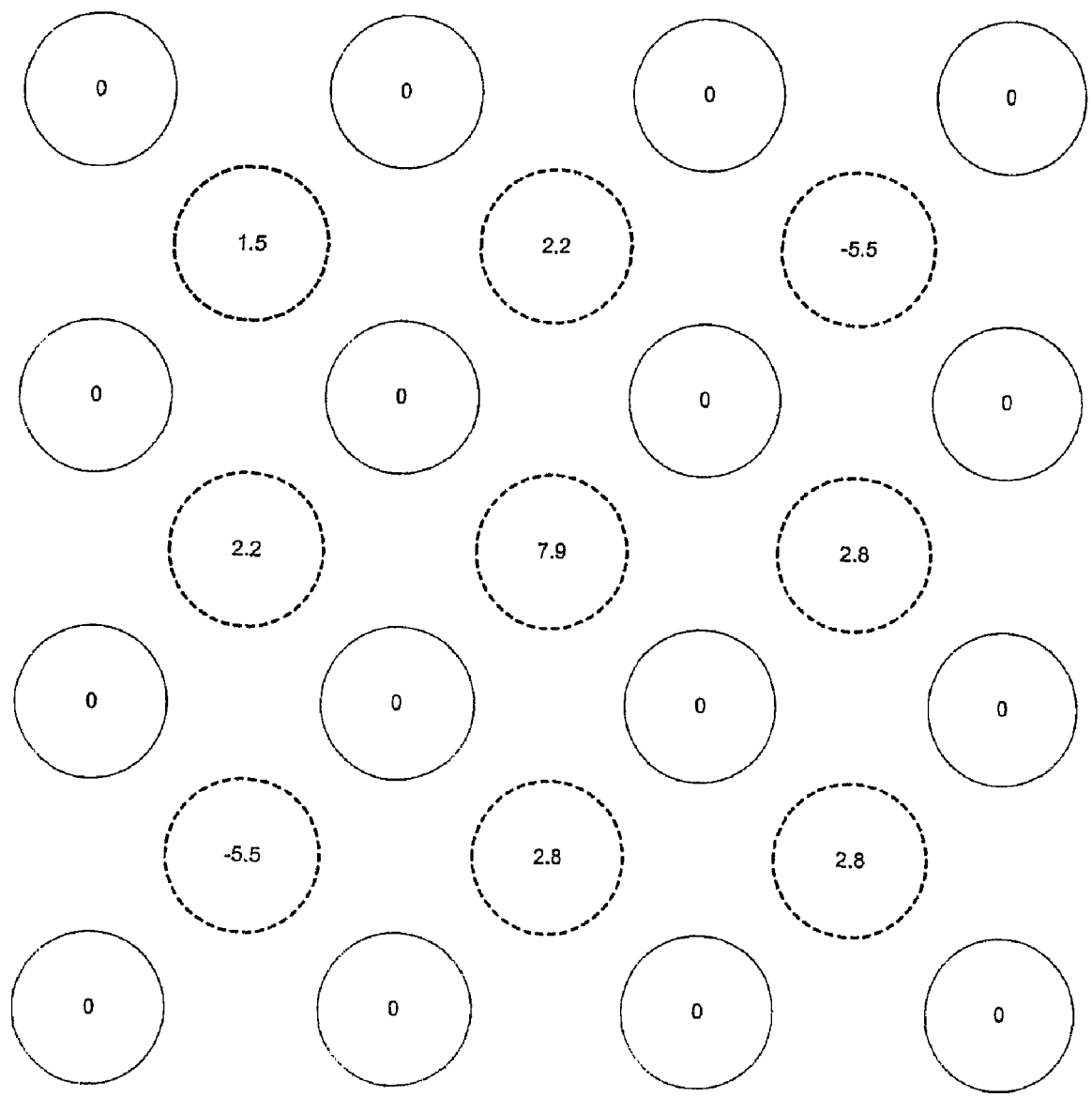
Figure 7E:
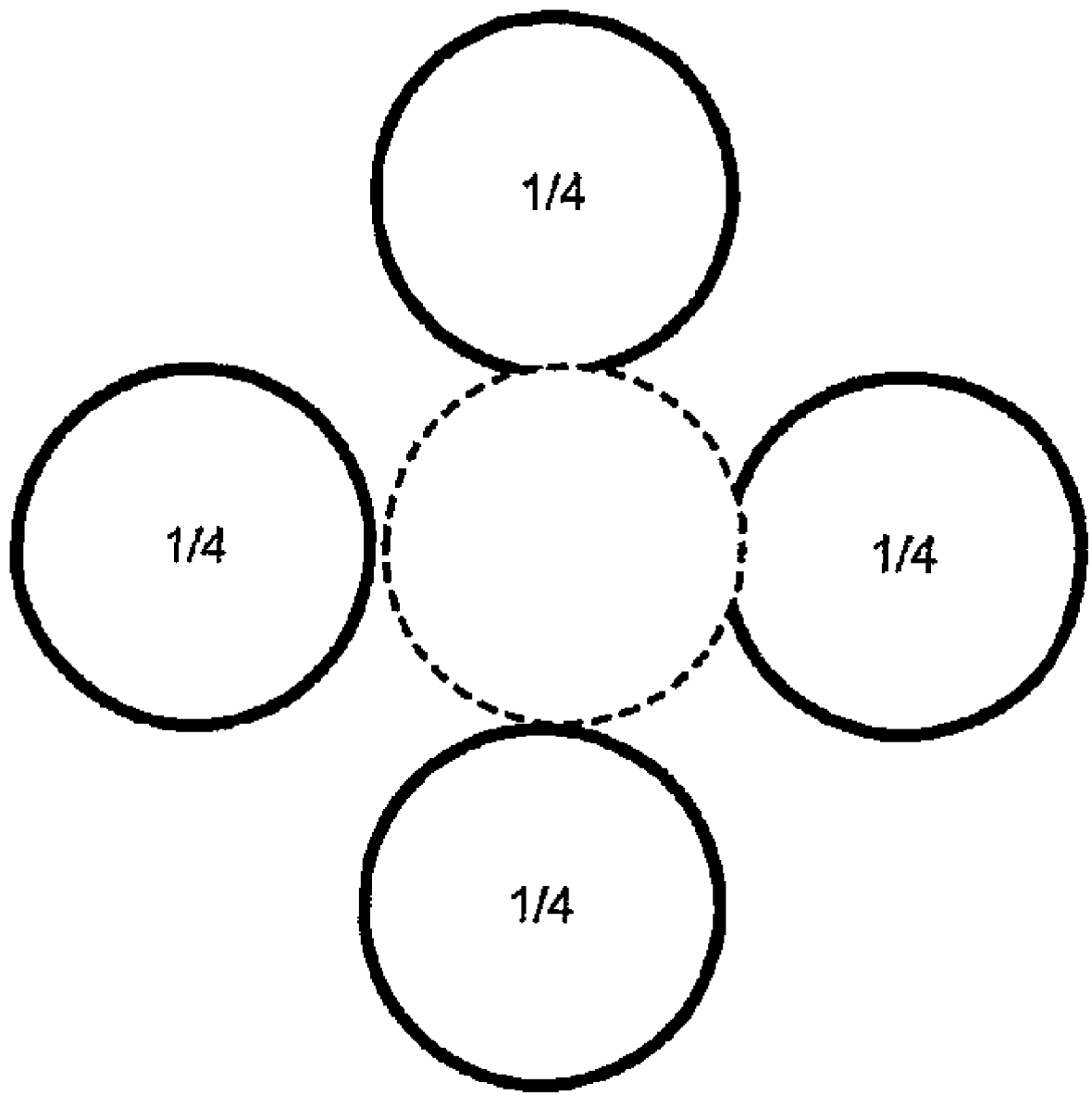
Figure 7F:
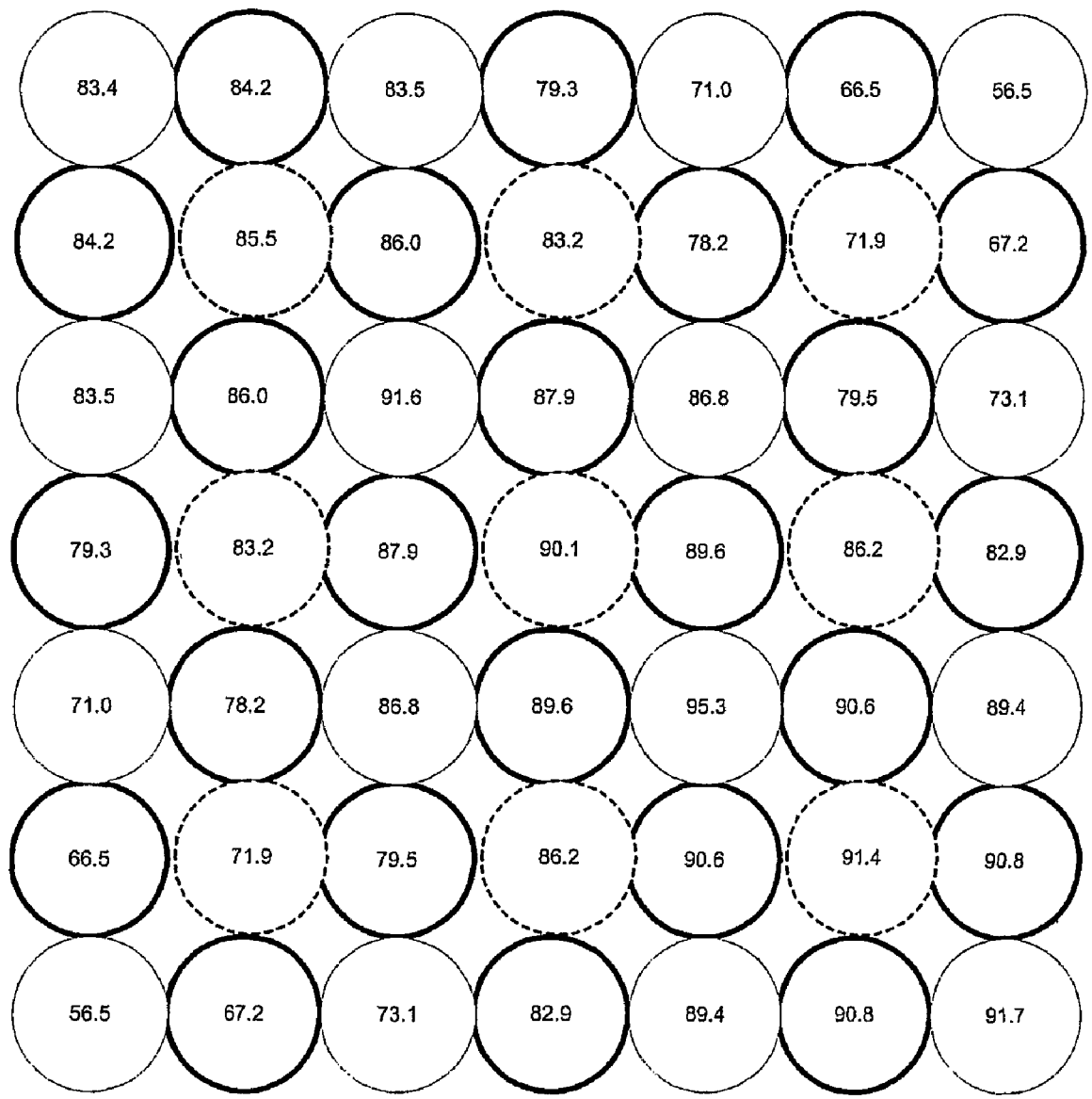
Figure 7G:
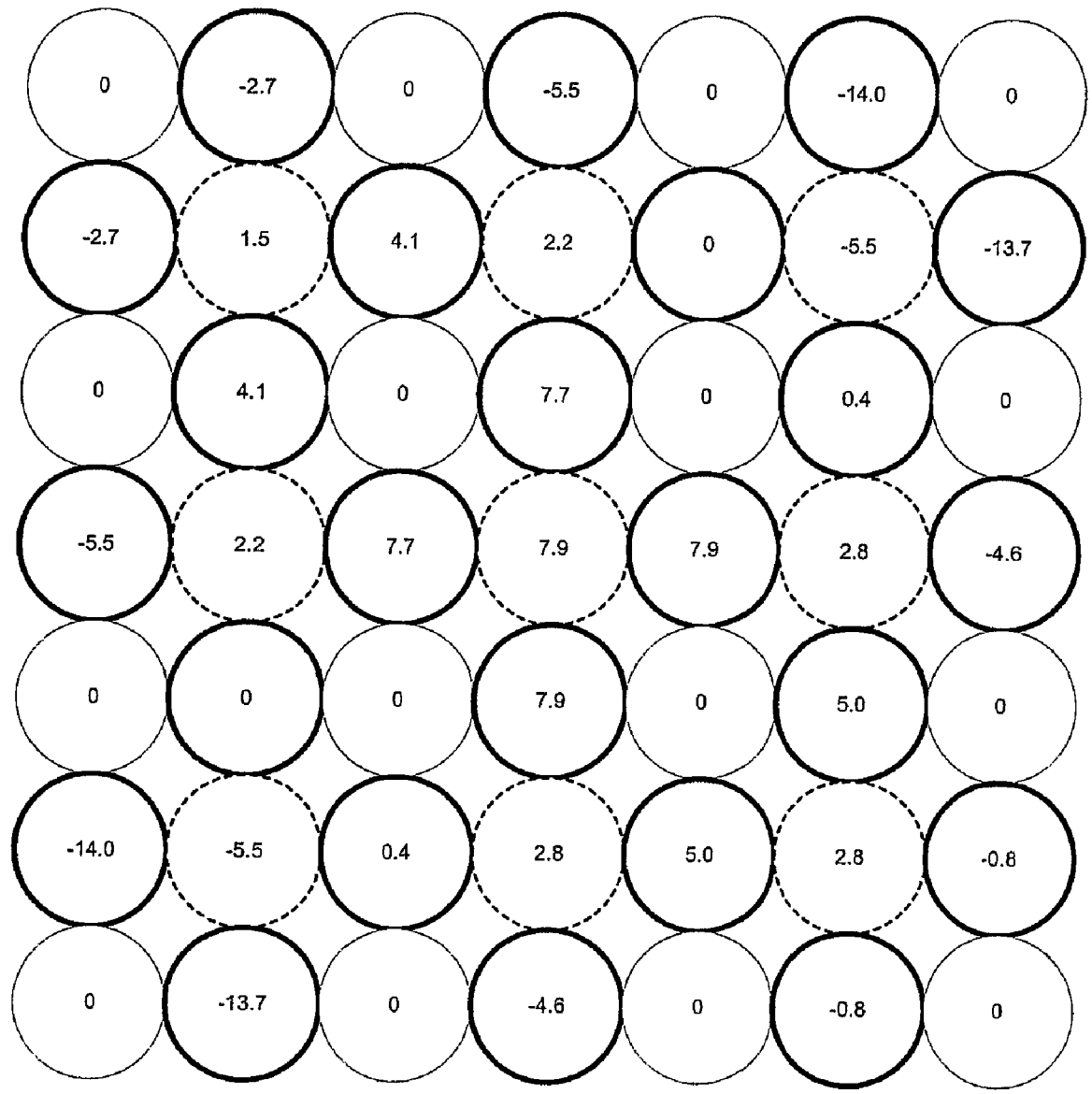
Figure 8:
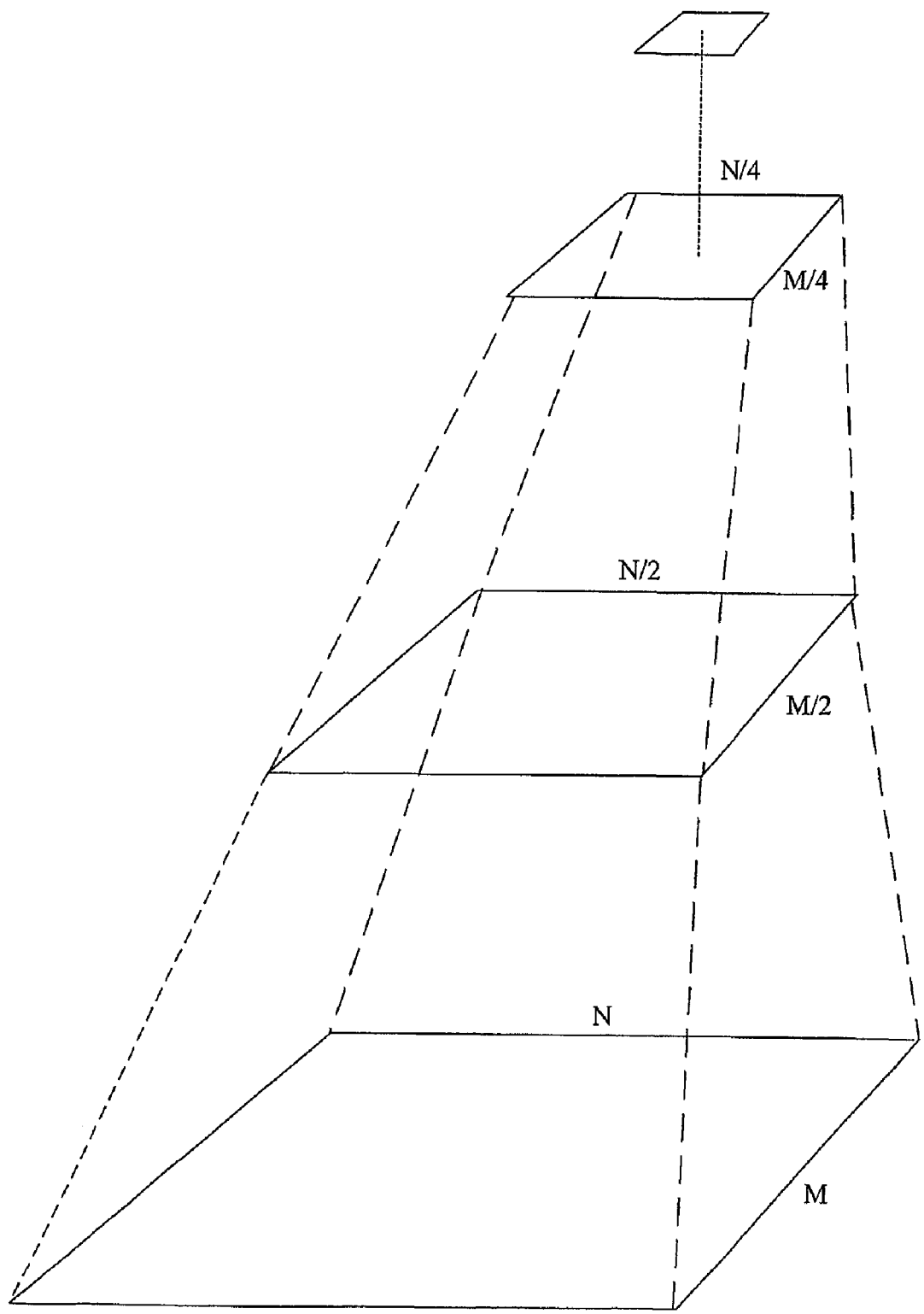
FIG. 8 depicts an averaging process repeated N-1 times, thus constructing a pyramid of N levels.
Figure 9A:
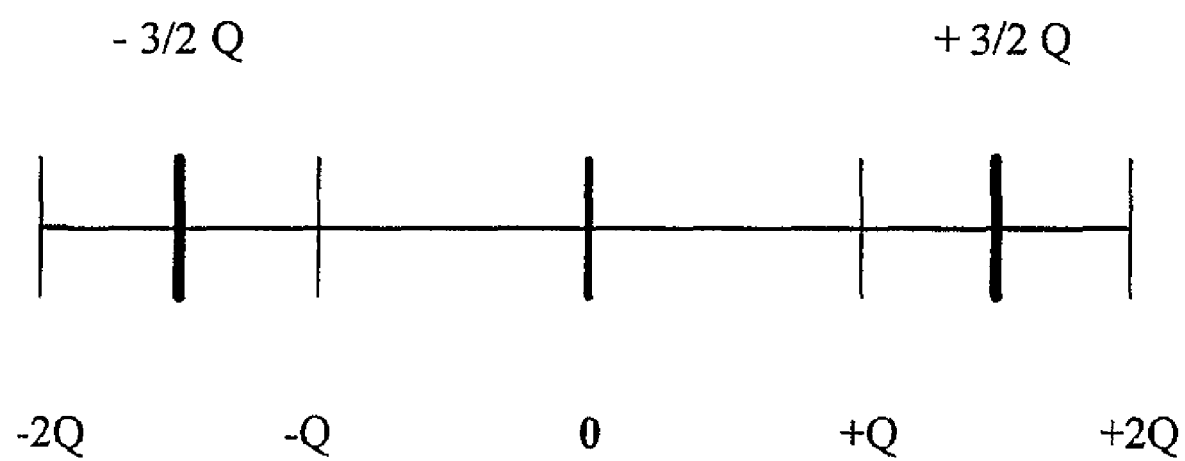
Figure 9B:
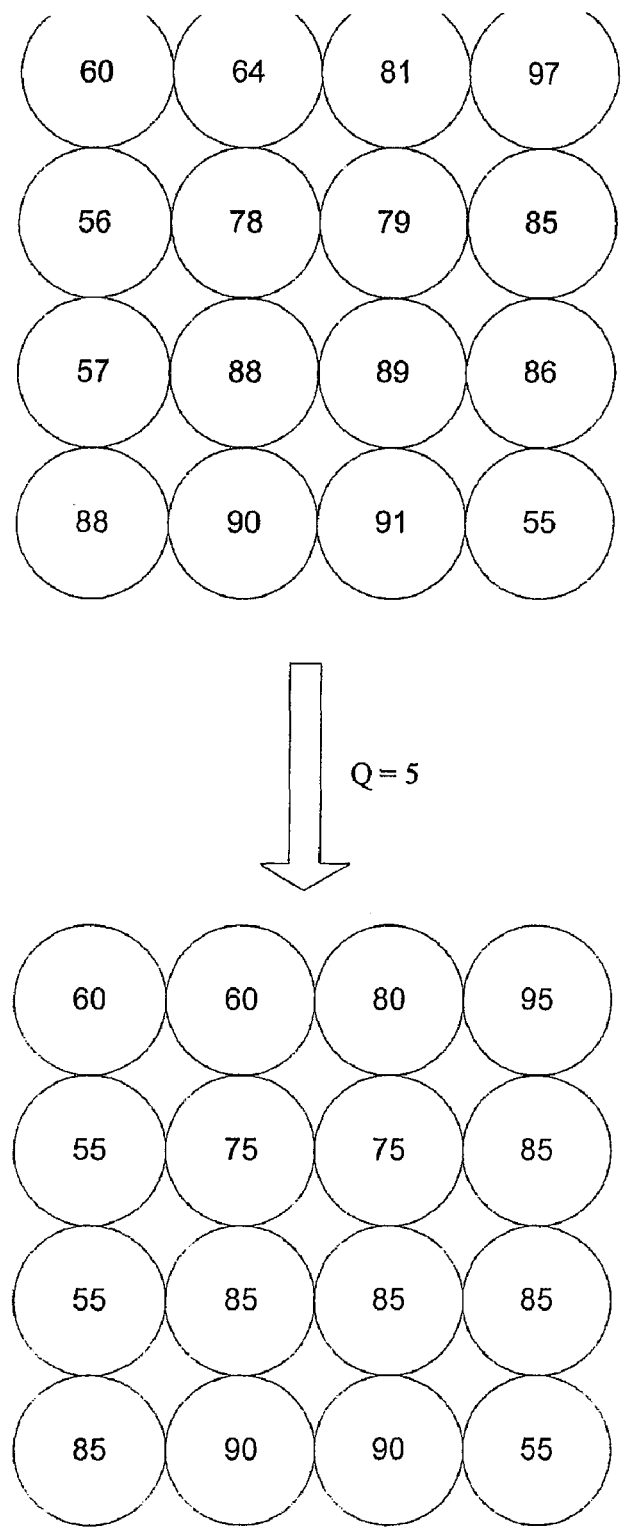
Figure 10A:
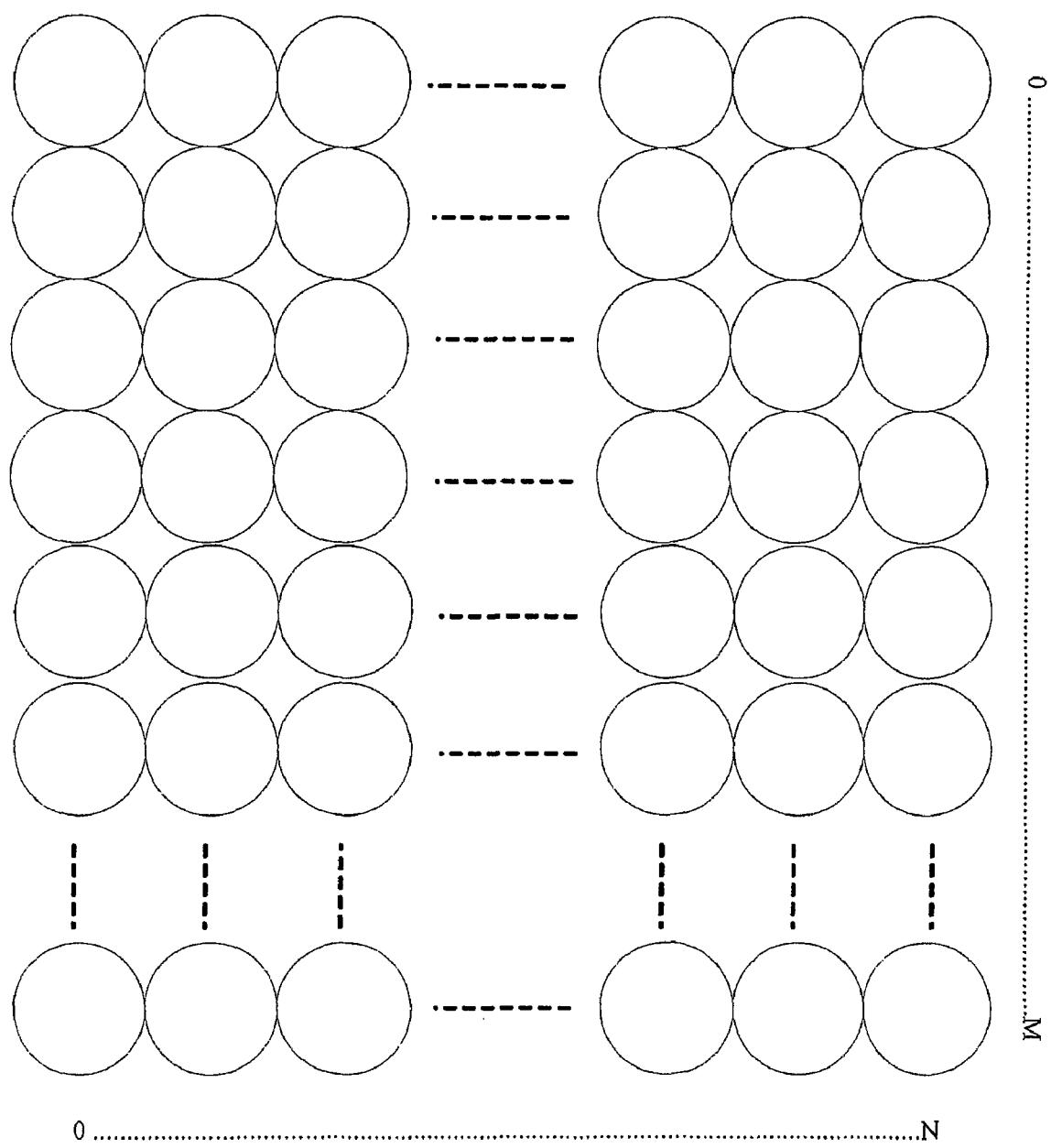
FIG. 10A shows that the 2-D image only specifies values for the pixels located between (0,N) in the x-direction and (0,M) in the y-direction.
Figure 10B:
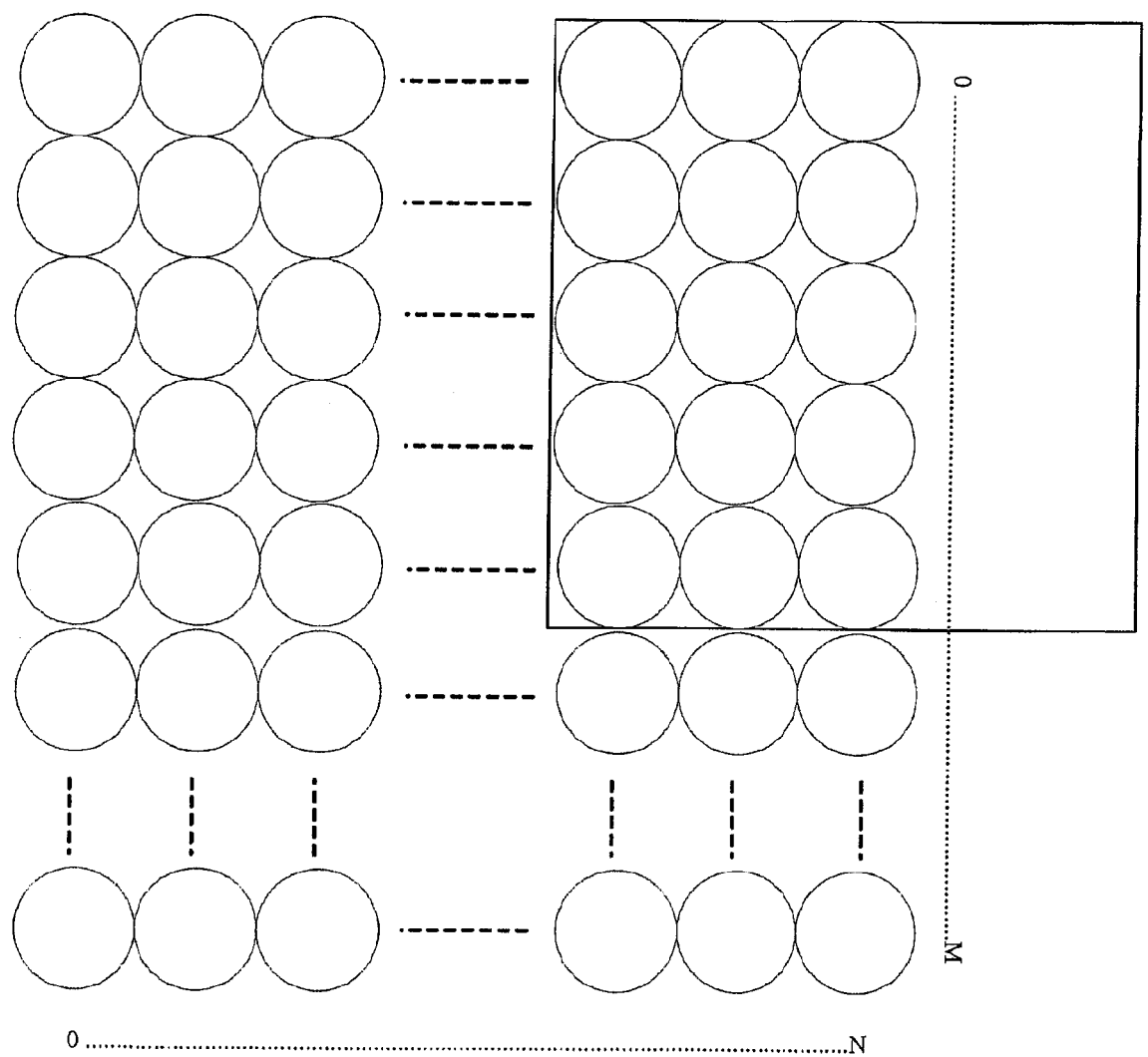
FIG. 10B shows one of the problems inherent in applying a filter operation.
Figure 10C:
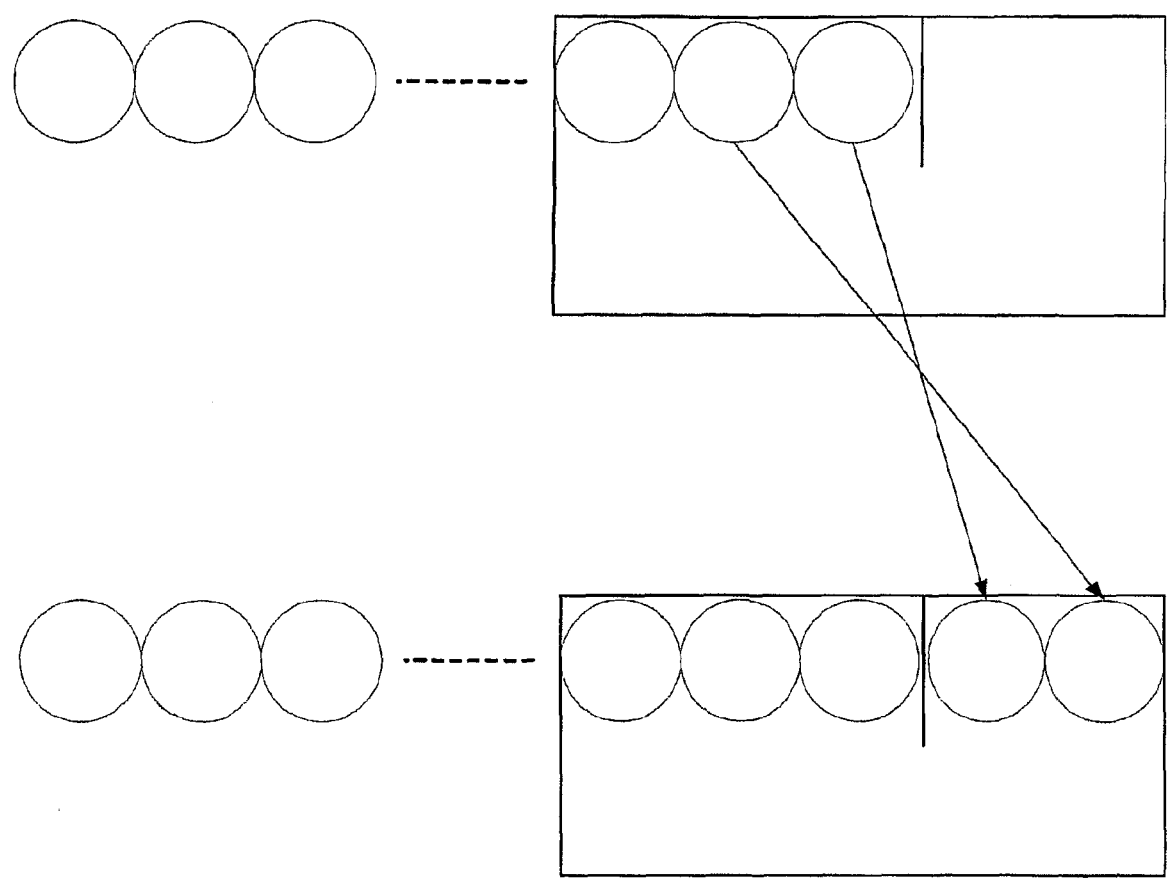
FIG. 10C outlines a procedure to apply a mirror image reflection boundary condition.

In one embodiment according to the present invention, an image is broken up into multiple regions or segments, where each segment may be of arbitrary shape, and a transform (multi-scale or otherwise) is applied on the set of segments.

In one specific embodiment, a method is provided of using a (multi-scale or otherwise) transform to represent any subset of or the entire multi-dimensional signal (or image) comprising multiple image segments having arbitrary shapes, wherein each image segment has a boundary and each image segment comprises pixels having values; the method comprising: obtaining an image segment; determining pixels within and external to the image segment; determining which pixels are at or along the segment boundary; adapting the transform in accordance with both the shape of the segment boundary and the values of the pixels both within and external to the segment; and applying the resultant domain adaptivity to the transform in order to increase the efficiency of representation of the signal by the transform.

In another specific embodiment the above domain adaptive transform is used as part of a forward portion of a multi-scale transform in the formation of coarser scale representations of the multi-dimensional signal through an update process including the convolution of an averaging filter and a sub-sampling rule.

In another specific embodiment the above domain adaptive transform is used as part of a forward portion of a multi-scale transform in the formation of sub-band representations of the multi-dimensional signal through a process including the convolution of a combination of both averaging and differencing filters, a sub-sampling rule, and a prescribed sub-band arrangement.

In yet another specific embodiment the above domain adaptive transform is used as part of an inverse portion of a multi-scale transform in the formation of finer scale representations of the multi-dimensional signal through a combination of predict and inverse update processes including the convolution of a combination of both averaging and differencing filters, an expansion rule, and (if necessary) a sub-band assignment; irrespective of whether the domain adaptive transform is used during the forward transform.

In another specific embodiment the above domain adaptive transform is part of an exemplary encoder/decoder system for the efficient transmission of a multi-dimensional signal across an information channel. In a preferred embodiment the final reconstruction results in sufficiently low perceptual error and is transmitted via as little information or entropy as possible.

Another embodiment of the invention of a domain adaptive transform relates to a system of an exemplary synchronized encoder/decoder system for handling image regions within a sequence of video frames as mentioned in [Prakash I]. Specifically this embodiment of the invention relates to the efficient transform and encoding of residue data within the image regions comprising an individual frame of the video sequence.

In yet another embodiment the above domain adaptive transform is coupled with outlier rejection in order to form more efficient and robust coarser scale representations of the multi-dimensional as part of the forward transform of a generalized multi-scale transform.

In another embodiment of the invention, pattern adaptive prediction is used when predicting the next finer level of the transform pyramid. The pattern adaptive prediction uses the parent grid to determine what geometry of a filter is to be used when predicting the child grid. At the boundaries of the domain, the pattern adaptive prediction can coupled with the domain adaptive prediction technique.

DETAILED DESCRIPTION OF THE SPECIFIC EMBODIMENTS

Image Segmentation and Effects of Boundary Transitions on a Multi-Scale Transform In various aspects of the invention, the problem of representing a multi-dimensional signal via a transform (multi-scale or otherwise) is solved in part by dividing the signal into image segments along a set of boundaries or edge transitions and subsequently transforming each segment independently, or partially independently, to increase the effectiveness of the transform in representing the signal accurately in as little information as possible.

As used herein, a "segment" may be a region of a multi-dimensional signal wherein the pixels (or other elements of the signal) have substantially similar and/or nearly uniform color or intensity values. The process of constructing a set of image segments which cover either the entire image or a portion thereof is termed "segmentation". For purposes of this disclosure, any suitable method of segmentation may be used. In one embodiment of the invention, segmentation is performed as described in [Prakash II].

Figure 11:
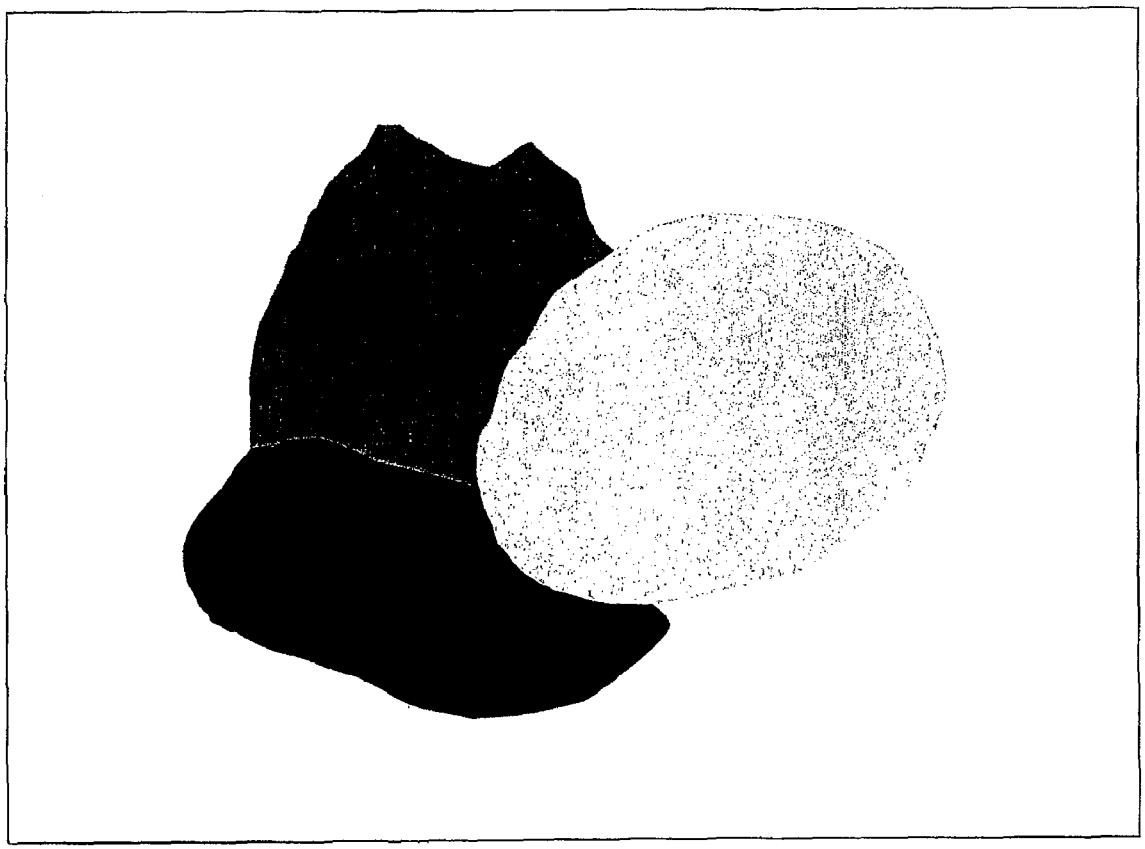
FIG. 11 shows an example of generalized non-rectangular domains in 2-D.
Figure 12A:
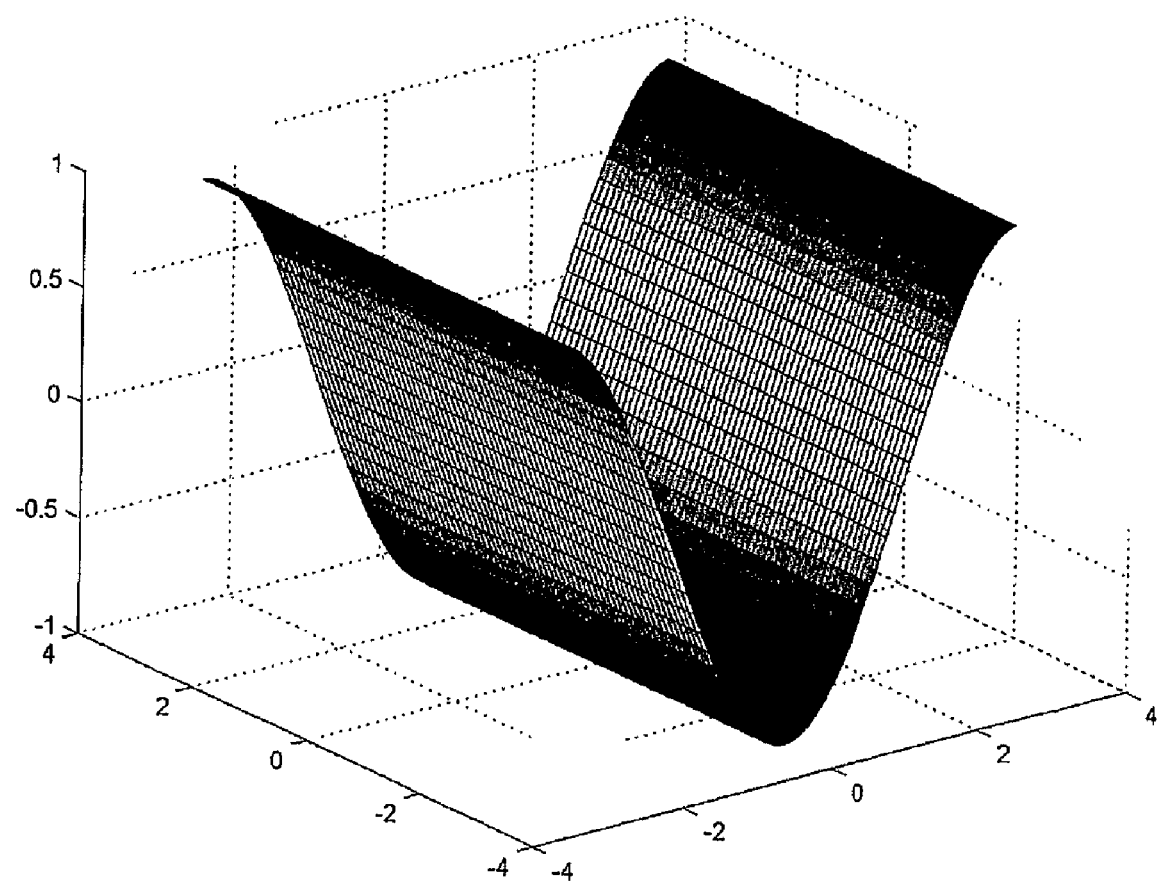
FIGS. 12A-12D show several examples of very sharp internal edge boundaries or features.
Figure 12B:
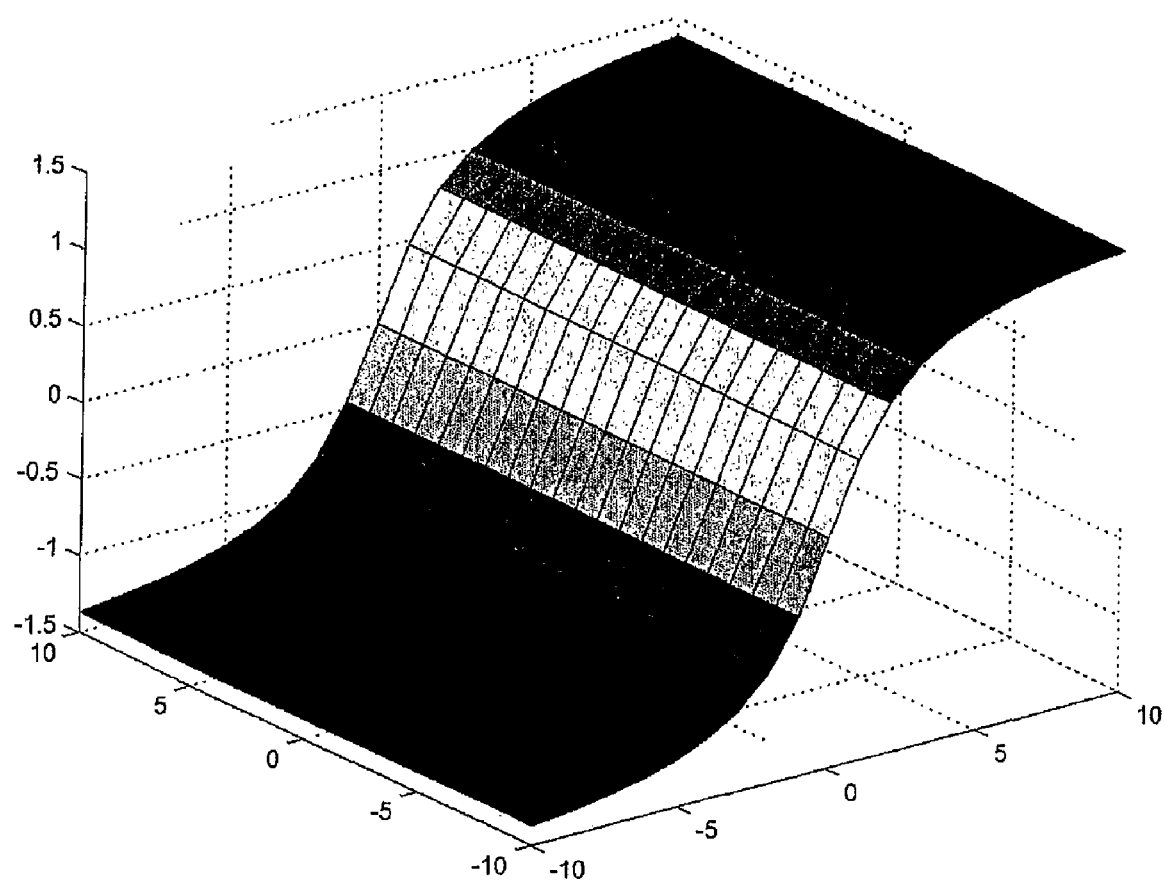
Figure 12C:
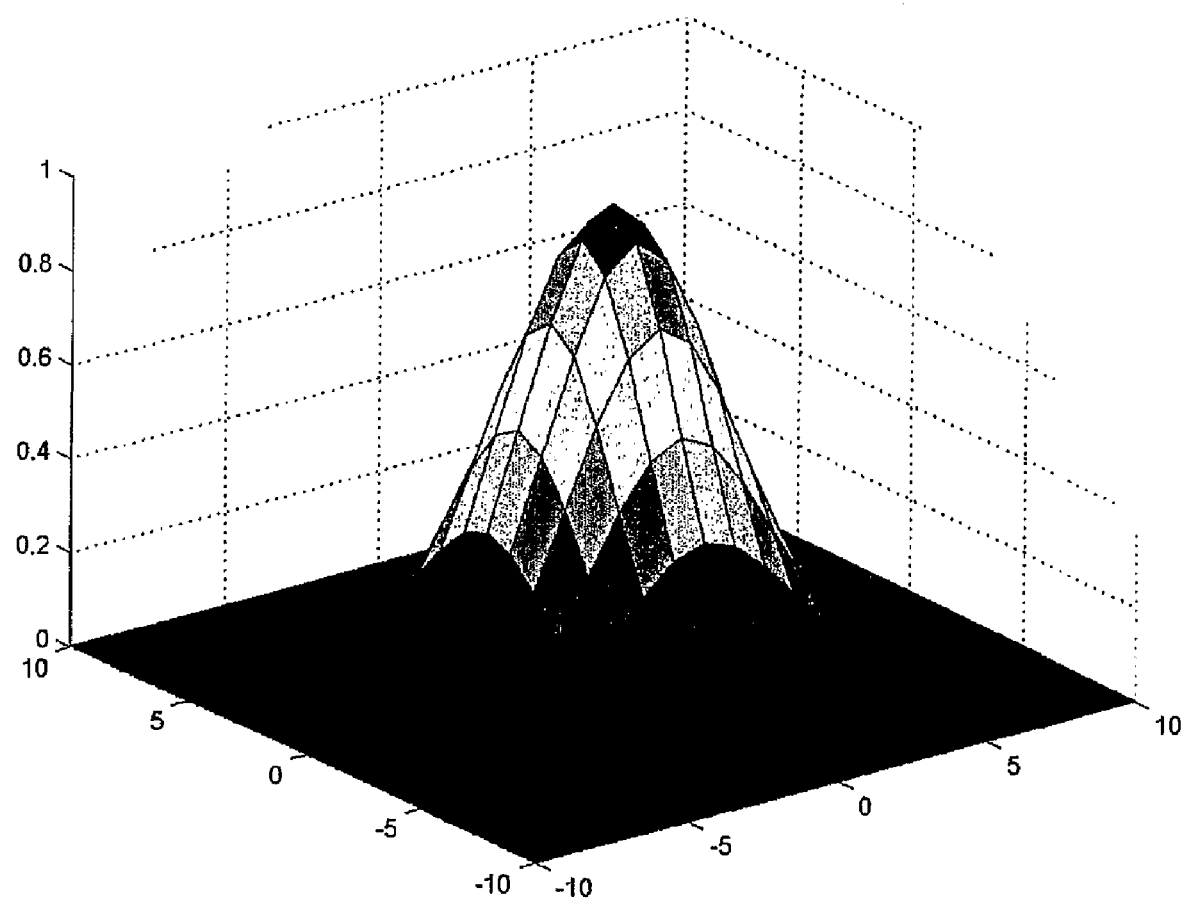
Figure 12D:
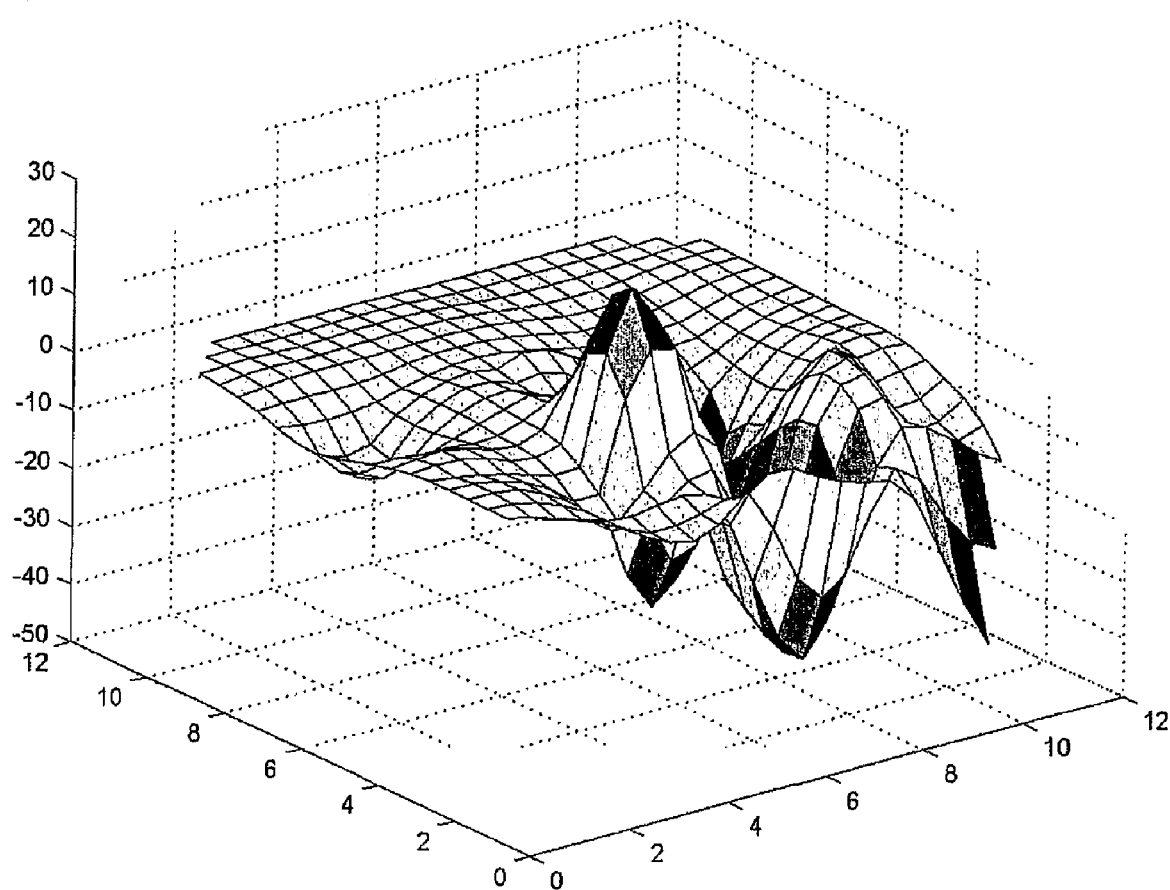
Figure 13:
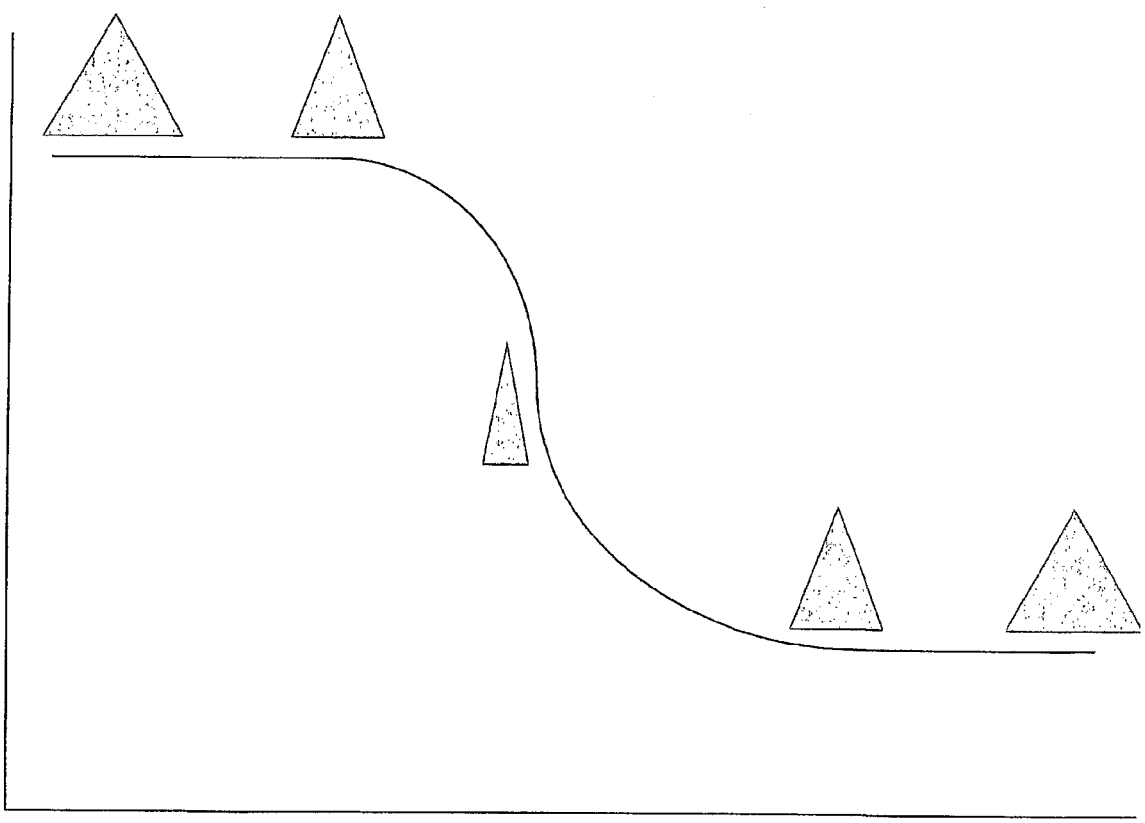
FIG. 13 shows that the support and hence order of the prediction filter tends to shrink as the edge transition is approached.
Figure 14:
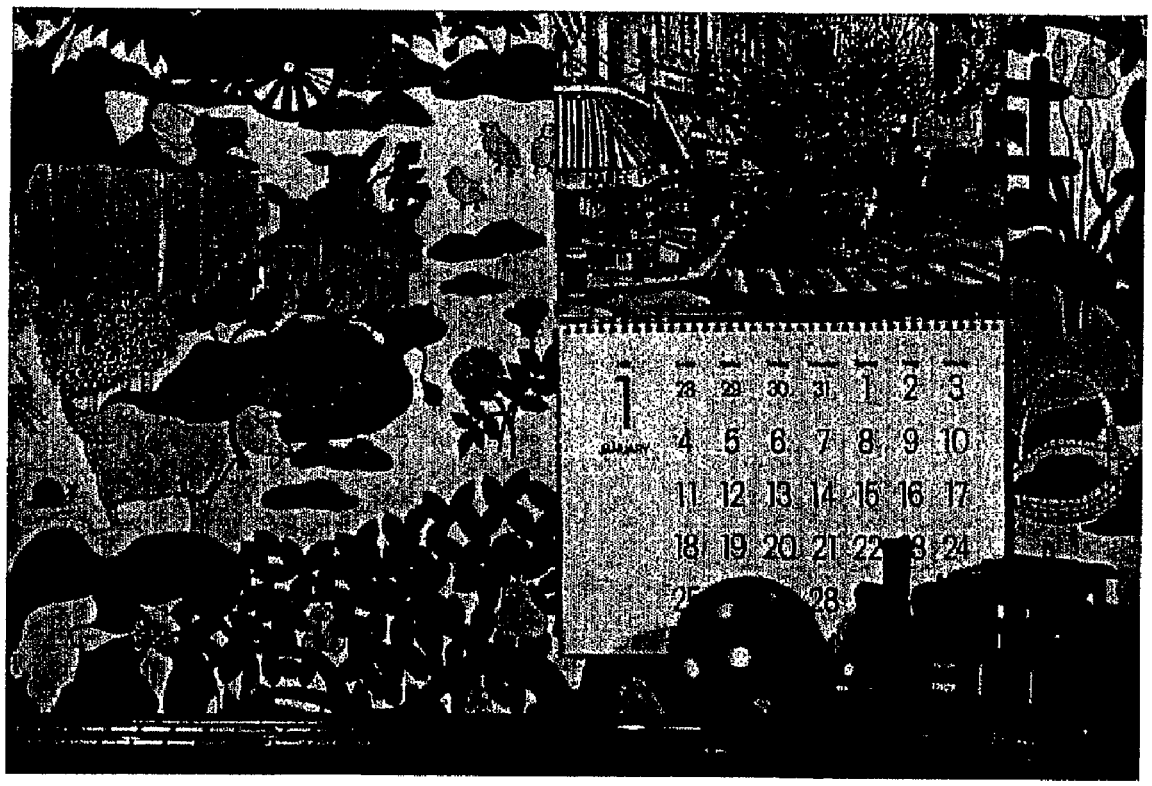
FIG. 14A depicts a sample MPEG-4 test sequence.
FIG. 14B depicts a result of an images segmentation routine being applied to FIG. 14A.
Figure 14:

When segmented the resultant set of segments may contain arbitrary shapes such as those depicted in FIG. 11. In general these arbitrarily shaped domains or segments will contain boundaries that align along, or are close to, relatively sharp transitions or gradients in the input signal. An illustration of this is shown in FIGS. 14A-B. FIG. 14A depicts a sample MPEG-4 test sequence called 'mobile'. The 2-D image is composed of a collection of objects including for example a ball, a train, a calendar, and a wallpaper background.

When an image segmentation routine based on [Prakash II] is applied to FIG. 14A, the result in FIG. 14B is obtained. In order to subdivide the image into meaningfully sized regions of roughly similar intensity values, the segmentation routine separated the scene into a multitude of arbitrarily shaped domains. Note that many (but not all) of the segment boundaries are spatially coincident (or very nearly so) with sharp edges in the input image. Also note that while some of the interiors of the segments will contain perceptible features, in general the pixel values internal to each segment, i.e. those not near or along a boundary, do not change significantly on short length scales. In the case where the multi-scale transform is to be used as part of an exemplary encoder/decoder system, the presence of such a large number of arbitrary shaped domains with strong edges transitions at the boundaries will quickly erode the efficiency of the transform thereby producing inferior quality at a low bit rate.

Definition of a Domain Adaptive Transform

Figure 15A:
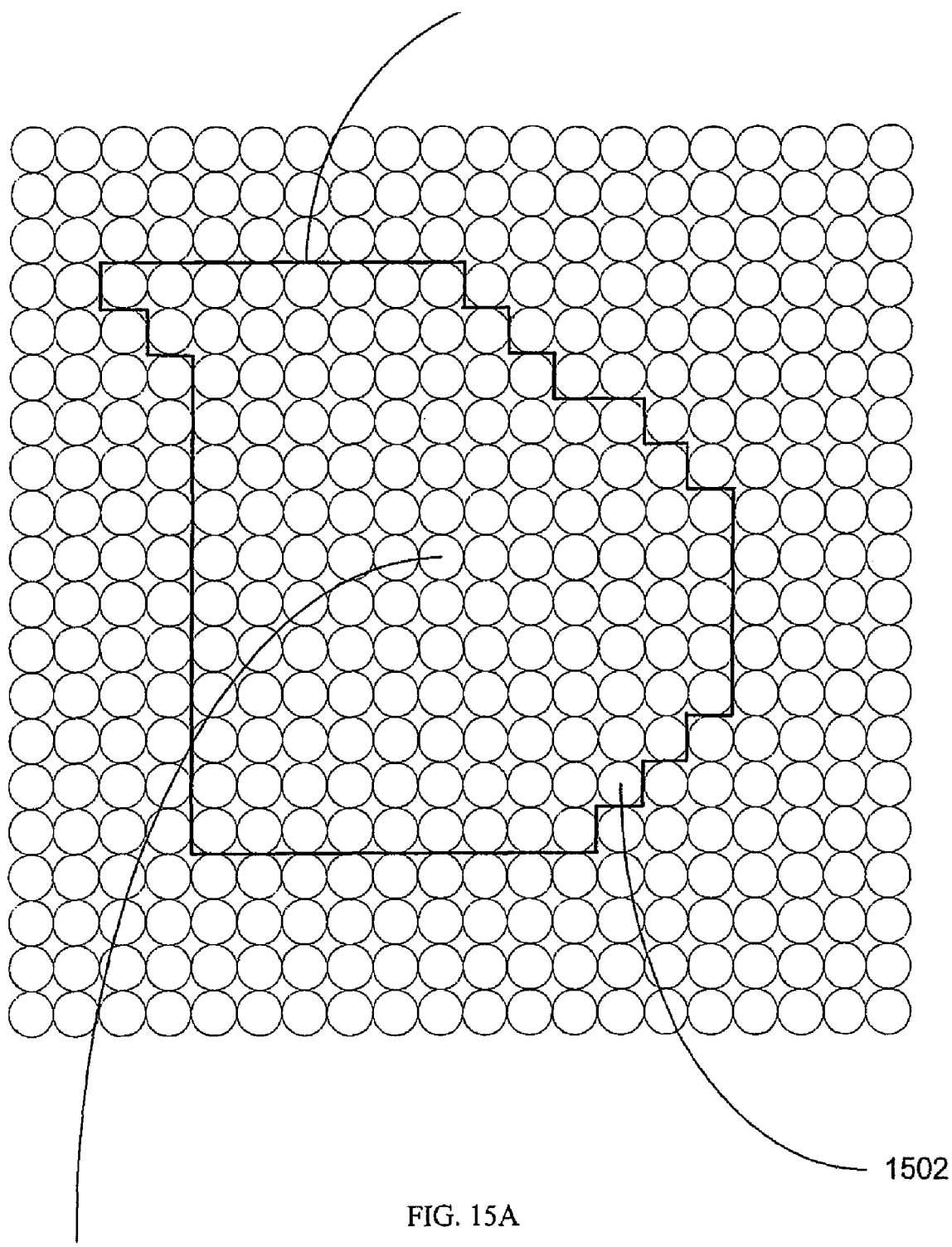
FIG. 15A shows a point that is located near a segment boundary but still inside the segment and another point that is located in the interior.
Figure 15B:
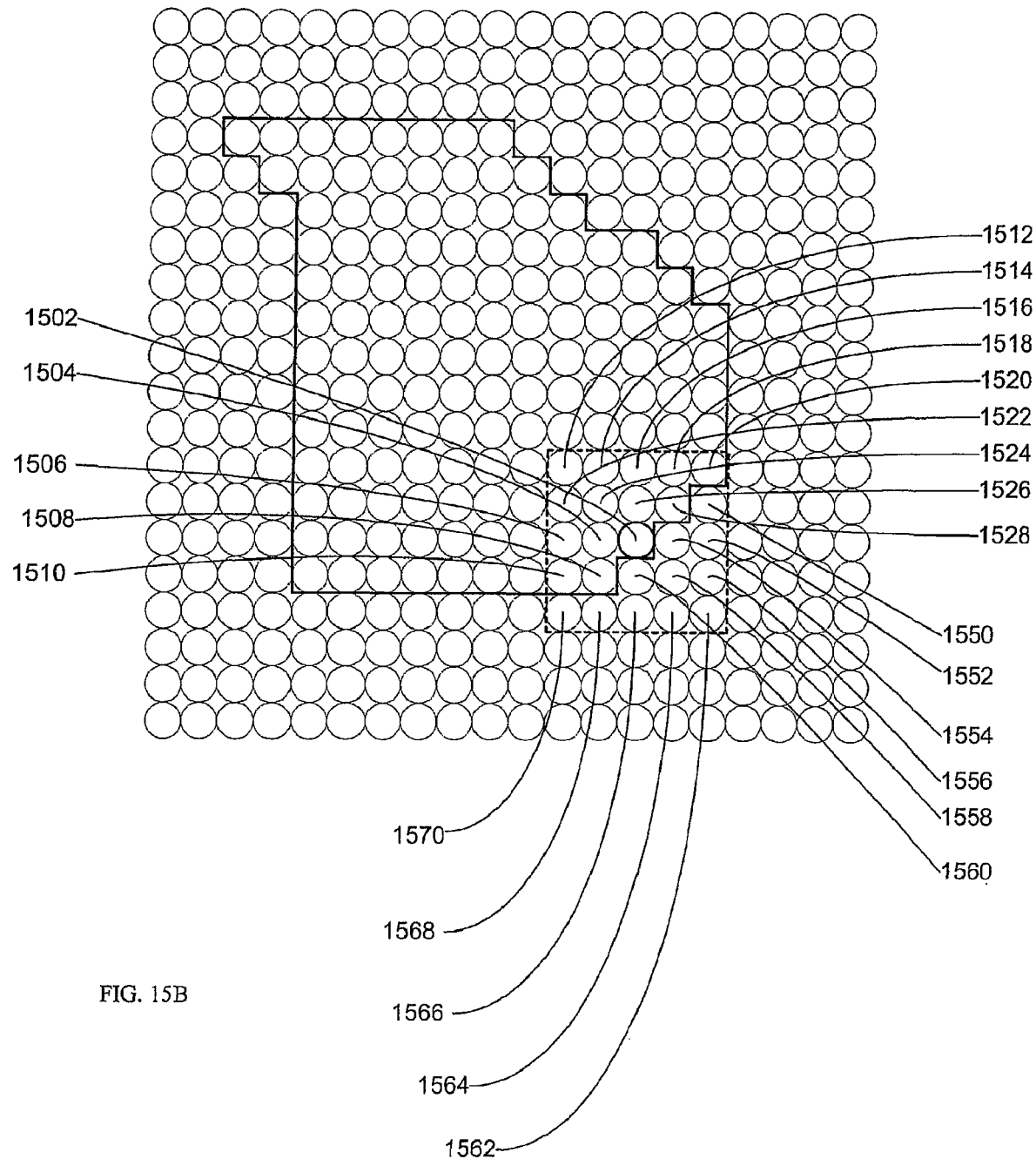
FIG. 15B shows points that are inside of the intersection a segment and a filter.
Figure 15C:
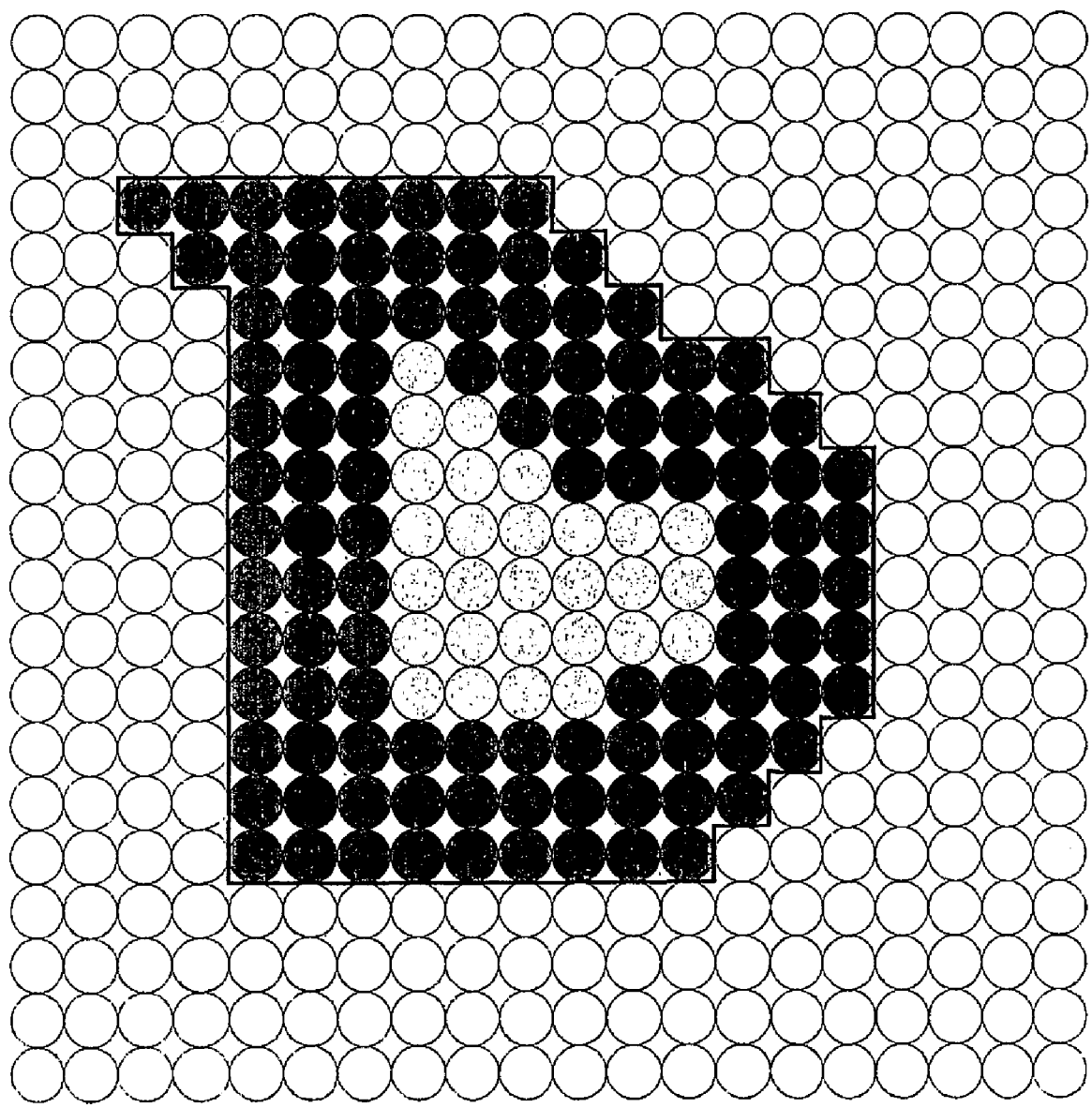
FIG. 15C shows points located near the boundary of a segment and points located in the interior.

A domain adaptive transform is a transform (multi-scale or otherwise), which changes its rules of representation when it encounters the boundary of an arbitrarily shaped region. These rules will differ from those applied by the transform when processing a pixel located in the interior of the image segment, where interior means that the support of an applied filter is wholly contained within the segment domain. FIG. 15A shows a point denoted by 1502 that is located near the segment boundary but still inside the segment called 1500. FIG. 15A also shows another point 1598 that is located in the interior for a given filter of size five along a side. In FIG. 15B the points labeled 1502-1528 are all inside of the intersection of segment 1500 and a filter of support 5×5 placed with its center on pixel 1502. In FIG. 15B the points labeled 1550-1562 are all inside of the intersection of the complement of segment 1500 (i.e. the set of all points not in segment 1500) and a filter of support 5×5 placed with its center on pixel 1502. In FIG. 15C all points shaded dark gray are located near the boundary of segment 1500 and all points shaded light gray are located in the interior.

As discussed in the background, other standard techniques such as zero padding, symmetric or periodic extension, and mesh coding will not result in high efficiency of the representation for general multi-dimensional signals. In effect such methods are not domain adaptive as they are merely variations of techniques that work best when the domain is rectangular as opposed to arbitrary shape.

Applications of Domain Adaptive Transform

The domain adaptive transform can have many applications in efficiently encoding signals for the purposes of storage, display, or transmission. This method can be used for compressing still images, the residue frames encountered in video compression as a result of motion estimation/compensation, or three dimensional signals such as holograms.

The increased coding efficiency comes from the fact that pixel values within a given image segment will more likely correlate to one another as opposed to corresponding pixel values external to a given segment. Moreover, as described in the background, multi-scale transforms do not produce efficient mathematical representations at sharp edge transitions, such as those encountered at the boundaries of arbitrary image segments. These properties are true regardless of whether the pixel values represent colors in a still image or residual differences in motion compensated video.

Mechanics of the Domain Adaptive Transform (Exclusion and Replacement)

The current embodiment of the invention relates to how a transform will employ alternative rules when approaching a boundary, i.e. domain adaptive transform. An example of this is shown in FIG. 16A-I. Here FIG. 16A displays a point denoted as 1602 with a 5×5 neighborhood labeled according to the same scheme shown in FIG. 15B. The image values for the pixels of interest are displayed in FIG. 16B. It is this data which is to be processed by application of an example filter depicted in FIG. 16C. Here, once again, a filter is defined as a convolution operator that results in a weighted sum of values contained in the target signal.

In one embodiment, the filter can be used in the update process for the generation of coarser scale representations as previously discussed in regards to the forward transform of a multi-scale transform. In another embodiment the filter can be used in the predict or the inverse update process employed in the estimation of the next finer scale as previously discussed in regards to the inverse transform of a multi-scale transform. Note that the pixels marked 1650-1662 are located outside of segment in question. In one embodiment a rule of adaptivity is applied wherein the points marked 1650-1662 are to be excluded from the operation as they may not be representative of pixel values at a given scale within the segment. Thus the result of the filter operation is comprised of a weighted average of points 1602-1628.

In the current embodiment, the weighted average is accomplished by performing the normal filter multiplication and summation depicted in FIG. 16D where the pixel values at locations 1650-1662 are temporarily viewed as being zero. In contrast if the pixels at 1650-1662 were assigned there usual values and contributed to the final weighted average in exactly the same manner as pixels 1602-1628 the resultant sum would be as that depicted in FIG. 16E.

Figure 16A:
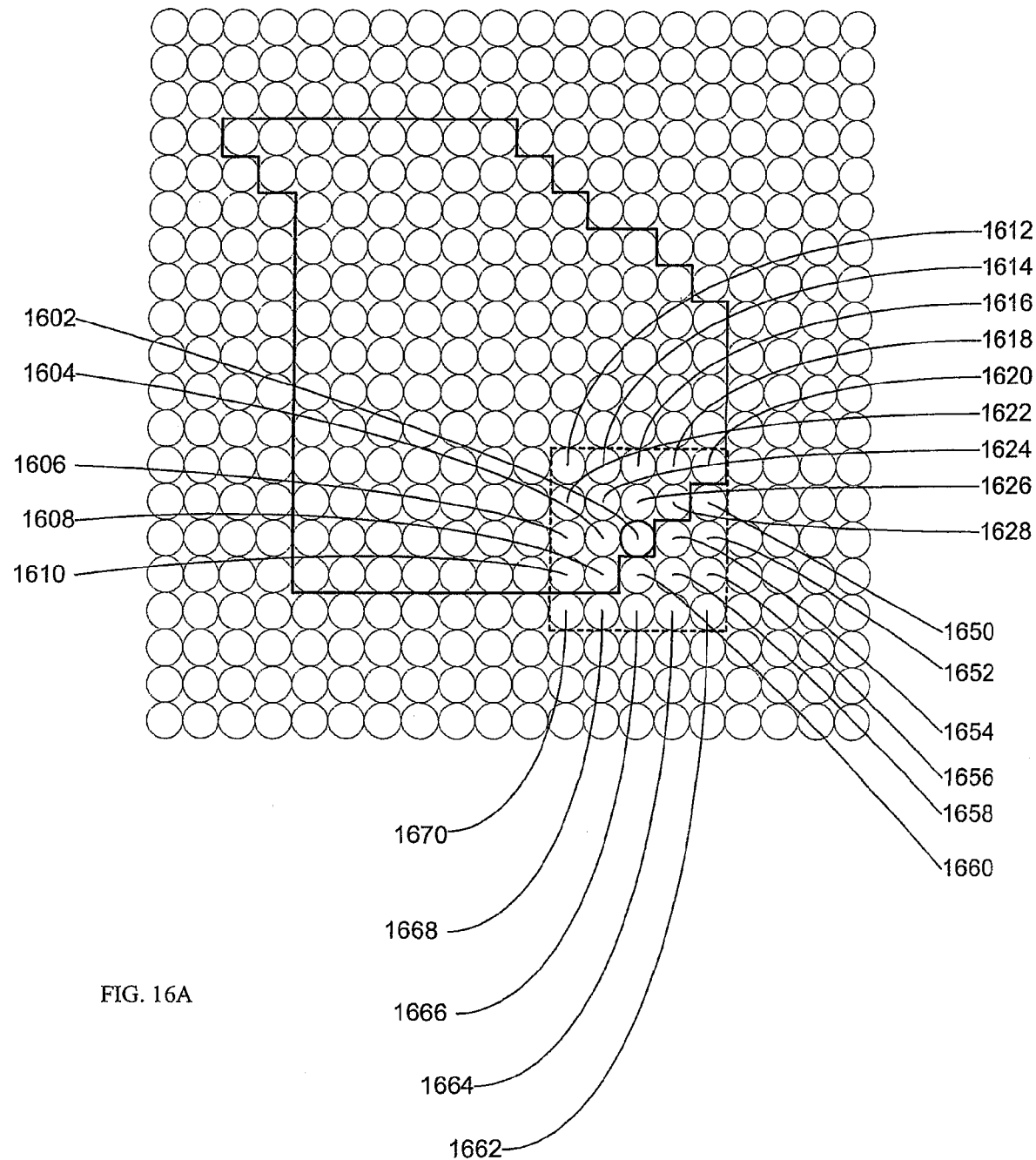
Figure 16B:
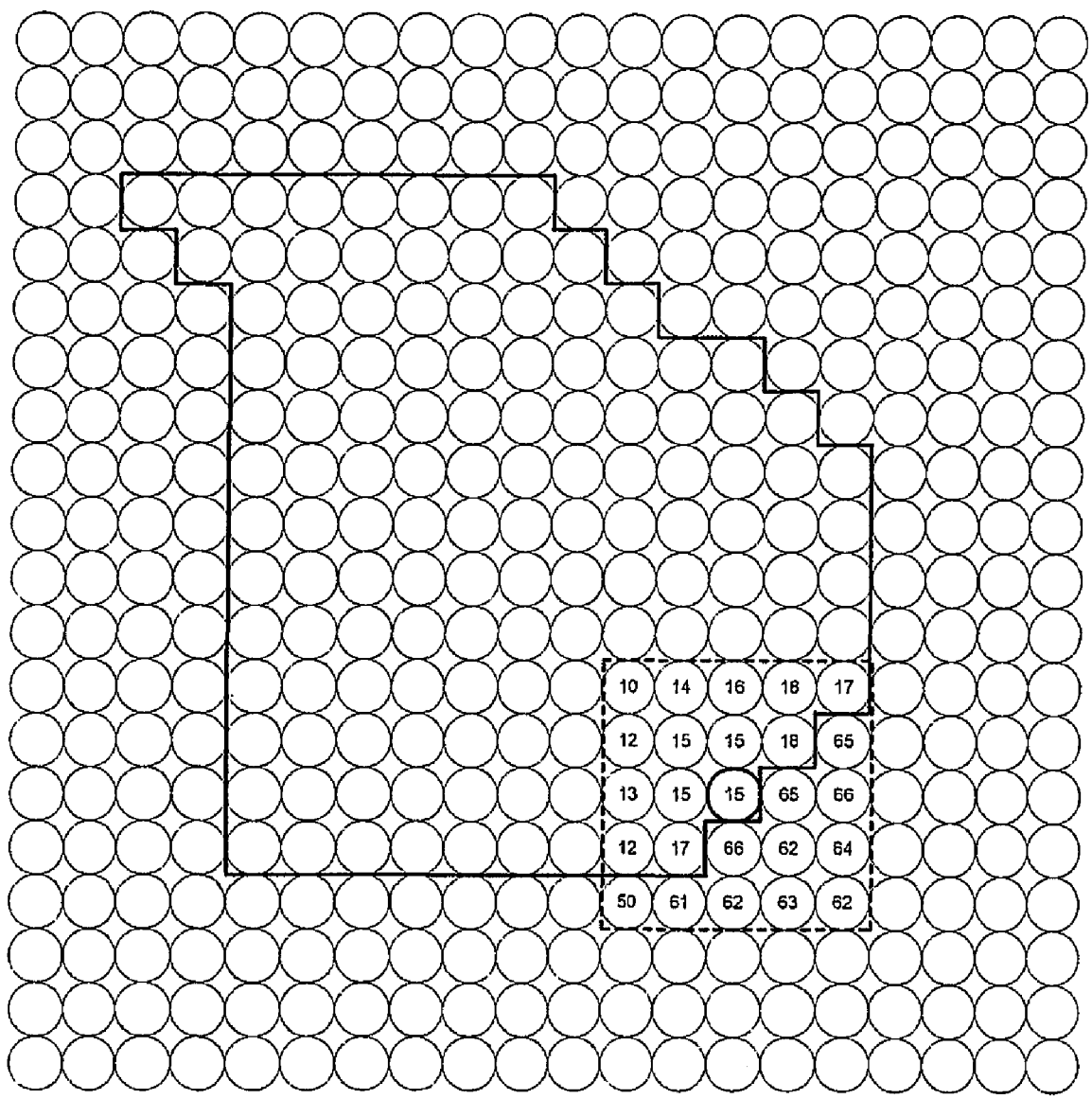
Figure 16C:
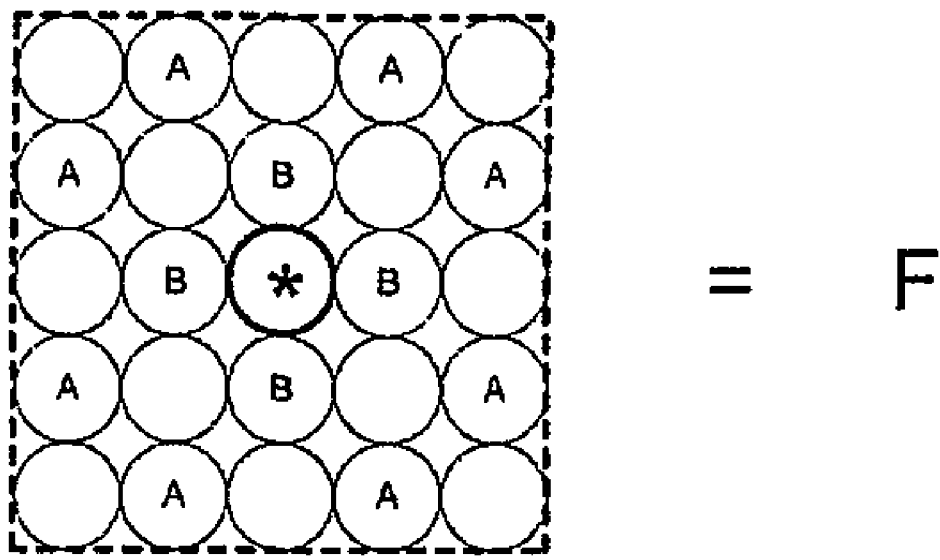
Figure 16E:
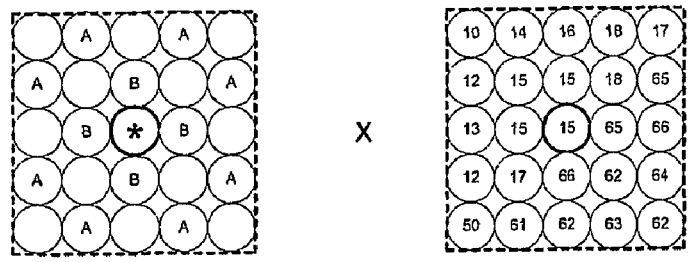
Figure 16F:
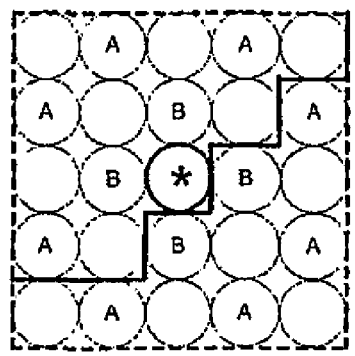

However, the sum in FIG. 16D alone is not sufficient as it is not normalized, i.e. the relevant remaining weights of the filter corresponding to the pixels located at 1602-1628 do not sum to necessary value as seen in FIG. 16F. In the present example this normalization factor is meant to be unity. In other cases the factor may need to be zero or some other pre-determined constant. Note the missing weight is then re-introduced into the final sum by first multiplying with a representative value of the internal domain, i.e. derived from pixels 1602-1628. In the current embodiment this representative value is the median of pixels 1602-1628. In other embodiments this may be an average, a weighted average, or any other statistical function of the internal points.

Figure 16G:
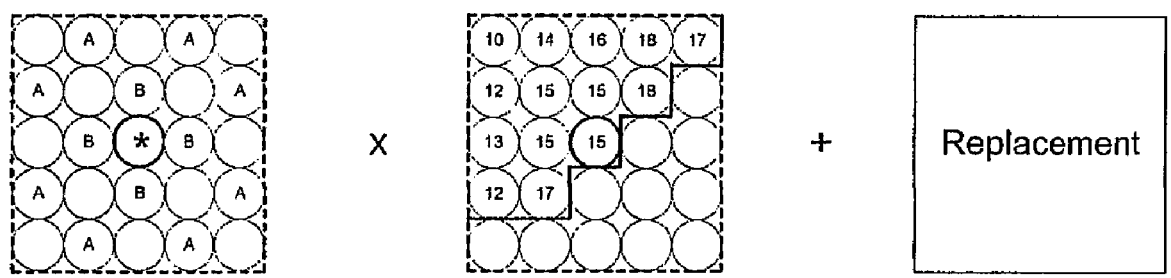

The final result for the example process centered at point 1602 is shown in FIG. 16G. The procedure may then be applied to all points in the region near the boundary of segment 1600. For points in the interior of the segment the regular rule of operation applies, i.e. no exclusion and no replacement. Moreover, when it is time to process a segment (provided there is one) directly across the boundary and containing one or more of the pixels located at 1650-1662 the same logic can be used but in reverse where pixels 1602-1628 are excluded and the final result includes renormalization by replacement of the missing weights by inference from the corresponding valid pixels.

Mechanics of the Domain Adaptive Transform (Boundary Transition Re-Weighting)

Figure 16H:
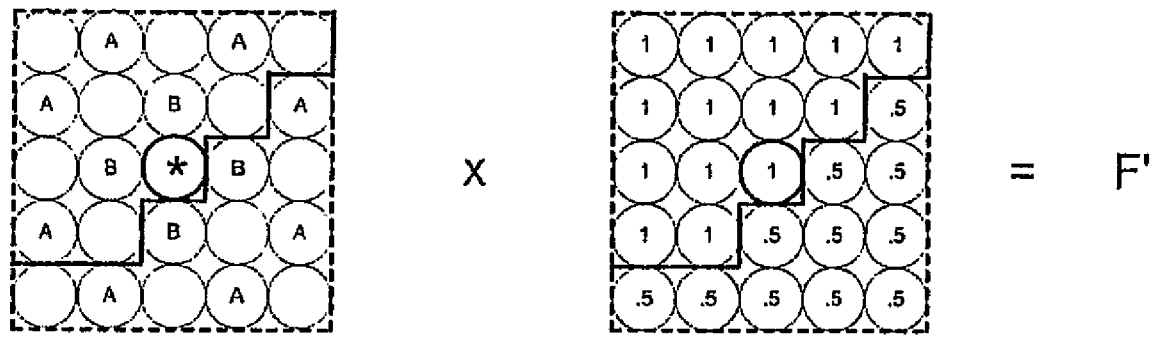
Figure 161:
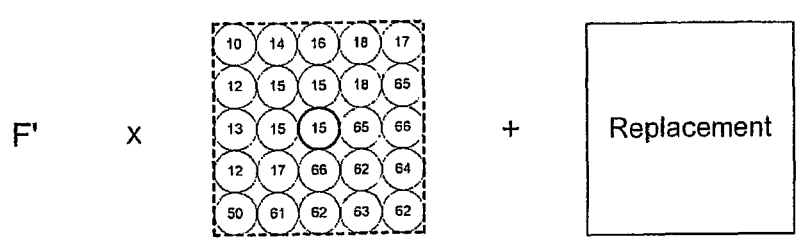

In another embodiment, the entire process described above is altered only in that the pixels external to the segment in question are not outright rejected. They are in fact allocated weights that are constructed from the original filter coefficients by multiplication with a function that directly depends on the strength of the boundary transition. FIG. 16H shows the filter from FIG. 16C modified with an additional weight multiplier of point 0.5 for pixels at 1650-1666. Using this filter and applying the appropriate renormalization via the median of the internal pixels at 1602-1616 the new final result is depicted in FIG. 16I.

In a specific embodiment, this additional factor is inversely related to the localized difference across the boundary. In another embodiment the additional factor(s) can have any given relationship with the localized difference. In yet another embodiment any measure of the edge strength or transition difference can be used.

When in the course of use of the aforementioned domain adaptive transform within the inverse transform of a general multi-scale transform as part of an encoder-decoder system, the aforementioned boundary measure must be computed from information that will be readily available to the decoder at the correct spot in the transform. Otherwise the transform will not be invertible and will introduce poor visual artifacts and become more inefficient. Note the forward transform need not necessarily suffer from the same restrictions. In general the original function values are not available because they have not yet been sent to the decoder. In one embodiment the available data can be a previously encoded coarse scale representation, i.e. the relevant reconstruction up to the current point in the inverse transform. In another embodiment the available data can be the motion compensated model frame (or equivalent) when applying the multi-scale encoder to the compression of residue data within the context of a video sequence. In yet another embodiment the data used in order to calculate the boundary measure is any data that is jointly known by both the encoder and decoder at the relevant point in the inverse transform.

Use of Domain Adaptive Transform in a Multi-Scale Transform

An embodiment of the invention relates to the application of a multi-scale transform to one or more arbitrarily shaped image segments in a multi-dimensional signal.

The forward transform of a multi-scale transform is composed of one or more updates (i.e. convolution filter plus sub-sampling) for the generation of coarser scale representations of the signal. In an embodiment of the invention, the domain adaptive transform described above in the 'Mechanics' sections is directly used so as to increase the performance of the forward transform thereby increasing the efficiency of the multi-scale transform in the presence of arbitrarily shaped domains. In yet another embodiment of the invention, the aforementioned domain adaptive transform is used in the application of a series of both update filters and differencing filters to a set of arbitrarily shaped segments in order to construct a mathematically efficient sub-band decomposition for the forward portion of a multi-scale transform with sub-bands.

The inverse transform of a multi-scale transform is composed of one or more predicts (i.e. interpolating filter+sample shift) and/or inverse updates (i.e. convolution filter+expansion) for the generation of the next finer scale representations of the signal based one or more, coarse scale representations. In an embodiment of the invention, the domain adaptive transform described above in the 'Mechanics' sections is directly used so as to increase the performance of the inverse transform thereby increasing the efficiency of the multi-scale transform in the presence of arbitrarily shaped domains; irrespective of whether the coarser scale representations were also constructed with the use of the invention. In another embodiment of the invention, the aforementioned domain adaptive transform is used in the application of a series of inverse update and prediction filters to a set of arbitrarily shaped segments in order to construct a mathematically efficient sub-band decomposition for the inverse portion of a multi-scale transform with sub-bands. In yet another embodiment of the invention, the domain adaptive transform is applied in both the forward and inverse transforms of a multi-scale transform for maximal efficiency.

Use of Domain Adaptive Transform in Encoder-Decoder System

In another embodiment of the invention, the above domain adaptive transform is applied to a multi-scale transform as described above in the section entitled 'Use of domain adaptive transform in a multi-scale transform' as part of an exemplary encoder/decoder system for the efficient transmission of a multi-dimensional signal across an information channel. In another embodiment the resultant domain adaptive multi-scale transform is integrated with (or without) quantization and coupled with any number of lossless entropy encoders as part of an exemplary encoder/decoder system for the efficient transmission of a multi-dimensional signal across an information channel. In yet another embodiment the resultant domain adaptive multi-scale transform is integrated with a bit-plane encoder, including but not limited to SPIHT, EZW, or EBCOT, as part of an exemplary encoder/decoder system for the efficient transmission of a multi-dimensional signal across an information channel.

Another embodiment of the invention of a domain adaptive transform relates to a system of an exemplary synchronized encoder/decoder system for handling image regions within a sequence of video frames as mentioned in [Prakash I]. Specifically this embodiment of the invention relates to the efficient transform and encoding of residue data within the image regions comprising an individual frame of the video sequence.

Pattern Adaptive Transform

Figure 17A:
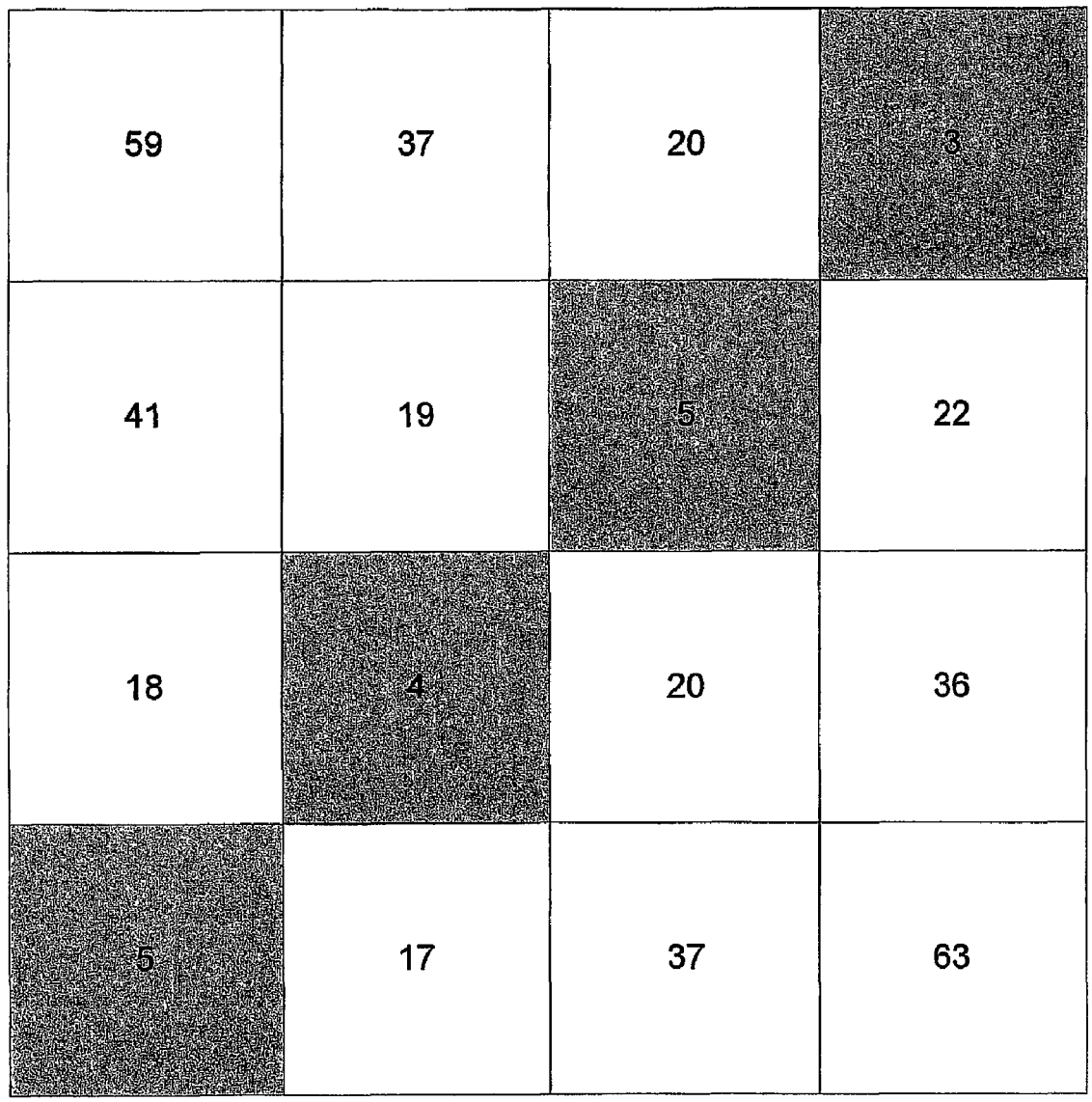
FIG. 17A shows a "diagonal trough".
Figure 17B:
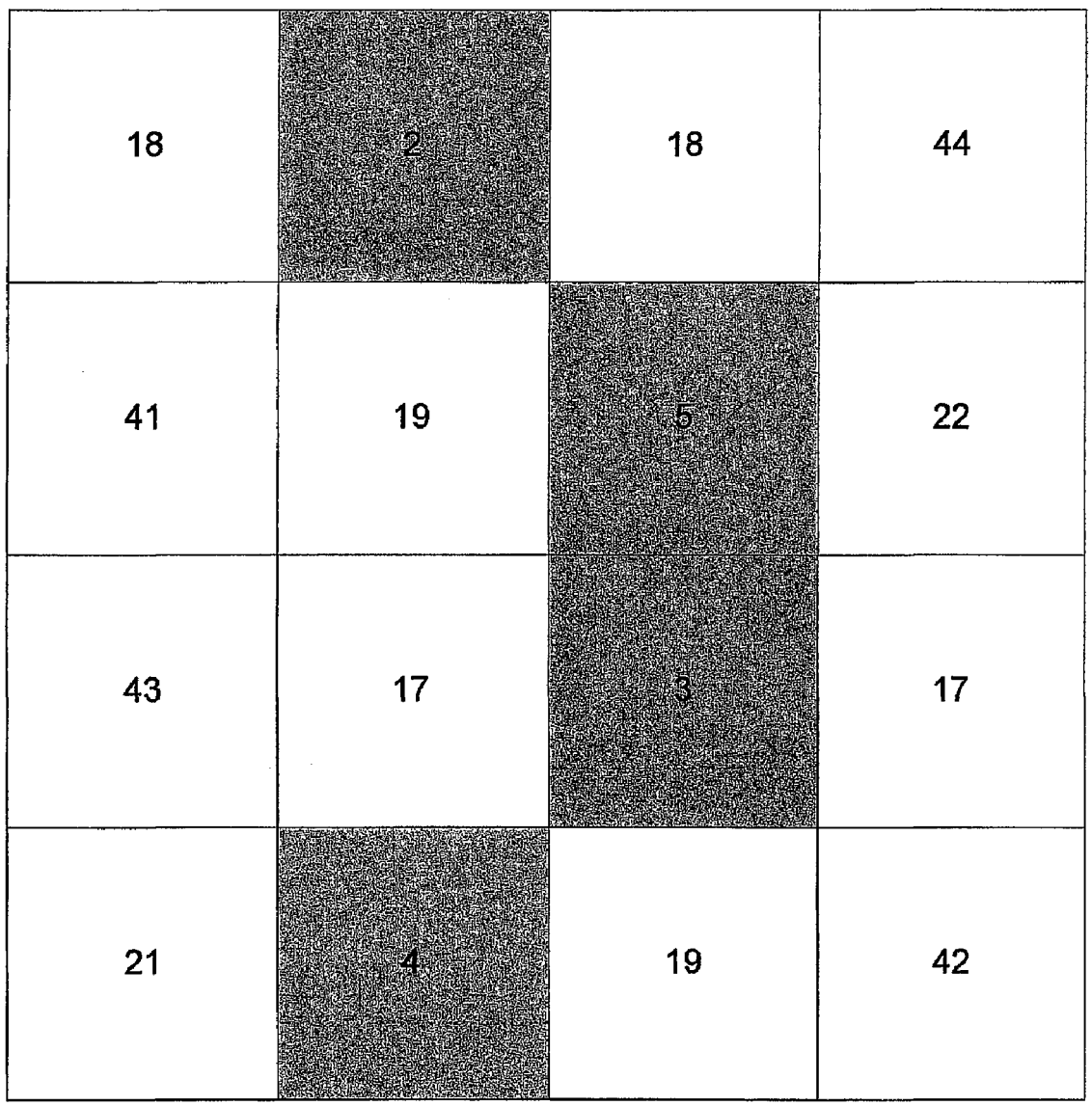
FIG. 17B shows a "trough" with a bend.
Figure 17C:
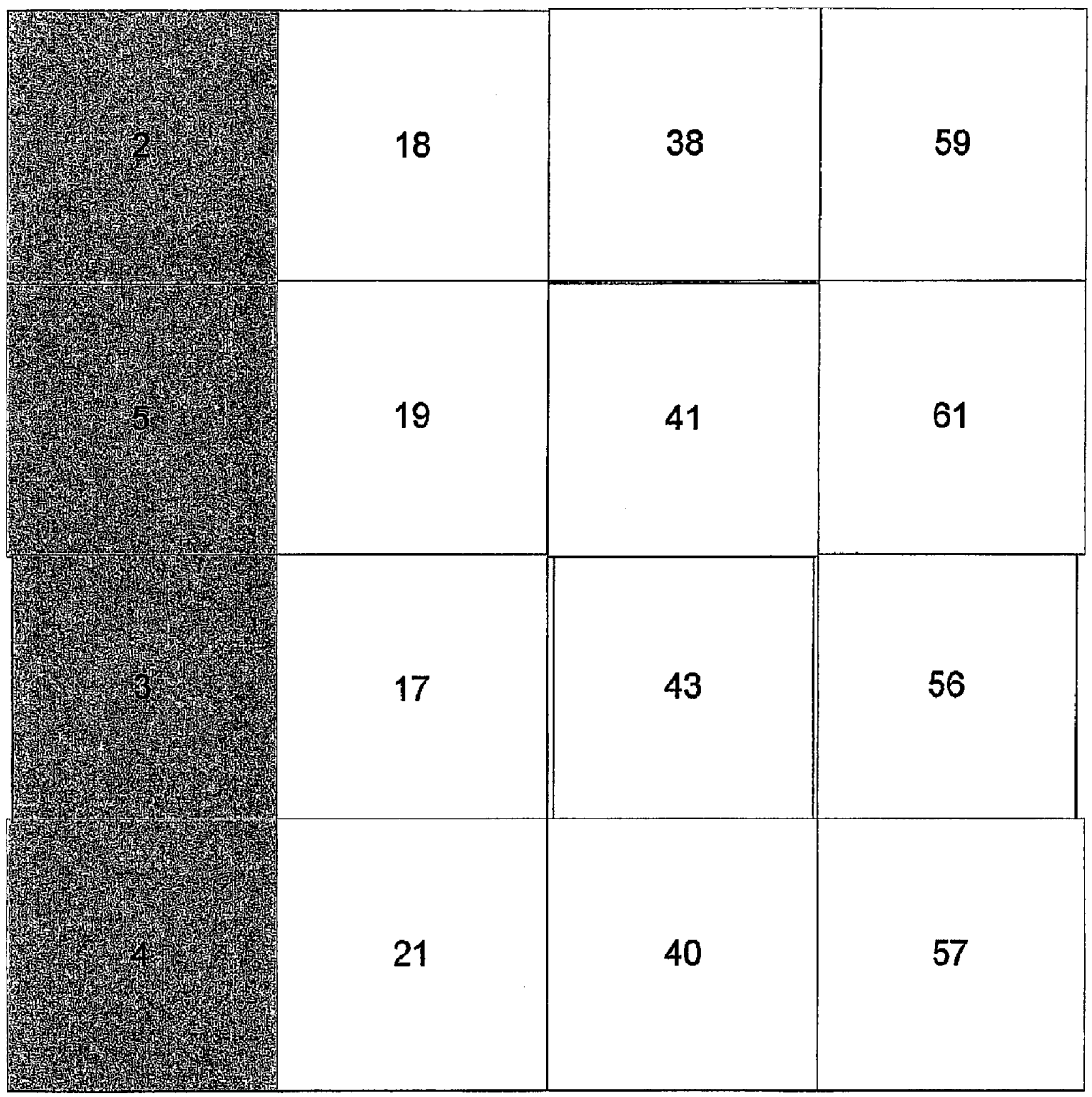
FIG. 17C shows a "slanted surface."

A pattern adaptive transform is a transform that adapts itself to the patterns inherently present in the data the transform being applied to. In particular, one embodiment of multi-scale pattern adaptive transforms will be described here. As was mentioned earlier, in a multi-scale pyramidal transform, the forward transform build coarser and coarser averages of the image data are produced. On the inverse transform, the coarser parent data are used to predict the data on the finer(child) scale. The data is not interpolated with constant filter coefficients, rather the coefficients are scaled in the data dependent way. The interpolation filter thus adapts itself to the pattern of the data. Specifically in the current embodiment, a 4×4 set of parents is chosen for interpolating the child grid. Each point initially has a fixed coefficient of a 4×4 filter associated with it. The approximate gradient value to each of the 16 parent values from the center is then computed. Each of the filter coefficients is then scaled by the inverse of the gradient value. The new filter is re-normalized and then applied to interpolate the data. In FIG. 17A, we an example of a "diagonal trough". The low lying line of the "trough" going from lower left to upper right are the low points emphasized in gray. In case of the "trough", the gradient values along the trough are small, while in the direction perpendicular to the trough are high. Thus the point in the middle will interpolated primarily along the "equipotential" lines roughly parallel to the "trough", with the weight of the other points being quite small. The "trough" can also have a bend as illustrated by FIG. 17B. Here, the low lying line of the "trough" is again emphasized in gray, but it is no longer straight. The interpolation will still happen along the "equipotential lines, this time approximately following the curve of the "trough". FIG. 17C contains a "slanted surface". For the slanted surface, the low lying line of the trough is again emphasized in gray, here going from bottom left to top left. Again, the interpolation will happen mainly along the constant contour lines (up/down in this case) of the slanted surface. Note that no edge detection needs to be performed.

In another embodiment, the pattern adaptive transform is combined with domain adaptive transform to efficiently predict data near boundaries of domains. The filter coefficients for the interior points is first by the domain adaptive technique which redistributes the weight of the coefficients corresponding to external points. Then, the pattern adaptive technique is used to scale a renormalize those weights according to the pattern adaptive technique.

CONCLUSION

In this patent we have described a novel way of efficiently representing multi-dimensional signals. Such transforms can be applied to the efficient encoding of different kinds of multi-dimensional signals including but not limited to still images, video sequences, and holograms. The described method of a domain adaptive transform (multi-scale or otherwise) can greatly increase the efficiency of the mathematical representation of a multi-dimensional signal whether that signal itself spans an arbitrary shaped domain or the signal domain is divided into multiple arbitrary shaped domains. The described method of a domain adaptive transform and pattern adaptive transform is also relevant to the increased efficiency of transform coding in terms of both bit rate and quality of reconstruction when applied to a multi-dimensional signal whether that signal itself spans an arbitrary shaped domain or the signal domain is divided into multiple arbitrary shaped domains.

PUBLICATIONS

"Method and Apparatus for Efficient Video Processing," International Publication Number WO 00/64167, assignee Pulsent Corporation, inventors A. Prakash and E. R. Prakash, published Oct. 26, 2000 [Prakash I]

"Method and Apparatus for Digital Image Segmentation," International Publication Number WO 00/77735, assignee Pulsent Corporation, inventors A. Prakash, E. Ratner, J. Chen, and D. L. Cook, published Dec. 21, 2000 [Prakash II]

R. Coifman, Y. Meyer, S. Quake, and V. Wickerhauser, "Signal Processing and Compression with Wave Packets", *Numerical Algorithms Research Group*, New Haven, Conn.: Yale University, 1990 [Coifman I]

W. Sweldens, "The lifting scheme: A custom-design construction of bi-orthogonal wavelets", *Appl. Comput. Harmon. Anal*, vol. 3, no. 2, pp. 186-200, 1996 [Sweldens I]

W. Sweldens, "The lifting scheme: A construction of second generation wavelets", *Technical Report* 1995:6, Industrial Mathematics Initiative, Department of Mathematics, University of South Carolina, 1995 [Sweldens II]

P. J. Burt and E. H. Adelson, "The Laplacian pyramid as a compact image code," IEEE Transactions on Communications, vol. COM-31, April 1983 [Burt and Adelson I]

A. Said and W. A. Pearlman, "A New, Fast, and Efficient Image Codec Based on Set Partitioning in Hierarchical Trees" *IEEE Transactions on Circuits and Systems for Video Technology*, vol. 6, no. 3, pp. 243-250, 1996 [SPIHT I]

M. W. Marcellin and T. R. Fischer, "Trellis coded quantization of memory-less and Gauss-Markov sources," *IEEE Transactions on Communications*, vol. 38, pp. 82-93, January 1990 [Marcellin I]

J. M. Shapiro, "An embedded hierarchical image coder using zero-trees of wavelet coefficients," *IEEE Data Compression Conference* (Snowbird, Utah), pp. 214-223, 1993 [Shapiro I]

I. Daubechies, "Ten Lectures on Wavelets", *CBMS-NSF Regional Conf. Series in Appl. Math.*, vol. 61, Society for Industrial and Applied Mathematics, Philadelphia, Pa., 1992 [Daub I]

M. de Berg, M. van Kreveld, M. Overmars, and O. Scharzkopf, *Computational Geometry—Algorithms and Applications*, Berlin, Germany: Springer, 1997 [Berg I]

T. Sikora and B. Makai "Shape-Adaptive DCT for Coding of Arbitrarily Shaped Image Segments", *IEEE Trans. CVST*, Vol. 5, No. 3, pp. 254-258, June 1995 [Sikora I]

A. Kaup, "Object_based texture coding of moving video in MPEG4", *IEEE Trans. On Circuits and Systems for Video Technology*, vol. 9, p 5-15, February 1999. [Kaup I]

J. Li et. al., "Arbitray shape wavelet transform with phase alignment", 1998 *IEEE International conference on Image Processing*, vol. 3, pp 683-687, Chicago, Ill., October 1998. [Li I]

Our claims are the following:

1. A transform coder for encoding a multi-dimensional signal with an arbitrarily-shaped domain, the transform coder being configured to perform at least the steps of:
   obtaining the multi-dimensional signal;
   performing a domain adaptive transform on the signal that involves applying a filter comprising a convolution operator which is configured to process pixels near a boundary of, but not in an interior of, the arbitrarily-shaped domain, the convolution operator resulting in a weighted sum of values contained in the multi-dimensional signal;
   quantizing the resultant decomposition coefficients; and
   encoding and transmitting the quantized values over an information channel to a decoder for reconstruction of an approximated signal,
   wherein the domain adaptive transform is applied such that points external to the arbitrarily-shaped domain but within support of the filter (or filters) are included in the result of the convolution but are further multiplied (or re-weighted) by a set of additional weighting factors.

2. The transform coder of claim 1, wherein the multi-dimensional signal comprises a still image frame or an intraframe for a sequence of video images.

3. The transform coder of claim 1, wherein the multi-dimensional signal is a residue frame for a sequence of video images.

4. The transform coder of claim 1, wherein the domain adaptive transform is applied during a calculation of coarser scale representations in a forward transform of a multi-scale transform.

5. The transform coder of claim 1, wherein the domain adaptive transform is applied during an estimation of next finer scale representations in an inverse transform of a multi-scale transform during a reconstruction phase.

6. The transform coder of claim 1, wherein the domain adaptive transform is applied in order to construct a sub-band decomposition of a multi-scale transform.

7. The transform coder of claim 1, wherein the domain adaptive transform is applied during an estimation of a next finer level of sub-bands in a multi-scale transform during a reconstruction phase.

8. The transform coder of claim 1, wherein the domain adaptive transform is applied such that points external to the arbitrarily-shaped domain but within support of the filter (or filters) are excluded from the result of the convolution.

9. The transform coder of claim 1, wherein the set of additional weighting factors is determined as a result of calculation of a local measure characterizing a transition at a boundary of the arbitrarily-shaped domain.

10. The transform coder of claim 9, wherein the local measure is based on a statistical function of a pixel value differences across the boundary transition.

* * * * *